(12) United States Patent
Yu et al.

(10) Patent No.: US 10,225,865 B2
(45) Date of Patent: Mar. 5, 2019

(54) METHOD FOR PREDETERMINING RESOURCE IN RANDOM ACCESS, USER EQUIPMENT, AND BASE STATION

(71) Applicant: Huawei Technologies Co., Ltd., Shenzhen (CN)

(72) Inventors: Zheng Yu, Beijing (CN); Fang Nan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 171 days.

(21) Appl. No.: 15/070,920

(22) Filed: Mar. 15, 2016

(65) Prior Publication Data
US 2016/0198497 A1  Jul. 7, 2016

Related U.S. Application Data

(63) Continuation of application No. PCT/CN2013/083589, filed on Sep. 16, 2013.

(51) Int. Cl.
*H04W 74/08* (2009.01)
*H04W 72/04* (2009.01)
*H04W 74/00* (2009.01)

(52) U.S. Cl.
CPC ... *H04W 74/0833* (2013.01); *H04W 72/0446* (2013.01); *H04W 72/0453* (2013.01); *H04W 74/002* (2013.01)

(58) Field of Classification Search
None
See application file for complete search history.

(56) References Cited

U.S. PATENT DOCUMENTS

| | | | |
|---|---|---|---|
| 2009/0175292 A1* | 7/2009 | Noh | H04W 74/006 370/462 |
| 2010/0067470 A1* | 3/2010 | Damnjanovic | H04L 5/0053 370/329 |
| 2011/0032889 A1* | 2/2011 | Lee | H04W 74/006 370/329 |

(Continued)

FOREIGN PATENT DOCUMENTS

| | | |
|---|---|---|
| CN | 101466153 A | 6/2009 |
| CN | 101640922 A | 2/2010 |

(Continued)

*Primary Examiner* — Andrew C Oh
(74) *Attorney, Agent, or Firm* — Leydig, Voit & Mayer, Ltd.

(57) ABSTRACT

Embodiments of the present disclosure relate to the communications field, and provide a method for predetermining a resource in random access, user equipment, and a base station, so that a process of random access can be simplified, and reliability of information transmission in the process of random access can be improved. The method is: an implicit manner is used to indicate some or all of identifiers of a random access preamble index; so that a message in a procedure of random access is simplified, and at the same time resources used for transmitting an RAR reply message, transmitting a contention resolution message, retransmitting an RAR reply message, and retransmitting a contention resolution message are configured by using signaling or preset by a system. The embodiments of the present disclosure are used for a process of random access.

16 Claims, 7 Drawing Sheets

(56) References Cited

U.S. PATENT DOCUMENTS

| | | | |
|---|---|---|---|
| 2011/0243075 A1 | 10/2011 | Luo et al. | |
| 2014/0050213 A1* | 2/2014 | Nguyen | H04W 56/0015 370/350 |
| 2014/0092855 A1* | 4/2014 | Ahn | H04W 74/0833 370/329 |
| 2015/0057011 A1* | 2/2015 | Di Girolamo | H04W 74/0808 455/454 |
| 2015/0289141 A1* | 10/2015 | Ghasemzadeh | H04W 16/14 370/330 |
| 2015/0296542 A1* | 10/2015 | Heo | H04W 74/0833 370/329 |
| 2018/0176906 A1 | 6/2018 | Yamada et al. | |

FOREIGN PATENT DOCUMENTS

| | | |
|---|---|---|
| CN | 101772182 A | 7/2010 |
| CN | 101827450 A | 9/2010 |
| CN | 102573101 A | 7/2012 |
| EP | 2153549 B1 | 10/2013 |
| JP | 2011010337 A | 1/2011 |
| JP | 2012530475 A | 11/2012 |
| KR | 20120030549 A | 3/2012 |
| KR | 20130001096 A | 1/2013 |
| RU | 2011132398 A | 2/2013 |
| WO | 2009086188 A2 | 7/2009 |
| WO | WO 2010148132 A2 | 12/2010 |
| WO | 2012177060 A2 | 12/2012 |
| WO | 2013022451 A1 | 2/2013 |
| WO | WO 2013104118 A1 | 7/2013 |

\* cited by examiner

METHOD FOR PREDETERMINING RESOURCE IN RANDOM ACCESS, USER EQUIPMENT, AND BASE STATION

CROSS-REFERENCE

This application is a continuation of International Patent Application No. PCT/CN2013/083589, filed on Sep. 16, 2013, which is hereby incorporated by reference in its entirety.

TECHNICAL FIELD

The present disclosure relates to the communications field, and in particular, to a method for predetermining a resource in random access, user equipment, and a base station.

BACKGROUND

In the prior art, an important application of machine-type communication (MTC) user equipment (UE) is a smart meter. A smart meter is usually installed in a basement of a house, or is isolated by a metal casing. The MTC UE is subject to severer a path or penetration loss. Therefore, an operator expects a coverage area of a cell to be further enhanced, so that a service can be provided to MTC UE in an extreme environment (for example, located in a basement or located at an edge of a cell).

During enhancement of a coverage area, signal quality is usually improved by consuming more resources (for example, time resources, and/or frequency resources, and/or power resources, and/or code resources), and/or interference intensity is reduced through interference coordination.

In a wireless communications system, a random access process is usually required to establish a connection between user equipment and a network. An Long Term Evolution (LTE) network is used as an example, and a random access process of LTE has two modes: a contention-based mode and a non-contention-based mode. Contention-based random access includes four steps: Step 1 UE randomly selects one preamble from available preambles (preamble), and sends the randomly selected preamble on one available physical random access channel (PRACH) resource. Step 2 A base station replies to the detected preamble, where the reply message is included in a media access control packet data unit (MAC PDU). The MAC PDU includes one MAC header (header) and one or more random access response (RARs) and a possible padding (padding) bit.

The MAC PDU that carries the RAR may be referred to as a message 2 in short. The message 2 is carried by one physical donwlink shared channel (PDSCH). A physical donwlink control channel (PDCCH) or an enhanced physical donwlink control channel (EPDCCH) schedules transmission of the PDSCH. Therefore, the UE first needs to detect the PDCCH or the EPDCCH, to obtain scheduling information of the PDSCH, and further detect the PDSCH according to the scheduling information. If the UE successfully detects the PDSCH, and a preamble identified by an RAPID included in the MAC PDU carried by the PDSCH is a preamble sent by the UE, the UE believes that the base station has detected a preamble sent by the UE, and believes that an RAR corresponding to a subheader including the RAPID is an RAR sent by the base station to the UE. Step 3 After determining that the RAR fed back by the base station is received, the UE sends an RAR reply on a PUSCH (Physical Uplink Shared Channel, physical uplink shared channel), where the RAR reply is referred to as a h message 3 in short. The message 3 mainly includes a ue-Identity (user identity) and an establishment cause (a cause of an establishment request). Step 4 The base station detects the message 3 sent by the UE, determines that random access of the UE succeeds, and sends a random access contention resolution message to the UE, where the random access contention resolution message is referred to as a message 4 in short. The message 4 is also carried by the PDSCH. The PDCCH or the EPDCCH schedules transmission of the PDSCH. Therefore, the UE first needs to detect the PDCCH or the EPDCCH, to obtain scheduling information of the PDSCH carrying the message 4, and further detect the PDSCH according to the scheduling information. If the UE successfully detects the PDSCH, and the ue-Identity included in the message 4 carried in the detected PDSCH is the same as or matches the ue-Identity, of the UE, included in the message 3, the UE believes that random access succeeds.

It can therefore be seen that in a contention-based random access process, the foregoing four steps involves transmission of sequence, data, and scheduling (or control) information on six channels. A preamble sequence is transmitted on a PRACH channel, the scheduling information of the message 2 is transmitted on the PDCCH or the EPDCCH, the message 2 is transmitted on the PDSCH, the message 3 is transmitted on the PUSCH, the scheduling information of the message 4 is transmitted on the PDCCH or the EPDCCH, and the message 4 is transmitted on the PDSCH. In the foregoing cases, a coverage enhancement requirement is considered. If it needs to be ensured that random access of UE is performed reliably, performance needs to be enhanced for transmission of the foregoing six channels, which means that more resources need to be consumed, and complexity of implementing a base station and UE is greatly increased. Therefore, a mechanism is needed to simplify a random access process, so that implementation of coverage enhancement does not need to consume more resources, thereby reducing complexity of implementing a base station and UE.

SUMMARY

Embodiments of the present disclosure provide a method for predetermining a resource in random access, user equipment, and a base station, thereby resolving a problem that complexity of implementing a base station and UE is increased as implementation of coverage enhancement needs to consume more resources.

To achieve the foregoing object, the following technical solutions are adopted in embodiments of the present disclosure:

According to a first aspect, a method for predetermining a resource in a process of random access is provided, where the method includes:

receiving a random access preamble sent by user equipment, and determining preamble information according to the received random access preamble, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

determining an RAR resource corresponding to the random access preamble according to a correspondence between the preamble information and random access response RAR resource information, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system; and sending the RAR message corresponding to the random access preamble to the user equipment on the RAR resource corresponding to the random access preamble.

With reference to the first aspect, in a first possible implementation manner, the method further includes:

the RAR resource is configured by using signaling or preset by the system, and each RAR resource of RAR resources configured by using signaling or preset by the system corresponds to one or more random access preambles.

With reference to the first possible implementation manner of the first aspect, in a second possible implementation manner, the RAR resource configured by using signaling or preset by the system includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

With reference to the first possible implementation manner of the first aspect, in a third possible implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

With reference to the third possible implementation manner of the first aspect, in a fourth possible implementation manner, the method includes:

if one RAR resource corresponds to only one random access preamble, an RAR message included in a media access control MAC packet data unit PDU transmitted on the RAR resource does not include an identifier for indicating the random access preamble or a random access preamble index.

With reference to the first possible implementation manner of the first aspect, in a fifth possible implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

With reference to the fifth possible implementation manner of the first aspect, in a sixth possible implementation manner, if one RAR resource corresponds to multiple random access preambles, an RAR message included in a MAC PDU transmitted on the RAR resource includes an identifier for indicating the random access preambles or random access preamble indices, and a length of the identifier is equal to k bits, where k=ceil($\log_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil($\log_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

With reference to the fifth possible implementation manner of the first aspect, in a seventh possible implementation manner, if the N RAR resources are configured by using signaling or preset by the system, and N=$2^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

With reference to the first aspect, in an eighth possible implementation manner, the correspondence between the preamble information and the RAR resource information is a functional relationship, a table relationship or a specified relationship; and the correspondence between the preamble information and the RAR resource information is configured by using signaling or preset by the system, where the signaling includes broadcast or multicast signaling, and the correspondence, configured by using signaling or preset by the system, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

With reference to the eighth possible implementation manner of the first aspect, in a ninth possible implementation manner, the correspondence between the preamble information and the RAR resource information includes:

the RAR resource index corresponding to the random access preamble=the random access preamble index mod a quantity of RAR resources configured by using signaling or preset by the system, where herein mod denotes a modulo operation.

With reference to the first possible implementation manner of the first aspect, in a tenth possible implementation manner, random access preambles corresponding to different RAR resources of the RAR resources configured by using signaling or preset by the system are same, or partially same, or completely different.

With reference to the first aspect, in an eleventh possible implementation manner, the method further includes:

determining, according to a correspondence between a specified parameter and a random access preamble, the random access preamble corresponding to the specified parameter; and determining, according to the random access preamble corresponding to the specified parameter, a quantity of bits of an identifier, for indicating the random access preamble or a random access preamble index, in an RAR message included in a MAC PDU.

With reference to the eleventh possible implementation manner of the first aspect, in a twelfth possible implementation manner, the correspondence between the specified parameter and the random access preamble is configured by using signaling or preset by the system, and the random access preamble and the quantity of bits of the identifier for indicating the random access preamble or the random access preamble index are configured by using signaling or preset by the system; and the specified parameter includes: a path loss value or range, a reference signal receive power value or range, a reference signal receive quality value or range, a channel quality information value or range, a service type of the user equipment, a power saving type of the user equipment, a delay type of the user equipment or a mobility type of the user equipment.

With reference to the first aspect, in a thirteenth possible implementation manner, the RAR message corresponding to the random access preamble does not include a bit or a field for indicating a temporary identifier, and the temporary identifier includes a cell radio network temporary identifier, or a temporary cell radio network temporary identifier; and/or the RAR message corresponding to the random access preamble does not include uplink scheduling/grant information; and/or the RAR message corresponding to the random access preamble includes: a predefined timing advance command, where an adjustment granularity of the predefined timing advance command is greater than a specified adjustment granularity; and/or the correspondence between the preamble information and the RAR resource information further includes one or more cell common parameters, and the cell common parameter includes: a cell identity, a subframe number, a frame number, a timeslot number or an orthogonal frequency-division multiplexing symbol index; and/or a preset timing relationship or a preset time offset exists between a start moment of the time resource occupied in transmitting the RAR message and a start moment of the time resource occupied in transmitting the random access preamble by the user equipment; or, a preset timing relationship or a preset time offset exists between an ending moment of the time resource occupied in transmitting the RAR message and an ending moment of the time resource occupied in transmitting the random access preamble by the user equipment.

With reference to the first aspect, in a fourteenth possible implementation manner, the method further includes:

receiving an RAR reply message sent by the user equipment, where the RAR reply message includes a radio resource control (Radio Resource Control, RRC) connection request, where the RRC connection request includes a bit or a field for indicating a first user identity, and the first user identity is used for distinguishing the user equipment in contention conflict resolution of random access, where a quantity of bits included in the bit or the field for indicating the first user identity is less than a first specified bit quantity.

With reference to the fourteenth possible implementation manner of the first aspect, in a fifteenth possible implementation manner, the RRC connection request further includes a predefined establishment cause, and a quantity of bits for indicating the predefined establishment cause is greater than a second specified bit quantity.

With reference to the fourteenth or fifteenth possible implementation manner of the first aspect, in a sixteenth possible implementation manner, a resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

With reference to the fourteenth or fifteenth possible implementation manner of the first aspect, in a seventeenth possible implementation manner, the method further includes:

determining, according to a correspondence between a resource or a resource index of the RAR reply message and the preamble information, a resource for receiving the RAR reply message; or determining, according to a correspondence between a resource or a resource index of the RAR reply message and the preamble information and a cell common parameter, a resource for receiving the RAR reply message; or determining, according to a correspondence between a resource or a resource index of the RAR reply message and the RAR resource information, a resource for receiving the RAR reply message; or determining, according to a correspondence between a resource or a resource index of the RAR reply message and the RAR resource information and a cell common parameter, a resource for receiving the RAR reply message; or determining, according to a correspondence between a resource or a resource index of the RAR reply message and a specified parameter, a resource for receiving the RAR reply message; or determining, according to a correspondence between a resource or a resource index of the RAR reply message and a specified parameter and a cell common parameter, a resource for receiving the RAR reply message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the seventeenth possible implementation manner of the first aspect, in an eighteenth possible implementation manner, the correspondence between the resource index of the RAR reply message and the preamble information includes:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

With reference to the fourteenth possible implementation manner of the first aspect, in a nineteenth possible implementation manner, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

With reference to the first aspect, in a twentieth possible implementation manner, the method further includes:

sending a contention resolution message to the user equipment, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

With reference to the twentieth possible implementation manner of the first aspect, in a twenty-first possible implementation manner, the contention resolution message further includes: a bit or a field for indicating a temporary identifier, and the temporary identifier includes a cell radio network temporary identifier, or a temporary cell radio network temporary identifier.

With reference to the twentieth or twenty-first possible implementation manner of the first aspect, in a twenty-second possible implementation manner, a resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

With reference to the twentieth or twenty-first possible implementation manner of the first aspect, in a twenty-third possible implementation manner, the method further includes:

determining, according to a correspondence between a resource or a resource index of the contention resolution message and the preamble information, a resource for sending the contention resolution message; or determining, according to a correspondence between a resource or a resource index of the contention resolution message and the preamble information and a cell common parameter, a resource for sending the contention resolution message; or determining, according to a correspondence between a resource or a resource index of the contention resolution message and the RAR resource information, a resource for sending the contention resolution message; or determining, according to a correspondence between a resource or a resource index of the contention resolution message and the RAR resource information and a cell common parameter, a resource for sending the contention resolution message; or determining, according to a correspondence between a resource or a resource index of the contention resolution message and a specified parameter, a resource for sending the contention resolution message; or determining, according to a correspondence between a resource or a resource index of the contention resolution message and a specified parameter and a cell common parameter, a resource for sending the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twentieth possible implementation manner of the first aspect, in a twenty-fourth possible implementation manner, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

With reference to the first aspect, in a twenty-fifth possible implementation manner, the method further includes:

receiving an RAR reply message retransmitted by the user equipment; and/or sending a retransmitted contention resolution message to the user equipment.

With reference to the twenty-fifth possible implementation manner of the first aspect, in a twenty-sixth possible implementation manner, a size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

With reference to the twenty-fifth possible implementation manner of the first aspect, in a twenty-seventh possible implementation manner, the method further includes:

determining, according to a correspondence between a resource or a resource index of the retransmitted RAR reply message and the preamble information and a preset time offset, a resource for receiving the retransmitted RAR reply information; or determining, according to a correspondence between a resource or a resource index of the retransmitted RAR reply message and the preamble information, a preset time offset, and a cell common parameter, a resource for receiving the retransmitted RAR reply message; or determining, according to a correspondence between a resource or a resource index of the retransmitted RAR reply message and the RAR resource information and a preset time offset, a resource for receiving the retransmitted RAR reply message; or determining, according to a correspondence between a resource or a resource index of the retransmitted RAR reply message and the RAR resource information, a preset time offset, and a cell common parameter, a resource for receiving the retransmitted RAR reply message; or determining, according to a correspondence between a resource or a resource index of the retransmitted RAR reply message and a specified parameter and a preset time offset, a resource for receiving the retransmitted RAR reply message; or determining, according to a correspondence between a resource or a resource index of the retransmitted RAR reply message and a specified parameter, a preset time offset, and a cell common parameter, a resource for receiving the retransmitted RAR reply message, where the cell common parameter includes a cell identity, a subframe number, a frame number, a timeslot number or an orthogonal frequency-division multiplexing symbol index, the specified parameter includes: a resource index used for sending an RAR reply, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twenty-fifth possible implementation manner of the first aspect, in a twenty-eighth possible implementation manner, the method further includes:

determining, according to a correspondence between a resource or a resource index of the retransmitted contention resolution message and the preamble information and a preset time offset, a resource for sending the retransmitted contention resolution message; or determining, according to a correspondence between a resource or a resource index of the retransmitted contention resolution message and the preamble information, a preset time offset, and a cell common parameter, a resource for sending the retransmitted contention resolution message; or determining, according to a correspondence between a resource or a resource index of the retransmitted contention resolution message and the RAR resource information and a preset time offset, a resource for sending the retransmitted contention resolution message; or determining, according to a correspondence between a resource or a resource index of the retransmitted contention resolution message and the RAR resource information, a preset time offset, and a cell common parameter, a resource for sending the retransmitted contention resolution message; or determining, according to a correspondence between a resource or a resource index of the retransmitted contention resolution message and a specified parameter and a preset time offset, a resource for sending the retransmitted contention resolution message; or determining, according to a correspondence between a resource or a resource index of the retransmitted contention resolution message and a specified parameter, a preset time offset, and a cell common parameter, a resource for sending the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to any one of the twenty-fifth to twenty-eighth possible implementation manners of the first aspect, in a twenty-ninth possible implementation manner, resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

With reference to the twenty-ninth possible implementation manner of the first aspect, in a thirtieth possible implementation manner, if the resource used for transmitting the first information is configured by using signaling, the method further includes:

sending configuration signaling to the user equipment, where the configuration signaling is used for notifying the user equipment of a resource configuration used for transmitting the first information.

According to a second aspect, a method for predetermining a resource in random access is provided, where the method includes:

determining a random access preamble, and sending the determined first random access preamble to a base station;

determining preamble information according to the first random access preamble, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

determining an RAR resource corresponding to the first random access preamble according to a correspondence between the preamble information and random access response RAR resource information, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system; and receiving, on the RAR resource corresponding to the first random access preamble, a media access control MAC packet data unit PDU sent by the base station, and determining whether the MAC PDU includes the RAR message corresponding to the first random access preamble.

With reference to the second aspect, in a first possible implementation manner, the RAR resource is configured by using signaling or preset by the system, and each RAR resource of RAR resources configured by using signaling or preset by the system corresponds to one or more random access preambles.

With reference to the first possible implementation manner of the second aspect, in a second possible implementation manner, the RAR resource configured by using signaling or preset by the system includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

With reference to the first possible implementation manner of the second aspect, in a third possible implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

With reference to the third possible implementation manner of the second aspect, in a fourth possible implementation manner, the method includes:

if one RAR resource corresponds to only one random access preamble, the RAR message included in the media access control MAC packet data unit PDU transmitted on the RAR resource does not include an identifier for indicating the random access preamble or a random access preamble index.

With reference to the first possible implementation manner of the second aspect, in a fifth possible implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

With reference to the fifth possible implementation manner of the second aspect, in a sixth possible implementation manner, if one RAR resource corresponds to multiple random access preambles, an RAR message included in the MAC PDU transmitted on the RAR resource includes an identifier for indicating the random access preambles or random access preamble indices, and a length of the identifier is equal to k bits, where k=ceil(log$_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil(log$_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

With reference to the sixth possible implementation manner of the second aspect, in a seventh possible implementation manner, the determining whether the MAC PDU includes the RAR message corresponding to the first random access preamble includes:

if bits corresponding to an RAR resource or an RAR resource index where the RAR message is located are the same as the random access preamble and the first random access preamble, where the random access preamble is indicated by the identifier for indicating the random access preambles or the random access preamble indices and the identifier is included in the RAR message included in the MAC PDU, determining that the MAC PDU includes the RAR message corresponding to the first random access preamble; or, if bits corresponding to an RAR resource or an RAR resource index where the RAR message is located are the same as the random access preamble index and a first random access preamble index determined by user equipment, where the random access preamble index is indicated by the identifier for indicating the random access preambles or the random access preamble indices and the identifier is included in the RAR message included in the MAC PDU, determining that the MAC PDU includes the RAR message corresponding to the first random access preamble; or if a state of an identifier, for indicating a random access preamble or a random access preamble index, included in an RAR message included in the MAC PDU received on the RAR resource corresponding to the first random access preamble is the same as a state of a bits of bits corresponding to the first random access preamble or a first random access preamble index, determining that the MAC PDU includes the RAR message corresponding to the first random access preamble, where a is equal to a quantity of bits of the identifier for indicating the random access preamble or the random access preamble index.

With reference to the fifth possible implementation manner of the second aspect, in an eighth possible implementation manner, if the N RAR resources are configured by using signaling or preset by the system, and N=2$^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

With reference to the eighth possible implementation manner of the second aspect, in a ninth possible implementation manner, the determining whether the MAC PDU includes the RAR message corresponding to the first random access preamble includes:

determining a bit value corresponding to the RAR resource index corresponding to the first random access preamble, where the bit value corresponding to the RAR resource index is preset;

determining a bit value corresponding to the identifier in the MAC PDU;

combining the bit value corresponding to the RAR resource index corresponding to the random access preamble and the bit value corresponding to the identifier in the MAC PDU to obtain the s bits;

determining the random access preamble indicated by the s bits; and determining whether the first random access preamble is the same as the random access preamble indicated by the s bits, and if the first random access preamble is the same as the random access preamble indicated by the s bits, determining that the MAC PDU includes the RAR message corresponding to the first random access preamble, or if the first random access preamble is different from the random access preamble indicated by the s bits, determining that the MAC PDU does not include the RAR message corresponding to the first random access preamble.

With reference to the second aspect, in a tenth possible implementation manner, the correspondence between the preamble information and the RAR resource information is a functional relationship, a table relationship or a specified relationship; and the correspondence between the preamble information and the RAR resource information is configured by using signaling or preset by the system, where the correspondence, configured by using signaling or preset by the system, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

With reference to the tenth possible implementation manner of the second aspect, in an eleventh possible implementation manner, the correspondence between the preamble information and the RAR resource information includes:

the RAR resource index corresponding to the random access preamble=the random access preamble index mod a quantity of RAR resources configured by using signaling or preset by the system, where herein mod denotes a modulo operation.

With reference to the first possible implementation manner of the second aspect, in a twelfth possible implementation manner, random access preambles corresponding to different RAR resources of the RAR resources configured by using signaling or preset by the system are same, or partially same, or completely different.

With reference to the second aspect, in a thirteenth possible implementation manner, a quantity of bits of an identifier, for indicating a random access preamble or a random access preamble index, in the RAR message included in the MAC PDU is determined by the base station according to a correspondence between a specified parameter and a random access preamble.

With reference to the thirteenth possible implementation manner of the second aspect, in a fourteenth possible implementation manner, the correspondence between the specified parameter and the random access preamble is configured by using signaling or preset by the system, and the quantity of bits of the identifier for indicating the random access preamble or the random access preamble index is configured by using signaling or preset by the system; and the specified parameter includes: a path loss value or range, a reference signal receive power value or range, a reference signal receive quality value or range, a channel quality information value or range, a service type of user equipment, a power saving type of the user equipment, a delay type of the user equipment or a mobility type of the user equipment.

With reference to the second aspect, in a fifteenth possible implementation manner, the RAR message corresponding to the first random access preamble does not include a bit or a field for indicating a temporary identifier, and the temporary identifier includes a cell radio network temporary identifier, or a temporary cell radio network temporary identifier; and/or the RAR message corresponding to the first random access preamble does not include uplink scheduling/grant information; and/or the RAR message corresponding to the first random access preamble includes: a predefined timing advance command, where an adjustment granularity of the predefined timing advance command is greater than a specified adjustment granularity; and/or the correspondence between the preamble information and the RAR resource information further includes one or more cell common parameters, and the cell common parameter includes: a cell identity, a subframe number, a frame number, a timeslot number or an orthogonal frequency-division multiplexing symbol index; and/or a preset timing relationship or a preset time offset exists between a start moment of the time resource occupied in transmitting the RAR message and a start moment of the time resource occupied in transmitting the random access preamble by user equipment; or, a preset timing relationship or a preset time offset exists between an ending moment of the time resource occupied in transmitting the RAR message and an ending moment of the time resource occupied in transmitting the random access preamble by the user equipment.

With reference to the second aspect, in a sixteenth possible implementation manner, the method further includes:

sending an RAR reply message to the base station, where the RAR reply message includes a radio resource control RRC connection request, where the RRC connection request includes a bit or a field for indicating a first user identity, and the first user identity is used for distinguishing user equipment in contention conflict resolution of random access, where a quantity of bits included in the bit or the field for indicating the first user identity is less than a first specified bit quantity.

With reference to the sixteenth possible implementation manner of the second aspect, in a seventeenth possible implementation manner, the RRC connection request further includes a predefined establishment cause, and a quantity of bits for indicating the predefined establishment cause is greater than a second specified bit quantity.

With reference to the sixteenth or seventeenth possible implementation manner of the second aspect, in an eighteenth possible implementation manner, a resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

With reference to the sixteenth or seventeenth possible implementation manner of the second aspect, in a nineteenth possible implementation manner, the method further includes:

determining, according to a correspondence between a resource or a resource index of the RAR reply message and the preamble information, a resource for sending the RAR reply message; or determining, according to a correspondence between a resource or a resource index of the RAR reply message and the preamble information and a cell common parameter, a resource for sending the RAR reply message; or determining, according to a correspondence between a resource or a resource index of the RAR reply message and the RAR resource information, a resource for sending the RAR reply message; or determining, according to a correspondence between a resource or a resource index of the RAR reply message and the RAR resource information and a cell common parameter, a resource for sending the RAR reply message; or determining, according to a correspondence between a resource or a resource index of the RAR reply message and a specified parameter, a resource for sending the RAR reply message; or determining, according to a correspondence between a resource or a resource index of the RAR reply message and a specified parameter and a cell common parameter, a resource for sending the RAR reply message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the eighteenth possible implementation manner of the second aspect, in a twentieth possible implementation manner, the correspondence between the resource index of the RAR reply message and the preamble information includes:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

With reference to the sixteenth possible implementation manner of the second aspect, in a twenty-first possible implementation manner, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

With reference to the second aspect, in a twenty-second possible implementation manner, the method further includes:

receiving a contention resolution message sent by the base station, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

With reference to the twenty-second possible implementation manner of the second aspect, in a twenty-third possible implementation manner, the contention resolution message further includes: a bit or a field for indicating a temporary identifier, and the temporary identifier includes a cell radio network temporary identifier, or a temporary cell radio network temporary identifier.

With reference to the twenty-second or twenty-third possible implementation manner of the second aspect, in a twenty-fourth possible implementation manner, a resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

With reference to the twenty-second or twenty-third possible implementation manner of the second aspect, in a twenty-fifth possible implementation manner, the method further includes:

determining, according to a correspondence between a resource or a resource index of the contention resolution message and the preamble information, a resource for receiving the contention resolution message; or determining, according to a correspondence between a resource or a resource index of the contention resolution message and the preamble information and a cell common parameter, a resource for receiving the contention resolution message; or determining, according to a correspondence between a resource or a resource index of the contention resolution message and the RAR resource information, a resource for receiving the contention resolution message; or determining, according to a correspondence between a resource or a resource index of the contention resolution message and the RAR resource information and a cell common parameter, a resource for receiving the contention resolution message; or determining, according to a correspondence between a resource or a resource index of the contention resolution message and a specified parameter, a resource for receiving the contention resolution message; or determining, according to a correspondence between a resource or a resource index of the contention resolution message and a specified parameter and a cell common parameter, a resource for receiving the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twenty-second possible implementation manner of the second aspect, in a twenty-sixth possible implementation manner, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

With reference to the second aspect, in a twenty-seventh possible implementation manner, the method further includes:

sending a retransmitted RAR reply message to the base station; and/or receiving a contention resolution message retransmitted by the base station.

With reference to the twenty-seventh possible implementation manner of the second aspect, in a twenty-eighth possible implementation manner, a size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

With reference to the twenty-seventh possible implementation manner of the second aspect, in a twenty-ninth possible implementation manner, the method further includes:

determining, according to a correspondence between a resource or a resource index of the retransmitted RAR reply message and the preamble information and a preset time offset, a resource for sending the retransmitted RAR reply information; or determining, according to a correspondence between a resource or a resource index of the retransmitted RAR reply message and the preamble information, a preset time offset, and a cell common parameter, a resource for sending the retransmitted RAR reply message; or determining, according to a correspondence between a resource or a resource index of the retransmitted RAR reply message and the RAR resource information and a preset time offset, a resource for sending the retransmitted RAR reply message; or determining, according to a correspondence between a resource or a resource index of the retransmitted RAR reply message and the RAR resource information, a preset time offset, and a cell common parameter, a resource for sending the retransmitted RAR reply message; or determining, according to a correspondence between a resource or a resource index of the retransmitted RAR reply message and a specified parameter and a preset time offset, a resource for sending the retransmitted RAR reply message; or determining, according to a correspondence between a resource or a resource index of the retransmitted RAR reply message and a specified parameter, a preset time offset, and a cell common parameter, a resource for sending the retransmitted RAR reply message, where the cell common parameter includes a cell identity, a subframe number, a frame number, a timeslot number or an orthogonal frequency-division multiplexing symbol index, the specified parameter includes: a resource index used for sending an RAR reply, a path loss range, a reference signal receive power value or range, a reference signal receive quality value or range, a channel quality information value or range, a service type of user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twenty-seventh possible implementation manner of the second aspect, in a thirtieth possible implementation manner, and before the receiving a contention resolution message retransmitted by the base station, the method further includes:

determining, according to a correspondence between a resource or a resource index of the retransmitted contention resolution message and the preamble information and a preset time offset, a resource for receiving the retransmitted contention resolution message; or determining, according to a correspondence between a resource or a resource index of the retransmitted contention resolution message and the preamble information, a preset time offset, and a cell common parameter, a resource for receiving the retransmitted contention resolution message; or determining, according to a correspondence between a resource or a resource index of the retransmitted contention resolution message and the RAR resource information and a preset time offset, a resource for receiving the retransmitted contention resolution message; or determining, according to a correspondence between a resource or a resource index of the retransmitted contention resolution message and the RAR resource information, a preset time offset, and a cell common parameter, a resource for receiving the retransmitted contention resolution message; or determining, according to a correspondence between a resource or a resource index of the retransmitted contention resolution message and a specified parameter and a preset time offset, a resource for receiving the retransmitted contention resolution message; or determining, according to a correspondence between a resource or a resource index of the retransmitted contention resolution message and a specified parameter, a preset time offset, and a cell common parameter, a resource for receiving the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to any one of the twenty-seventh to thirtieth possible implementation manners of the second aspect, in a thirty-first possible implementation manner, resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

According to a third aspect, a base station is provided, where the base station includes:

a receiving unit, configured to receive a random access preamble sent by user equipment, and send the received random access preamble to an information determining unit;

the information determining unit, configured to receive the random access preamble from the receiving unit, determine preamble information according to the received random access preamble, and send the determined preamble information to a resource determining unit, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

the resource determining unit, configured to receive the preamble information from the information determining unit, determine an RAR resource corresponding to the random access preamble according to a correspondence between the preamble information and random access response RAR resource information, and send the RAR resource corresponding to the random access preamble to the receiving unit, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system; and the receiving unit, configured to receive, from the resource determining unit, the RAR resource corresponding to the random access preamble, and a sending unit, configured to send the RAR message corresponding to the random access preamble to the user equipment on the RAR resource corresponding to the random access preamble.

With reference to the third aspect, in a first possible implementation manner, the RAR resource is configured by using signaling or preset by the system, and each RAR resource of RAR resources configured by using signaling or preset by the system corresponds to one or more random access preambles.

With reference to the first possible implementation manner of the third aspect, in a second possible implementation manner, the RAR resource configured by using signaling or preset by the system includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

With reference to the first possible implementation manner of the third aspect, in a third possible implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

With reference to the third possible implementation manner of the third aspect, in a fourth possible implementation manner, if one RAR resource corresponds to only one random access preamble, an RAR message included in a media access control MAC packet data unit PDU transmitted on the RAR resource does not include an identifier for indicating the random access preamble or a random access preamble index.

With reference to the first possible implementation manner of the third aspect, in a fifth possible implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

With reference to the fifth possible implementation manner of the third aspect, in a sixth possible implementation manner, if one RAR resource corresponds to multiple random access preambles, an RAR message included in a MAC PDU transmitted on the RAR resource includes an identifier for indicating the random access preambles or random access preamble indices, and a length of the identifier is equal to k bits, where k=ceil(log$_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil(log$_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

With reference to the fifth possible implementation manner of the third aspect, in a seventh possible implementation manner, if the N RAR resources are configured by using signaling or preset by the system, and N=2$^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

With reference to the third aspect, in an eighth possible implementation manner, the correspondence between the preamble information and the RAR resource information is a functional relationship, a table relationship or a specified relationship; and the correspondence between the preamble information and the RAR resource information is configured by using signaling or preset by the system, where the signaling includes broadcast or multicast signaling, and the correspondence, configured by using signaling or preset by the system, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

With reference to the eighth possible implementation manner of the third aspect, in a ninth possible implementation manner, the correspondence between the preamble information and the RAR resource information includes:

the RAR resource index corresponding to the random access preamble=the random access preamble index mod a quantity of RAR resources configured by using signaling or preset by the system, where herein mod denotes a modulo operation.

With reference to the first possible implementation manner of the third aspect, in a tenth possible implementation manner, random access preambles corresponding to different RAR resources of the RAR resources configured by using signaling or preset by the system are same, or partially same, or completely different.

With reference to the third aspect, in an eleventh possible implementation manner, the base station further includes:

an identity control unit, configured to determine, according to a correspondence between a specified parameter and a random access preamble, the random access preamble corresponding to the specified parameter; and determine, according to the random access preamble corresponding to the specified parameter, a quantity of bits of an identifier, for indicating the random access preamble or a random access preamble index, in an RAR message included in a MAC PDU.

With reference to the eleventh possible implementation manner of the third aspect, in a twelfth possible implementation manner, the correspondence between the specified parameter and the random access preamble is configured by using signaling or preset by the system, and the random access preamble and the quantity of bits of the identifier for indicating the random access preamble or the random access preamble index are configured by using signaling or preset by the system; and the specified parameter includes: a path loss value or range, a reference signal receive power value or range, a reference signal receive quality value or range, a channel quality information value or range, a service type of the user equipment, a power saving type of the user equipment, a delay type of the user equipment or a mobility type of the user equipment.

With reference to the third aspect, in a thirteenth possible implementation manner, the RAR message corresponding to the random access preamble does not include a bit or a field for indicating a temporary identifier, and the temporary identifier includes a cell radio network temporary identifier, or a temporary cell radio network temporary identifier; and/or the RAR message corresponding to the random access preamble does not include uplink scheduling/grant information; and/or the RAR message corresponding to the random access preamble includes: a predefined timing advance command, where an adjustment granularity of the predefined timing advance command is greater than a specified adjustment granularity; and/or the correspondence between the preamble information and the RAR resource information further includes one or more cell common parameters, and the cell common parameter includes: a cell identity, a subframe number, a frame number, a timeslot number or an orthogonal frequency-division multiplexing symbol index; and/or a preset timing relationship or a preset time offset exists between a start moment of the time resource occupied in transmitting the RAR message and a start moment of the time resource occupied in transmitting the random access preamble by the user equipment; or, a preset timing relationship or a preset time offset exists between an ending moment of the time resource occupied in transmitting the RAR message and an ending moment of the time resource occupied in transmitting the random access preamble by the user equipment.

With reference to the third aspect, in a fourteenth possible implementation manner, the receiving unit is further configured to receive an RAR reply message sent by the user equipment, where the RAR reply message includes a radio resource control RRC connection request, where the RRC connection request includes a bit or a field for indicating a first user identity, and the first user identity is used for distinguishing the user equipment in contention conflict resolution of random access, where a quantity of bits included in the bit or the field for indicating the first user identity is less than a first specified bit quantity.

With reference to the fourteenth possible implementation manner of the third aspect, in a fifteenth possible implementation manner, the RRC connection request further includes a predefined establishment cause, and a quantity of bits for indicating the predefined establishment cause is greater than a second specified bit quantity.

With reference to the thirteenth or fourteenth possible implementation manner of the third aspect, in a sixteenth possible implementation manner, a resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

With reference to the thirteenth or fourteenth possible implementation manner of the third aspect, in a seventeenth possible implementation manner, the resource determining unit is further configured to:

determine, according to a correspondence between a resource or a resource index of the RAR reply message and the preamble information, a resource for receiving the RAR reply message; or determine, according to a correspondence between a resource or a resource index of the RAR reply message and the preamble information and a cell common parameter, a resource for receiving the RAR reply message; or determine, according to a correspondence between a resource or a resource index of the RAR reply message and the RAR resource information, a resource for receiving the RAR reply message; or determine, according to a correspondence between a resource or a resource index of the RAR reply message and the RAR resource information and a cell common parameter, a resource for receiving the RAR reply message; or determine, according to a correspondence between a resource or a resource index of the RAR reply message and a specified parameter, a resource for receiving the RAR reply message; or determine, according to a correspondence between a resource or a resource index of the RAR reply message and a specified parameter and a cell common parameter, a resource for receiving the RAR reply message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the seventeenth possible implementation manner of the third aspect, in an eighteenth possible implementation manner, the correspondence between the resource index of the RAR reply message and the preamble information includes:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

With reference to the fourteenth possible implementation manner of the third aspect, in a nineteenth possible implementation manner, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

With reference to the third aspect, in a twentieth possible implementation manner, the sending unit is further configured to send a contention resolution message to the user equipment, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

With reference to the twentieth possible implementation manner of the third aspect, in a twenty-first possible implementation manner, the contention resolution message further includes: a bit or a field for indicating a temporary identifier, and the temporary identifier includes a cell radio network temporary identifier, or a temporary cell radio network temporary identifier.

With reference to the twentieth or twenty-first possible implementation manner of the third aspect, in a twenty-second possible implementation manner, a resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

With reference to the twentieth or twenty-first possible implementation manner of the third aspect, in a twenty-third possible implementation manner, the resource determining unit is further configured to:

determine, according to a correspondence between a resource or a resource index of the contention resolution message and the preamble information, a resource for sending the contention resolution message; or determine, according to a correspondence between a resource or a resource index of the contention resolution message and the preamble information and a cell common parameter, a resource for sending the contention resolution message; or determine, according to a correspondence between a resource or a resource index of the contention resolution message and the RAR resource information, a resource for sending the contention resolution message; or determine, according to a correspondence between a resource or a resource index of the contention resolution message and the RAR resource information and a cell common parameter, a resource for sending the contention resolution message; or determine, according to a correspondence between a resource or a resource index of the contention resolution message and a specified parameter, a resource for sending the contention resolution message; or determine, according to a correspondence between a resource or a resource index of the contention resolution message and a specified parameter and a cell common parameter, a resource for sending the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twentieth possible implementation manner of the third aspect, in a twenty-fourth possible implementation manner, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

With reference to the third aspect, in a twenty-fifth possible implementation manner, the receiving unit is further configured to receive an RAR reply message retransmitted by the user equipment; and/or the sending unit is further configured to send a retransmitted contention resolution message to the user equipment.

With reference to the twenty-fifth possible implementation manner of the third aspect, in a twenty-sixth possible implementation manner, a size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

With reference to the twenty-fifth possible implementation manner of the third aspect, in a twenty-seventh possible implementation manner, the resource determining unit is further configured to:

determine, according to a correspondence between a resource or a resource index of the retransmitted RAR reply message and the preamble information and a preset time offset, a resource for receiving the retransmitted RAR reply information; or determine, according to a correspondence between a resource or a resource index of the retransmitted RAR reply message and the preamble information, a preset time offset, and a cell common parameter, a resource for receiving the retransmitted RAR reply message; or determine, according to a correspondence between a resource or a resource index of the retransmitted RAR reply message and the RAR resource information and a preset time offset, a resource for receiving the retransmitted RAR reply message; or determine, according to a correspondence between a resource or a resource index of the retransmitted RAR reply message and the RAR resource information, a preset time offset, and a cell common parameter, a resource for receiving the retransmitted RAR reply message; or determine, according to a correspondence between a resource or a resource index of the retransmitted RAR reply message and a specified parameter and a preset time offset, a resource for receiving the retransmitted RAR reply message; or determine, according to a correspondence between a resource or a resource index of the retransmitted RAR reply message and a specified parameter, a preset time offset, and a cell common parameter, a resource for receiving the retransmitted RAR reply message, where the cell common parameter includes a cell identity, a subframe number, a frame number, a timeslot number or an orthogonal frequency-division multiplexing symbol index, the specified parameter includes: a resource index used for sending an RAR reply, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twenty-fifth or twenty-sixth possible implementation manner of the third aspect, in a twenty-eighth possible implementation manner, the resource determining unit is further configured to:

determine, according to a correspondence between a resource or a resource index of the retransmitted contention resolution message and the preamble information and a preset time offset, a resource for sending the retransmitted contention resolution message; or determine, according to a correspondence between a resource or a resource index of the retransmitted contention resolution message and the preamble information, a preset time offset, and a cell common parameter, a resource for sending the retransmitted contention resolution message; or determine, according to a correspondence between a resource or a resource index of the retransmitted contention resolution message and the RAR resource information and a preset time offset, a resource for sending the retransmitted contention resolution message; or determine, according to a correspondence between a resource or a resource index of the retransmitted contention resolution message and the RAR resource information, a preset time offset, and a cell common parameter, a resource for sending the retransmitted contention resolution message; or determine, according to a correspondence between a resource or a resource index of the retransmitted contention resolution message and a specified parameter and a preset time offset, a resource for sending the retransmitted contention resolution message; or determine, according to a correspondence between a resource or a resource index of the retransmitted contention resolution message and a specified parameter, a preset time offset, and a cell common parameter, a resource for sending the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to any one of the twenty-fifth to twenty-eighth possible implementation manners of the third aspect, in a twenty-ninth possible implementation manner, resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

With reference to the twenty-ninth possible implementation manner of the third aspect, in a thirtieth possible implementation manner, if the resource used for transmitting the first information is configured by using signaling, the sending unit is further configured to:

send configuration signaling to the user equipment, where the configuration signaling is used for notifying the user equipment of a resource configuration used for transmitting the first information.

According to a fourth aspect, user equipment is provided, where the user equipment includes:

a preamble determining unit, configured to determine a random access preamble, and send the determined first random access preamble to a sending unit;

the sending unit, configured to receive the first random access preamble from the preamble determining unit, and send the first random access preamble to a base station;

an information determining unit, configured to determine preamble information according to the first random access preamble, and send the preamble information to a resource determining unit, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

the resource determining unit, configured to receive the preamble information from the information determining unit, determine an RAR resource corresponding to the first random access preamble according to a correspondence between the preamble information and random access response RAR resource information, and send the RAR resource corresponding to the first random access preamble to a receiving unit, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system;

the receiving unit, configured to receive the RAR resource corresponding to the first random access preamble from the resource determining unit, and receive, on the RAR resource corresponding to the first random access preamble, a media access control MAC packet data unit PDU sent by the base station; and a message determining unit, configured to determine whether the MAC PDU includes the RAR message corresponding to the first random access preamble.

With reference to the fourth aspect, in a first possible implementation manner, the RAR resource is configured by using signaling, where the signaling is sent after the base station or a system presets the RAR resource, and each RAR resource of preset RAR resources corresponds to one or more random access preambles.

With reference to the first possible implementation manner of the fourth aspect, in a second possible implementation manner, the RAR resource configured by using signaling includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

With reference to the first possible implementation manner of the fourth aspect, in a third possible implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

With reference to the third possible implementation manner of the fourth aspect, in a fourth possible implementation manner, if one RAR resource corresponds to only one random access preamble, an RAR message included in the media access control MAC packet data unit PDU transmitted on the RAR resource does not include an identifier for indicating the random access preamble or a random access preamble index.

With reference to the first possible implementation manner of the fourth aspect, in a fifth possible implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

With reference to the fifth possible implementation manner of the fourth aspect, in a sixth possible implementation manner, if one RAR resource corresponds to multiple random access preambles, an RAR message included in the MAC PDU transmitted on the RAR resource includes an identifier for indicating the random access preambles or random access preamble indices, and a length of the identifier is equal to k bits, where k=ceil(log$_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil(log$_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

With reference to the sixth possible implementation manner of the fourth aspect, in a seventh possible implementation manner, the message determining unit is configured to:

if bits corresponding to an RAR resource or an RAR resource index where the RAR message is located are the same as the random access preamble and the first random access preamble, where the random access preamble is indicated by the identifier for indicating the random access preambles or the random access preamble indices and the identifier is included in the RAR message included in the MAC PDU, determine that the MAC PDU includes the RAR message corresponding to the first random access preamble; or, if bits corresponding to an RAR resource or an RAR resource index where the RAR message is located are the same as the random access preamble index and a first random access preamble index determined by user equipment, where the random access preamble index is indicated by the identifier for indicating the random access preambles or the random access preamble indices and the identifier is included in the RAR message included in the MAC PDU, determine that the MAC PDU includes the RAR message corresponding to the first random access preamble; or if a state of an identifier, for indicating a random access preamble or a random access preamble index, included in an RAR message included in the MAC PDU received on the RAR resource corresponding to the first random access preamble is the same as a state of a bits of bits corresponding to the first random access preamble, determine that the MAC PDU includes the RAR message corresponding to the first random access preamble, where a is equal to a quantity of bits of the identifier for indicating the random access preamble or the random access preamble index, and locations of the a bits in bits corresponding to the first random access preamble index are prespecified.

With reference to the seventh possible implementation manner of the fourth aspect, in an eighth possible implementation manner, if the N RAR resources are configured by using signaling or preset by the system, and $N=2^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

With reference to the eighth possible implementation manner of the fourth aspect, in a ninth possible implementation manner, the message determining unit is further configured to:

determine a bit value corresponding to the RAR resource index corresponding to the first random access preamble, where the bit value corresponding to the RAR resource index is preset;

determine a bit value corresponding to the identifier in the MAC PDU;

combine the bit value corresponding to the RAR resource index corresponding to the random access preamble and the bit value corresponding to the identifier in the MAC PDU to obtain the s bits;

determine the random access preamble indicated by the s bits; and determine whether the first random access preamble is the same as the random access preamble indicated by the s bits, and if the first random access preamble is the same as the random access preamble indicated by the s bits, determine that the MAC PDU includes the RAR message corresponding to the first random access preamble, or if the first random access preamble is different from the random access preamble indicated by the s bits, determine that the MAC PDU does not include the RAR message corresponding to the first random access preamble.

With reference to the fourth aspect, in a tenth possible implementation manner, the correspondence between the preamble information and the RAR resource information is a functional relationship, a table relationship or a specified relationship; and the correspondence between the preamble information and the RAR resource information is configured by using signaling or preset by the system, where the correspondence, configured by using signaling or preset by the system, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

With reference to the tenth possible implementation manner of the fourth aspect, in an eleventh possible implementation manner, the correspondence between the preamble information and the RAR resource information includes:

the RAR resource index corresponding to the random access preamble=the random access preamble index mod a quantity of RAR resources configured by using signaling or preset by the system, where herein mod denotes a modulo operation.

With reference to the first possible implementation manner of the fourth aspect, in a twelfth possible implementation manner, random access preambles corresponding to different RAR resources of the RAR resources configured by using signaling are same, or partially same, or completely different.

With reference to the fourth aspect, in a thirteenth possible implementation manner, a quantity of bits of an identifier, for indicating a random access preamble or a random access preamble index, in the RAR message included in the MAC PDU is determined by the base station according to a correspondence between a specified parameter and a random access preamble.

With reference to the thirteenth possible implementation manner of the fourth aspect, in a fourteenth possible implementation manner, the correspondence between the specified parameter and the random access preamble is configured by using signaling or preset by the system, and the quantity of bits of the identifier for indicating the random access preamble or the random access preamble index is configured by using signaling or preset by the system; and the specified parameter includes: a path loss value or range, a reference signal receive power value or range, a reference signal receive quality value or range, a channel quality information value or range, a service type of the user equipment, a power saving type of the user equipment, a delay type of the user equipment or a mobility type of the user equipment.

With reference to the fourth aspect, in a fifteenth possible implementation manner, the RAR message corresponding to the first random access preamble does not include a bit or a field for indicating a temporary identifier, and the temporary identifier includes a cell radio network temporary identifier, or a temporary cell radio network temporary identifier; and/or the RAR message corresponding to the first random access preamble does not include uplink scheduling/grant information; and/or the RAR message corresponding to the first random access preamble includes: a predefined timing advance command, where an adjustment granularity of the predefined timing advance command is greater than a specified adjustment granularity; and/or the correspondence between the preamble information and the RAR resource information further includes one or more cell common parameters, and the cell common parameter includes: a cell identity, a subframe number, a frame number, a timeslot number or an orthogonal frequency-division multiplexing symbol index; and/or a preset timing relationship or a preset time offset exists between a start moment of the time resource occupied in transmitting the RAR message and a start moment of the time resource occupied in transmitting the random access preamble by the user equipment; or, a preset timing relationship or a preset time offset exists between an ending moment of the time resource occupied in transmitting the RAR message and an ending moment of the time resource occupied in transmitting the random access preamble by the user equipment.

With reference to the fourth aspect, in a sixteenth possible implementation manner, the sending unit is further configured to send an RAR reply message to the base station, where the RAR reply message includes a radio resource control RRC connection request, where the RRC connection request includes a bit or a field for indicating a first user identity, and the first user identity is used for distinguishing the user equipment in contention conflict resolution of random access, where a quantity of bits included in the bit or the field for indicating the first user identity is less than a first specified bit quantity.

With reference to the sixteenth possible implementation manner of the fourth aspect, in a seventeenth possible implementation manner, the RRC connection request further includes a predefined establishment cause, and a quantity of bits for indicating the predefined establishment cause is greater than a second specified bit quantity.

With reference to the sixteenth or seventeenth possible implementation manner of the fourth aspect, in an eighteenth possible implementation manner, a resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

With reference to the sixteenth or seventeenth possible implementation manner of the fourth aspect, in a nineteenth possible implementation manner, the resource determining unit is further configured to:

determine, according to a correspondence between a resource or a resource index of the RAR reply message and the preamble information, a resource for sending the RAR reply message; or determine, according to a correspondence between a resource or a resource index of the RAR reply message and the preamble information and a cell common parameter, a resource for sending the RAR reply message; or determine, according to a correspondence between a resource or a resource index of the RAR reply message and the RAR resource information, a resource for sending the RAR reply message; or determine, according to a correspondence between a resource or a resource index of the RAR reply message and the RAR resource information and a cell common parameter, a resource for sending the RAR reply message; or determine, according to a correspondence between a resource or a resource index of the RAR reply message and a specified parameter, a resource for sending the RAR reply message; or determine, according to a correspondence between a resource or a resource index of the RAR reply message and a specified parameter and a cell common parameter, a resource for sending the RAR message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the nineteenth possible implementation manner of the fourth aspect, in a twentieth possible implementation manner, the correspondence between the resource index of the RAR reply message and the preamble information includes:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

With reference to the sixteenth possible implementation manner of the fourth aspect, in a twenty-first possible implementation manner, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

With reference to the fourth aspect, in a twenty-second possible implementation manner, the receiving unit is further configured to receive a contention resolution message sent by the base station, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

With reference to the twenty-second possible implementation manner of the fourth aspect, in a twenty-third possible implementation manner, the contention resolution message further includes: a bit or a field for indicating a temporary identifier, and the temporary identifier includes a cell radio network temporary identifier, or a temporary cell radio network temporary identifier.

With reference to the twenty-second or twenty-third possible implementation manner of the fourth aspect, in a twenty-fourth possible implementation manner, a resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

With reference to the twenty-second or twenty-third possible implementation manner of the fourth aspect, in a twenty-fifth possible implementation manner, the resource determining unit is further configured to:

determine, according to a correspondence between a resource or a resource index of the contention resolution message and the preamble information, a resource for receiving the contention resolution message; or determine, according to a correspondence between a resource or a resource index of the contention resolution message and the preamble information and a cell common parameter, a resource for receiving the contention resolution message; or determine, according to a correspondence between a resource or a resource index of the contention resolution message and the RAR resource information, a resource for receiving the contention resolution message; or determine, according to a correspondence between a resource or a resource index of the contention resolution message and the RAR resource information and a cell common parameter, a resource for receiving the contention resolution message; or determine, according to a correspondence between a resource or a resource index of the contention resolution message and a specified parameter, a resource for receiving the contention resolution message; or determine, according to a correspondence between a resource or a resource index of the contention resolution message and a specified parameter and a cell common parameter, a resource for receiving the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twenty-second possible implementation manner of the fourth aspect, in a twenty-sixth possible implementation manner, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

With reference to the fourth aspect, in a twenty-seventh possible implementation manner, the sending unit is further configured to send a retransmitted RAR reply message to the base station;

and/or, the receiving unit is further configured to receive a contention resolution message retransmitted by the base station.

With reference to the twenty-seventh possible implementation manner of the fourth aspect, in a twenty-eighth possible implementation manner, a size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

With reference to the twenty-seventh possible implementation manner of the fourth aspect, in a twenty-ninth possible implementation manner, the resource determining unit is further configured to:

determine, according to a correspondence between a resource or a resource index of the retransmitted RAR reply message and the preamble information and a preset time offset, a resource for sending the retransmitted RAR reply information; or determine, according to a correspondence between a resource or a resource index of the retransmitted RAR reply message and the preamble information, a preset time offset, and a cell common parameter, a resource for sending the retransmitted RAR reply message; or determine, according to a correspondence between a resource or a resource index of the retransmitted RAR reply message and the RAR resource information and a preset time offset, a resource for sending the retransmitted RAR reply message; or determine, according to a correspondence between a resource or a resource index of the retransmitted RAR reply message and the RAR resource information, a preset time offset, and a cell common parameter, a resource for sending the retransmitted RAR reply message; or determine, according to a correspondence between a resource or a resource index of the retransmitted RAR reply message and a specified parameter and a preset time offset, a resource for sending the retransmitted RAR reply message; or determine, according to a correspondence between a resource or a resource index of the retransmitted RAR reply message and a specified parameter, a preset time offset, and a cell common parameter, a resource for sending the retransmitted RAR reply message, where the cell common parameter includes a cell identity, a subframe number, a frame number, a timeslot number or an orthogonal frequency-division multiplexing symbol index, and the specified parameter includes: a resource index used for sending an RAR reply, a path loss range, a reference signal receive power value or range, a reference signal receive quality value or range, a channel quality information value or range, a service type of the user equipment, a power saving type of the user equipment, a delay type of the user equipment or a mobility type of the user equipment.

With reference to the twenty-seventh possible implementation manner of the fourth aspect, in a thirtieth possible implementation manner, the resource determining unit is further configured to:

determine, according to a correspondence between a resource or a resource index of the retransmitted contention resolution message and the preamble information and a preset time offset, a resource for receiving the retransmitted contention resolution message; or determine, according to a correspondence between a resource or a resource index of the retransmitted contention resolution message and the preamble information, a preset time offset, and a cell common parameter, a resource for receiving the retransmitted contention resolution message; or determine, according to a correspondence between a resource or a resource index of the retransmitted contention resolution message and the RAR resource information and a preset time offset, a resource for receiving the retransmitted contention resolution message; or determine, according to a correspondence between a resource or a resource index of the retransmitted contention resolution message and the RAR resource information, a preset time offset, and a cell common parameter, a resource for receiving the retransmitted contention resolution message; or determine, according to a correspondence between a resource or a resource index of the retransmitted contention resolution message and a specified parameter and a preset time offset, a resource for receiving the retransmitted contention resolution message; or determine, according to a correspondence between a resource or a resource index of the retransmitted contention resolution message and a specified parameter, a preset time offset, and a cell common parameter, a resource for receiving the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to any one of the twenty-seventh to thirtieth possible implementation manners of the fourth aspect, in a thirty-first possible implementation manner, resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

According to a fifth aspect, a base station is provided, where the base station includes:

a bus, and a processor, a memory, and an interface connected to the bus, where the memory is configured to store an instruction;

the interface is configured to receive a random access preamble sent by user equipment;

the processor executes the instruction to:

determine preamble information according to the received random access preamble, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

determine an RAR resource corresponding to the random access preamble according to a correspondence between the preamble information and random access response RAR resource information, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system; and the interface is further configured to send the RAR message corresponding to the random access preamble to the user equipment on the RAR resource corresponding to the random access preamble.

With reference to the fifth aspect, in a first possible implementation manner, the RAR resource is configured by using signaling or preset by the system, and each RAR resource of RAR resources configured by using signaling or preset by the system corresponds to one or more random access preambles.

With reference to the first possible implementation manner of the fifth aspect, in a second possible implementation manner, the RAR resource configured by using signaling or preset by the system includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

With reference to the first possible implementation manner of the fifth aspect, in a third possible implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

With reference to the third possible implementation manner of the fifth aspect, in a fourth possible implementation manner, if one RAR resource corresponds to only one random access preamble, an RAR message included in a media access control MAC packet data unit PDU transmitted on the RAR resource does not include an identifier for indicating the random access preamble or a random access preamble index.

With reference to the first possible implementation manner of the fifth aspect, in a fifth possible implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

With reference to the fifth possible implementation manner of the fifth aspect, in a sixth possible implementation manner, if one RAR resource corresponds to multiple random access preambles, an RAR message included in a MAC PDU transmitted on the RAR resource includes an identifier for indicating the random access preambles or random access preamble indices, and a length of the identifier is equal to k bits, where k=ceil(log$_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil(log$_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

With reference to the fifth possible implementation manner of the fifth aspect, in a seventh possible implementation manner, if the N RAR resources are configured by using signaling or preset by the system, and N=2$^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

With reference to the fifth aspect, in an eighth possible implementation manner, the correspondence between the preamble information and the RAR resource information is a functional relationship, a table relationship or a specified relationship; and the correspondence between the preamble information and the RAR resource information is configured by using signaling or preset by the system, where the signaling includes broadcast or multicast signaling, and the correspondence, configured by using signaling or preset by the system, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

With reference to the eighth possible implementation manner of the fifth aspect, in a ninth possible implementation manner, the correspondence between the preamble information and the RAR resource information includes:

the RAR resource index corresponding to the random access preamble=the random access preamble index mod a quantity of RAR resources configured by using signaling or preset by the system, where herein mod denotes a modulo operation.

With reference to the first possible implementation manner of the fifth aspect, in a tenth possible implementation manner, random access preambles corresponding to different RAR resources of the RAR resources configured by using signaling or preset by the system are same, or partially same, or completely different.

With reference to the fifth aspect, in an eleventh possible implementation manner, the processor executes the instruction to further:

determine, according to a correspondence between a specified parameter and a random access preamble, the random access preamble corresponding to the specified parameter; and determine, according to the random access preamble corresponding to the specified parameter, a quantity of bits of an identifier, for indicating the random access preamble or a random access preamble index, in an RAR message included in a MAC PDU.

With reference to the eleventh possible implementation manner of the fifth aspect, in a twelfth possible implementation manner, the correspondence between the specified parameter and the random access preamble is configured by using signaling or preset by the system, and the random access preamble and the quantity of bits of the identifier for indicating the random access preamble or the random access preamble index are configured by using signaling or preset by the system; and the specified parameter includes: a path loss value or range, a reference signal receive power value or range, a reference signal receive quality value or range, a channel quality information value or range, a service type of the user equipment, a power saving type of the user equipment, a delay type of the user equipment or a mobility type of the user equipment.

With reference to the fifth aspect, in a thirteenth possible implementation manner, the RAR message corresponding to the random access preamble does not include a bit or a field for indicating a temporary identifier, and the temporary identifier includes a cell radio network temporary identifier, or a temporary cell radio network temporary identifier; and/or the RAR message corresponding to the random access preamble does not include uplink scheduling/grant information; and/or the RAR message corresponding to the random access preamble includes: a predefined timing advance command, where an adjustment granularity of the predefined timing advance command is greater than a specified adjustment granularity; and/or the correspondence between the preamble information and the RAR resource information further includes one or more cell common parameters, and the cell common parameter includes: a cell identity, a subframe number, a frame number, a timeslot number or an orthogonal frequency-division multiplexing symbol index; and/or a preset timing relationship or a preset time offset exists between a start moment of the time resource occupied in transmitting the RAR message and a start moment of the time resource occupied in transmitting the random access preamble by the user equipment; or, a preset timing relationship or a preset time offset exists between an ending moment of the time resource occupied in transmitting the RAR message and an ending moment of the time resource occupied in transmitting the random access preamble by the user equipment.

With reference to the fifth aspect, in a fourteenth possible implementation manner, the interface is further configured to receive an RAR reply message sent by the user equipment, where the RAR reply message includes a radio resource control RRC connection request, where the RRC connection request includes a bit or a field for indicating a first user identity, and the first user identity is used for distinguishing the user equipment in contention conflict resolution of random access, where a quantity of bits included in the bit or the field for indicating the first user identity is less than a first specified bit quantity.

With reference to the fourteenth possible implementation manner of the fifth aspect, in a fifteenth possible implementation manner, the RRC connection request further includes a predefined establishment cause, and a quantity of bits for indicating the predefined establishment cause is greater than a second specified bit quantity.

With reference to the thirteenth or fourteenth possible implementation manner of the fifth aspect, in a sixteenth possible implementation manner, a resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

With reference to the thirteenth or fourteenth possible implementation manner of the fifth aspect, in a seventeenth possible implementation manner, the processor executes the instruction to further:

determine, according to a correspondence between a resource or a resource index of the RAR reply message and the preamble information, a resource for receiving the RAR reply message; or determine, according to a correspondence between a resource or a resource index of the RAR reply message and the preamble information and a cell common parameter, a resource for receiving the RAR reply message; or determine, according to a correspondence between a resource or a resource index of the RAR reply message and the RAR resource information, a resource for receiving the RAR reply message; or determine, according to a correspondence between a resource or a resource index of the RAR reply message and the RAR resource information and a cell common parameter, a resource for receiving the RAR reply message; or determine, according to a correspondence between a resource or a resource index of the RAR reply message and a specified parameter, a resource for receiving the RAR reply message; or determine, according to a correspondence between a resource or a resource index of the RAR reply message and a specified parameter and a cell common parameter, a resource for receiving the RAR reply message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the seventeenth possible implementation manner of the fifth aspect, in an eighteenth possible implementation manner, the correspondence between the resource index of the RAR reply message and the preamble information includes:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

With reference to the fourteenth possible implementation manner of the fifth aspect, in a nineteenth possible implementation manner, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

With reference to the fifth aspect, in a twentieth possible implementation manner, the interface is further configured to:

send a contention resolution message to the user equipment, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

With reference to the twentieth possible implementation manner of the fifth aspect, in a twenty-first possible implementation manner, the contention resolution message further includes: a bit or a field for indicating a temporary identifier, and the temporary identifier includes a cell radio network temporary identifier, or a temporary cell radio network temporary identifier.

With reference to the twentieth or twenty-first possible implementation manner of the fifth aspect, in a twenty-second possible implementation manner, a resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

With reference to the twentieth or twenty-first possible implementation manner of the fifth aspect, in a twenty-third possible implementation manner, the processor executes the instruction to further:

determine, according to a correspondence between a resource or a resource index of the contention resolution message and the preamble information, a resource for sending the contention resolution message; or determine, according to a correspondence between a resource or a resource index of the contention resolution message and the preamble information and a cell common parameter, a resource for sending the contention resolution message; or determine, according to a correspondence between a resource or a resource index of the contention resolution message and the RAR resource information, a resource for sending the contention resolution message; or determine, according to a correspondence between a resource or a resource index of the contention resolution message and the RAR resource information and a cell common parameter, a resource for sending the contention resolution message; or determine, according to a correspondence between a resource or a resource index of the contention resolution message and a specified parameter, a resource for sending the contention resolution message; or determine, according to a correspondence between a resource or a resource index of the contention resolution message and a specified parameter and a cell common parameter, a resource for sending the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twentieth possible implementation manner of the fifth aspect, in a twenty-fourth possible implementation manner, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

With reference to the fifth aspect, in a twenty-fifth possible implementation manner, the interface is further configured to:

receive an RAR reply message retransmitted by the user equipment; and/or send a retransmitted contention resolution message to the user equipment.

With reference to the twenty-fifth possible implementation manner of the fifth aspect, in a twenty-sixth possible implementation manner, a size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

With reference to the twenty-fifth possible implementation manner of the fifth aspect, in a twenty-seventh possible implementation manner, the processor executes the instruction to further:

determine, according to a correspondence between a resource or a resource index of the retransmitted RAR reply message and the preamble information and a preset time offset, a resource for receiving the retransmitted RAR reply information; or determine, according to a correspondence between a resource or a resource index of the retransmitted RAR reply message and the preamble information, a preset time offset, and a cell common parameter, a resource for receiving the retransmitted RAR reply message; or determine, according to a correspondence between a resource or a resource index of the retransmitted RAR reply message and the RAR resource information and a preset time offset, a resource for receiving the retransmitted RAR reply message; or determine, according to a correspondence between a resource or a resource index of the retransmitted RAR reply message and the RAR resource information, a preset time offset, and a cell common parameter, a resource for receiving the retransmitted RAR reply message; or determine, according to a correspondence between a resource or a resource index of the retransmitted RAR reply message and a specified parameter and a preset time offset, a resource for receiving the retransmitted RAR reply message; or determine, according to a correspondence between a resource or a resource index of the retransmitted RAR reply message and a specified parameter, a preset time offset, and a cell common parameter, a resource for receiving the retransmitted RAR reply message, where the cell common parameter includes a cell identity, a subframe number, a frame number, a timeslot number or an orthogonal frequency-division multiplexing symbol index, the specified parameter includes: a resource index used for sending an RAR reply, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twenty-fifth or twenty-sixth possible implementation manner of the fifth aspect, in a twenty-eighth possible implementation manner, the processor executes the instruction to further:

determine, according to a correspondence between a resource or a resource index of the retransmitted contention resolution message and the preamble information and a preset time offset, a resource for sending the retransmitted contention resolution message; or determine, according to a correspondence between a resource or a resource index of the retransmitted contention resolution message and the preamble information, a preset time offset, and a cell common parameter, a resource for sending the retransmitted contention resolution message; or determine, according to a correspondence between a resource or a resource index of the retransmitted contention resolution message and the RAR resource information and a preset time offset, a resource for sending the retransmitted contention resolution message; or determine, according to a correspondence between a resource or a resource index of the retransmitted contention resolution message and the RAR resource information, a preset time offset, and a cell common parameter, a resource for sending the retransmitted contention resolution message; or determine, according to a correspondence between a resource or a resource index of the retransmitted contention resolution message and a specified parameter and a preset time offset, a resource for sending the retransmitted contention resolution message; or determine, according to a correspondence between a resource or a resource index of the retransmitted contention resolution message and a specified parameter, a preset time offset, and a cell common parameter, a resource for sending the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to any one of the twenty-fifth to twenty-eighth possible implementation manners of the fifth aspect, in a twenty-ninth possible implementation manner, resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

With reference to the twenty-ninth possible implementation manner of the fifth aspect, in a thirtieth possible implementation manner, if the resource used for transmitting the first information is configured by using signaling, the interface is further configured to:

send configuration signaling to the user equipment, where the configuration signaling is used for notifying the user equipment of a resource configuration used in transmission of the first information.

According to a sixth aspect, user equipment is provided, where the user equipment includes: a bus, and a processor, a memory, and an interface connected to the bus, where the memory is configured to store an instruction;

the processor executes the instruction to determine a random access preamble;

the interface is configured to send the first random access preamble to a base station;

the processor executes the instruction to further:

determine preamble information according to the first random access preamble, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble; and determine an RAR resource corresponding to the first random access preamble according to a correspondence between the preamble information and random access response RAR resource information, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system;

the interface is further configured to receive, on the RAR resource corresponding to the first random access preamble, a media access control MAC packet data unit PDU sent by the base station; and the processor executes the instruction to further determine whether the MAC PDU includes the RAR message corresponding to the first random access preamble.

With reference to the sixth aspect, in a first possible implementation manner, the RAR resource is configured by using signaling, where the signaling is sent after the base station or a system presets the RAR resource, and each RAR resource of preset RAR resources corresponds to one or more random access preambles.

With reference to the first possible implementation manner of the sixth aspect, in a second possible implementation manner, the RAR resource configured by using signaling includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

With reference to the first possible implementation manner of the sixth aspect, in a third possible implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

With reference to the third possible implementation manner of the sixth aspect, in a fourth possible implementation manner, if one RAR resource corresponds to only one random access preamble, an RAR message included in the media access control MAC packet data unit PDU transmitted on the RAR resource does not include an identifier for indicating the random access preamble or a random access preamble index.

With reference to the first possible implementation manner of the sixth aspect, in a fifth possible implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

With reference to the fifth possible implementation manner of the sixth aspect, in a sixth possible implementation manner, if one RAR resource corresponds to multiple random access preambles, an RAR message included in the MAC PDU transmitted on the RAR resource includes an identifier for indicating the random access preambles or random access preamble indices, and a length of the identifier is equal to k bits, where k=ceil(log$_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil(log$_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

With reference to the sixth possible implementation manner of the sixth aspect, in a seventh possible implementation manner, the processor executes the instruction to further:

if bits corresponding to an RAR resource or an RAR resource index where the RAR message is located are the same as the random access preamble and the first random access preamble, where the random access preamble is indicated by the identifier for indicating the random access preambles or the random access preamble indices and the identifier is included in the RAR message included in the MAC PDU, determine that the MAC PDU includes the RAR message corresponding to the first random access preamble; or, if bits corresponding to an RAR resource or an RAR resource index where the RAR message is located are the same as the random access preamble index and a first random access preamble index determined by user equipment, where the random access preamble index is indicated by the identifier for indicating the random access preambles or the random access preamble indices and the identifier is included in the RAR message included in the MAC PDU, determine that the MAC PDU includes the RAR message corresponding to the first random access preamble; or if a state of an identifier, for indicating a random access preamble or a random access preamble index, included in an RAR message included in the MAC PDU received on the RAR resource corresponding to the first random access preamble is the same as a state of a bits of bits corresponding to the first random access preamble, determine that the MAC PDU includes the RAR message corresponding to the first random access preamble, where a is equal to a quantity of bits of the identifier for indicating the random access preamble or the random access preamble index, and locations of the a bits in bits corresponding to the first random access preamble index are prespecified.

With reference to the fifth possible implementation manner of the sixth aspect, in an eighth possible implementation manner, if the N RAR resources are configured by using signaling or preset by the system, and N=2$^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

With reference to the eighth possible implementation manner of the sixth aspect, in a ninth possible implementation manner, the processor executes the instruction to further:

determine a bit value corresponding to the RAR resource index corresponding to the first random access preamble, where the bit value corresponding to the RAR resource index is preset;

determine a bit value corresponding to the identifier in the MAC PDU;

combine the bit value corresponding to the RAR resource index corresponding to the random access preamble and the bit value corresponding to the identifier in the MAC PDU to obtain the s bits;

determine the random access preamble indicated by the s bits; and determine whether the first random access preamble is the same as the random access preamble indicated by the s bits, and if the first random access preamble is the same as the random access preamble indicated by the s bits, determine that the MAC PDU includes the RAR message corresponding to the first random access preamble, or if the first random access preamble is different from the random access preamble indicated by the s bits, determine that the MAC PDU does not include the RAR message corresponding to the first random access preamble.

With reference to the sixth aspect, in a tenth possible implementation manner, the correspondence between the preamble information and the RAR resource information is a functional relationship, a table relationship or a specified relationship; and the correspondence between the preamble information and the RAR resource information is configured by using signaling or preset by the system, and the correspondence, configured by using signaling or preset by the system, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

With reference to the tenth possible implementation manner of the sixth aspect, in an eleventh possible implementation manner, the correspondence between the preamble information and the RAR resource information includes:

the RAR resource index corresponding to the random access preamble=the random access preamble index mod a quantity of RAR resources configured by using signaling or preset by the system, where herein mod denotes a modulo operation.

With reference to the first possible implementation manner of the sixth aspect, in a twelfth possible implementation manner, random access preambles corresponding to different RAR resources of the RAR resources configured by using signaling are same, or partially same, or completely different.

With reference to the sixth aspect, in a thirteenth possible implementation manner, a quantity of bits of an identifier, for indicating a random access preamble or a random access preamble index, in the RAR message included in the MAC PDU is determined by the base station according to a correspondence between a specified parameter and a random access preamble.

With reference to the thirteenth possible implementation manner of the sixth aspect, in a fourteenth possible implementation manner, the correspondence between the specified parameter and the random access preamble is configured by using signaling or preset by the system, and the quantity of bits of the identifier for indicating the random access preamble or the random access preamble index is configured by using signaling or preset by the system; and the specified parameter includes: a path loss value or range, a reference signal receive power value or range, a reference signal receive quality value or range, a channel quality information value or range, a service type of the user equipment, a power saving type of the user equipment, a delay type of the user equipment or a mobility type of the user equipment.

With reference to the sixth aspect, in a fifteenth possible implementation manner, the RAR message corresponding to the first random access preamble does not include a bit or a field for indicating a temporary identifier, and the temporary identifier includes a cell radio network temporary identifier, or a temporary cell radio network temporary identifier; and/or the RAR message corresponding to the first random access preamble does not include uplink scheduling/grant information; and/or the RAR message corresponding to the first random access preamble includes: a predefined timing advance command, where an adjustment granularity of the predefined timing advance command is greater than a specified adjustment granularity; and/or the correspondence between the preamble information and the RAR resource information further includes one or more cell common parameters, and the cell common parameter includes: a cell identity, a subframe number, a frame number, a timeslot number or an orthogonal frequency-division multiplexing symbol index; and/or a preset timing relationship or a preset time offset exists between a start moment of the time resource occupied in transmitting the RAR message and a start moment of the time resource occupied in transmitting the random access preamble by the user equipment; or, a preset timing relationship or a preset time offset exists between an ending moment of the time resource occupied in transmitting the RAR message and an ending moment of the time resource occupied in transmitting the random access preamble by the user equipment.

With reference to the sixth aspect, in a sixteenth possible implementation manner, the interface is further configured to:

send an RAR reply message to the base station, where the RAR reply message includes a radio resource control RRC connection request, where the RRC connection request includes a bit or a field for indicating a first user identity, and the first user identity is used for distinguishing the user equipment in contention conflict resolution of random access, where a quantity of bits included in the bit or the field for indicating the first user identity is less than a first specified bit quantity.

With reference to the sixteenth possible implementation manner of the sixth aspect, in a seventeenth possible implementation manner, the RRC connection request further includes a predefined establishment cause, and a quantity of bits for indicating the predefined establishment cause is greater than a second specified bit quantity.

With reference to the sixteenth or seventeenth possible implementation manner of the sixth aspect, in an eighteenth possible implementation manner, a resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

With reference to the sixteenth or seventeenth possible implementation manner of the sixth aspect, in a nineteenth possible implementation manner, the processor executes the instruction to further:

determine, according to a correspondence between a resource or a resource index of the RAR reply message and the preamble information, a resource for sending the RAR reply message; or determine, according to a correspondence between a resource or a resource index of the RAR reply message and the preamble information and a cell common parameter, a resource for sending the RAR reply message; or determine, according to a correspondence between a resource or a resource index of the RAR reply message and the RAR resource information, a resource for sending the RAR reply message; or determine, according to a correspondence between a resource or a resource index of the RAR reply message and the RAR resource information and a cell common parameter, a resource for sending the RAR reply message; or determine, according to a correspondence between a resource or a resource index of the RAR reply message and a specified parameter, a resource for sending the RAR reply message; or determine, according to a correspondence between a resource or a resource index of the RAR reply message and a specified parameter and a cell common parameter, a resource for sending the RAR message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the nineteenth possible implementation manner of the sixth aspect, in a twentieth possible implementation manner, the correspondence between the resource index of the RAR reply message and the preamble information includes:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

With reference to the sixteenth possible implementation manner of the sixth aspect, in a twenty-first possible implementation manner, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

With reference to the sixth aspect, in a twenty-second possible implementation manner, the interface is further configured to:

receive a contention resolution message sent by the base station, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

With reference to the twenty-second possible implementation manner of the sixth aspect, in a twenty-third possible implementation manner, the contention resolution message further includes: a bit or a field for indicating a temporary identifier, and the temporary identifier includes a cell radio network temporary identifier, or a temporary cell radio network temporary identifier.

With reference to the twenty-second or twenty-third possible implementation manner of the sixth aspect, in a twenty-fourth possible implementation manner, a resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

With reference to the twenty-second or twenty-third possible implementation manner of the sixth aspect, in a twenty-fifth possible implementation manner, the processor executes the instruction to further:

determine, according to a correspondence between a resource or a resource index of the contention resolution message and the preamble information, a resource for receiving the contention resolution message; or determine, according to a correspondence between a resource or a resource index of the contention resolution message and the preamble information and a cell common parameter, a resource for receiving the contention resolution message; or determine, according to a correspondence between a resource or a resource index of the contention resolution message and the RAR resource information, a resource for receiving the contention resolution message; or determine, according to a correspondence between a resource or a resource index of the contention resolution message and the RAR resource information and a cell common parameter, a resource for receiving the contention resolution message; or determine, according to a correspondence between a resource or a resource index of the contention resolution message and a specified parameter, a resource for receiving the contention resolution message; or determine, according to a correspondence between a resource or a resource index of the contention resolution message and a specified parameter and a cell common parameter, a resource for receiving the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to the twenty-second possible implementation manner of the sixth aspect, in a twenty-sixth possible implementation manner, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

With reference to the sixth aspect, in a twenty-seventh possible implementation manner, the interface is further configured to:

send a retransmitted RAR reply message to the base station; and/or receive a contention resolution message retransmitted by the base station.

With reference to the twenty-seventh possible implementation manner of the sixth aspect, in a twenty-eighth possible implementation manner, a size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

With reference to the twenty-seventh possible implementation manner of the sixth aspect, in a twenty-ninth possible implementation manner, the processor executes the instruction to further:

determine, according to a correspondence between a resource or a resource index of the retransmitted RAR reply message and the preamble information and a preset time offset, a resource for sending the retransmitted RAR reply information; or determine, according to a correspondence between a resource or a resource index of the retransmitted RAR reply message and the preamble information, a preset time offset, and a cell common parameter, a resource for sending the retransmitted RAR reply message; or determine, according to a correspondence between a resource or a resource index of the retransmitted RAR reply message and the RAR resource information and a preset time offset, a resource for sending the retransmitted RAR reply message; or determine, according to a correspondence between a resource or a resource index of the retransmitted RAR reply message and the RAR resource information, a preset time offset, and a cell common parameter, a resource for sending the retransmitted RAR reply message; or determine, according to a correspondence between a resource or a resource index of the retransmitted RAR reply message and a specified parameter and a preset time offset, a resource for sending the retransmitted RAR reply message; or determine, according to a correspondence between a resource or a resource index of the retransmitted RAR reply message and a specified parameter, a preset time offset, and a cell common parameter, a resource for sending the retransmitted RAR reply message, where the cell common parameter includes a cell identity, a subframe number, a frame number, a timeslot number or an orthogonal frequency-division multiplexing symbol index, and the specified parameter includes: a resource index used for sending an RAR reply, a path loss range, a reference signal receive power value or range, a reference signal receive quality value or range, a channel quality information value or range, a service type of the user equipment, a power saving type of the user equipment, a delay type of the user equipment or a mobility type of the user equipment.

With reference to the twenty-seventh possible implementation manner of the sixth aspect, in a thirtieth possible implementation manner, the processor executes the instruction to further:

determine, according to a correspondence between a resource or a resource index of the retransmitted contention resolution message and the preamble information and a preset time offset, a resource for receiving the retransmitted contention resolution message; or determine, according to a correspondence between a resource or a resource index of the retransmitted contention resolution message and the preamble information, a preset time offset, and a cell common parameter, a resource for receiving the retransmitted contention resolution message; or determine, according to a correspondence between a resource or a resource index of the retransmitted contention resolution message and the RAR resource information and a preset time offset, a resource for receiving the retransmitted contention resolution message; or determine, according to a correspondence between a resource or a resource index of the retransmitted contention resolution message and the RAR resource information, a preset time offset, and a cell common parameter, a resource for receiving the retransmitted contention resolution message; or determine, according to a correspondence between a resource or a resource index of the retransmitted contention resolution message and a specified parameter and a preset time offset, a resource for receiving the retransmitted contention resolution message; or determine, according to a correspondence between a resource or a resource index of the retransmitted contention resolution message and a specified parameter, a preset time offset, and a cell common parameter, a resource for receiving the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

With reference to any one of the twenty-seventh to thirtieth possible implementation manners of the sixth aspect, in a thirty-first possible implementation manner, resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

By means of the method for predetermining a resource in random access, the user equipment, and the base station that are provided in the embodiments of the present disclosure, an implicit manner is used to indicate an identifier of a random access preamble index, and a quantity of bits of the identifier of the random access preamble index is reduced, so that an RAR message can be simplified; or, a random access preamble may be set according to a specified parameter, and a quantity of bits of an identifier of a corresponding random access preamble index is then set according to the set random access preamble; or, it may be made that an RAR message does not include a bit or a field for indicating a temporary identifier; or, it may be made that an RAR message does not include uplink scheduling/grant information; or, a timing advance command may be predefined, where an adjustment granularity of the predefined timing advance command is greater than a specified adjustment granularity, a message in a procedure of random access is simplified, and at the same time resources used for transmitting an RAR reply message, transmitting a contention resolution message, retransmitting an RAR reply message, and retransmitting a contention resolution message are preset, so that it is no longer necessary to allocate a resource through scheduling, thereby simplifying the process of random access, and improving reliability of information transmission in the process of random access.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

A method for predetermining a resource in a process of random access provided in the embodiments of the present disclosure is applicable to a scenario of machine-type communication, for example, applicable to a procedure of random access of an LTE system. The LTE system may include UE and a base station, where the base station may be an eNB (evolved Node B, evolved node B). In the following embodiments, the LTE system is used as an example to describe in detail the method for predetermining a resource in a process of random access provided in the embodiments of the present disclosure. For ease of description, in the embodiments below, the user equipment is referred to as UE in short, and a random access response is referred to as an RAR in short.

It should be noted that in the embodiments of the present disclosure, user equipment may be a terminal (Terminal), a mobile station (Mobile Station, MS), a mobile terminal (Mobile Terminal), and the like. The user equipment may communicate with one or more core networks by using a radio access network (Radio Access Network, RAN). For example, the user equipment may be a mobile phone (or referred to as a "cellular" phone), or a computer with a mobile terminal; for example, the user equipment may be a portable, pocket-sized, handheld, computer built-in, or in-vehicle mobile apparatus.

Figure 1:
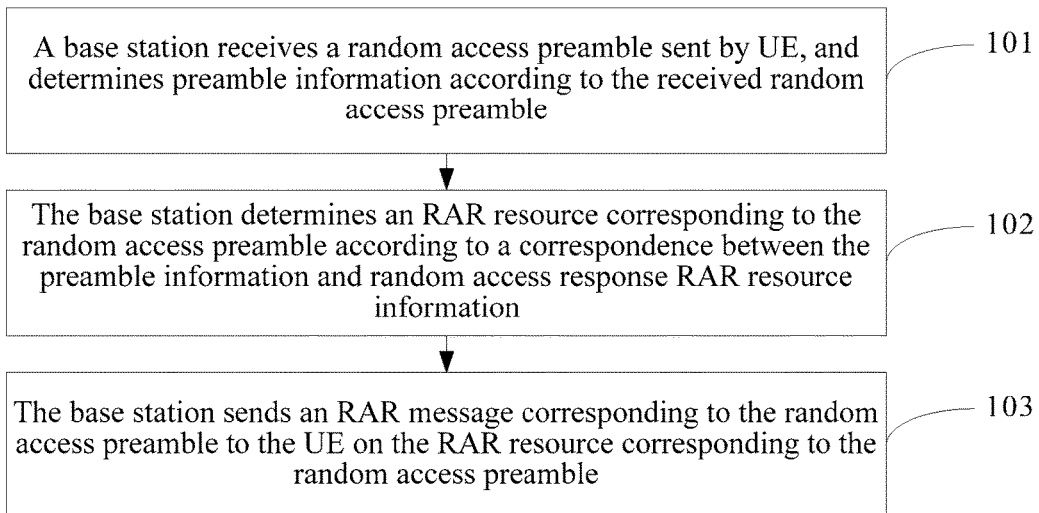
FIG. 1 is a schematic flowchart of a method for predetermining a resource in random access according to an embodiment of the present disclosure.

An embodiment of the present disclosure provides a method for predetermining a resource in a process of random access. As shown in FIG. 1, the method includes:

101: A base station receives a random access preamble sent by UE, and determines preamble information according to the received random access preamble.

The preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble.

102: The base station determines an RAR resource corresponding to the random access preamble according to a correspondence between the preamble information and random access response RAR resource information.

The RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system.

103: The base station sends the RAR message corresponding to the random access preamble to the UE on the RAR resource corresponding to the random access preamble.

Figure 2:
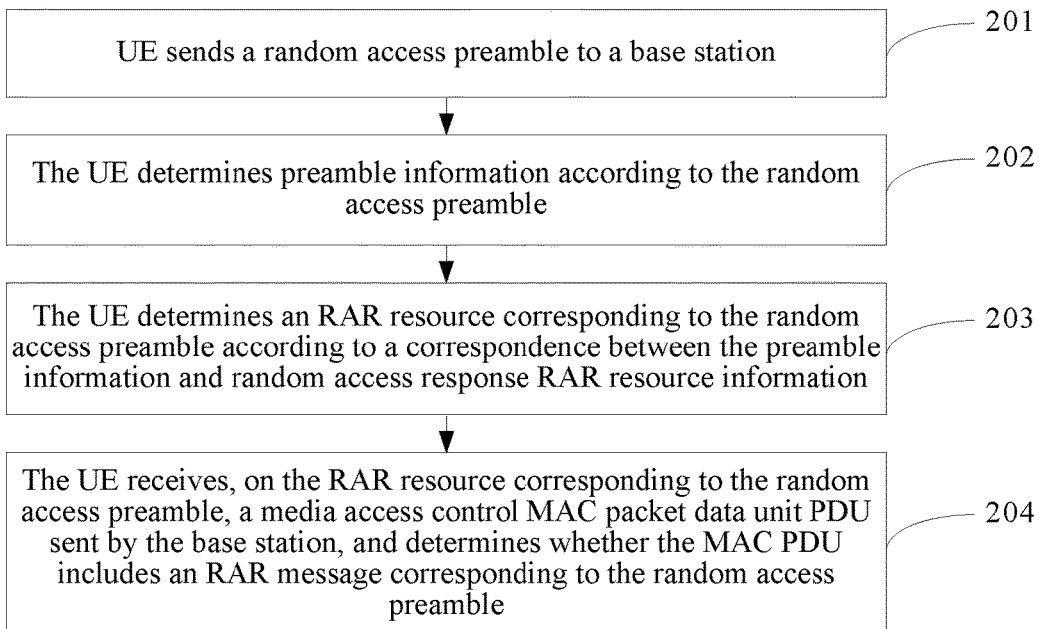
FIG. 2 is a schematic flowchart of a method for predetermining a resource in random access according to an embodiment of the present disclosure.

The foregoing method is a method based on a base station side. A implementation example further provides a method for predetermining a resource in a process of random access, where the method is based on a UE side. As shown in FIG. 2, the method includes:

201: UE determines a random access preamble, and sends the determined first random access preamble to a base station.

202: The UE determines preamble information according to the first random access preamble.

The preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble.

203: The UE determines an RAR resource corresponding to the first random access preamble according to a correspondence between the preamble information and random access response RAR resource information.

The RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system.

It should be noted that in this embodiment of the present disclosure, a resource being configured by using signaling means that the resource is configured by the base station. After configuring the resource, the base station notifies the user equipment of the configured resource by sending a signaling message to the user equipment. A resource being preset by a system means that the resource is preset by the system, and the preset resource may be saved in the base station and the user equipment in a form of a protocol. Therefore, the preset resource is known to both the base station and the user equipment, where the resource in this embodiment of the present disclosure includes an RAR resource, and a resource used for transmitting a message between the base station and the user equipment.

204: The UE receives, on the RAR resource corresponding to the first random access preamble, a media access control MAC packet data unit PDU sent by the base station, and determines whether the MAC PDU includes an RAR message corresponding to the first random access preamble.

The "first" in the "first random access preamble" mentioned in the present disclosure neither means a specific random access preamble, nor means an order of random access preambles, and is only used for conveniently distinguishing a random access preamble sent by the UE from another random access preamble.

By means of the method for predetermining a resource in random access provided in this embodiment of the present disclosure, an implicit manner is used to indicate an identifier of a random access preamble index, and a quantity of bits of the identifier of the random access preamble index is reduced, so that an RAR message can be simplified, thereby implementing simplification of a process of random access, and improving reliability of information transmission in the process of random access.

Figure 3:
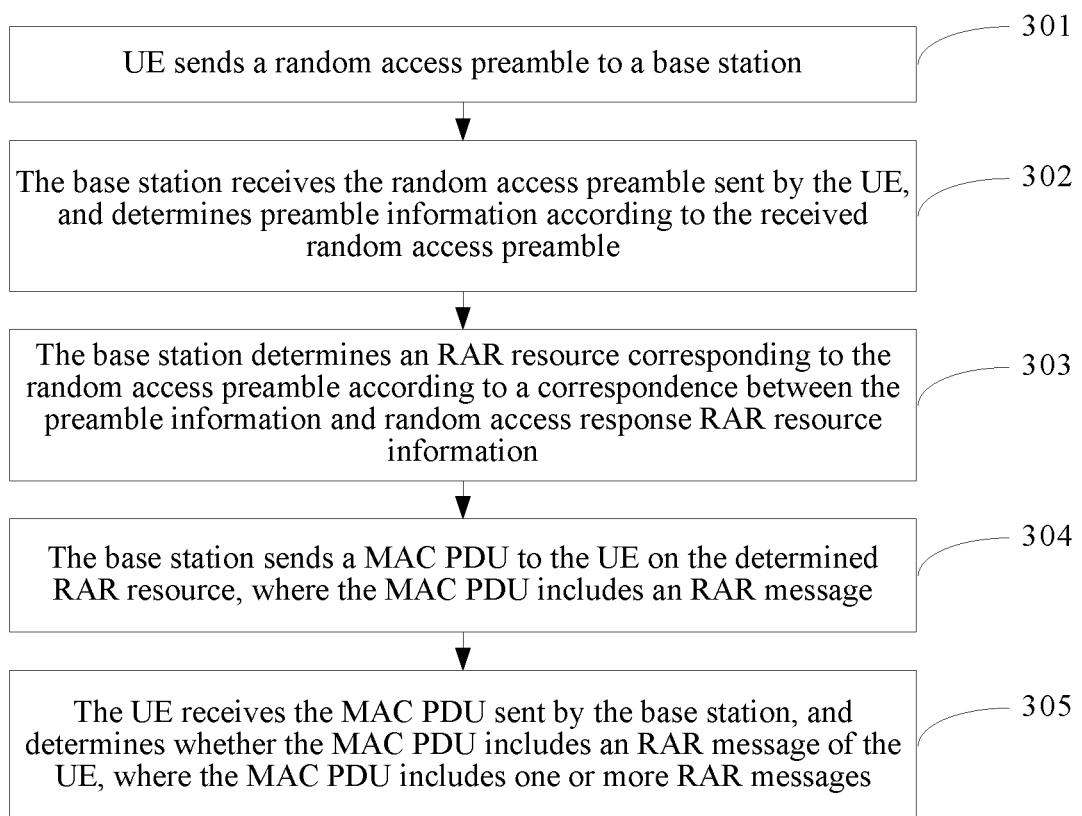
FIG. 3 is a schematic flowchart of a method for predetermining a resource in random access according to an embodiment of the present disclosure.

To enable a person skilled in the art to understand technical solutions provided in the embodiments of the present disclosure more clearly, by means of specific embodiments below, a method for predetermining a resource in random access provided in an embodiment of the present disclosure is described in detail. As shown in FIG. 3, the method includes:

301: UE sends a random access preamble to a base station.

Exemplarily, when initiating a random access process to the base station, the UE sends the random access preamble to the base station. Exemplarily, the random access process may be a contention-based random access.

302: The base station receives the random access preamble sent by the UE, and determines preamble information according to the received random access preamble.

The preamble information may include one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble. The start time resource in the time resource used for transmitting the random access preamble may be a start physical resource block used for transmitting the random access preamble, and the start frequency resource used for transmitting the random access preamble may be a start radio frame and/or subframe in the time resource used for transmitting the random access preamble.

Exemplarily, it is assumed that in this embodiment of the present disclosure, the preamble information is the random access preamble index (Index). Each random access preamble corresponds to one random access preamble index, and the index may be understood as a sequence number of the random access preamble. Therefore, the corresponding random access preamble index may be determined according to the random access preamble.

303: The base station determines an RAR resource corresponding to the random access preamble according to a correspondence between the preamble information and random access response RAR resource information.

The RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message. The correspondence between the preamble information and the RAR resource information may be a functional relationship, a table relationship or a specified relationship.

Exemplarily, it is assumed that in this embodiment of the present disclosure, the RAR resource information is the RAR resource index. Each RAR resource corresponds to one RAR resource index, and the index may be understood as a sequence number of the RAR resource. Therefore, a corresponding RAR resource index may be determined according to the RAR resource. In this case, the correspondence between the preamble information and the RAR resource information becomes a correspondence between the random access preamble index and the RAR resource index (the correspondence between the random access preamble index and the RAR resource index is used as an example hereinafter, but is merely exemplary and constitutes no limitation to the correspondence).

The RAR resource is configured by using signaling or preset by a system. Configuration by using signaling means that the RAR resource is configured by the base station, and after configuration, a signaling message is sent to notify the user equipment of the configured RAR resource. Being preset by a system means being preset by the system, and the RAR resource is known to the base station and the user equipment. The foregoing signaling may be broadcast or multicast signaling, and the RAR resource may include: a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

The correspondence between the preamble information and the RAR resource information may also be configured by using signaling or preset by the system, and each RAR resource of preset RAR resources corresponds to one or more random access preambles. A specific configuration method is the same as a method for configuring an RAR resource, and details are no longer described. The signaling may also be broadcast or multicast signaling, and exemplarily the broadcast or multicast signaling may be: a master system information block (Master Information Block, MIB), or a system information block (System Information Block, SIB), or RRC signaling.

Exemplarily, if N RAR resources are configured by using signaling or preset by the system, and the N RAR resources correspond to N random access preambles (where N is a positive integer greater than 1), each random access preamble index corresponds to one RAR resource index, and RAR resource indices corresponding to different random access preamble indices are different.

In this case, because a one-to-one correspondence exists between the RAR resource index and the random access preamble index, after the random access preamble sent by the UE is received, the RAR resource corresponding to the random access preamble can be directly determined. In this case, because a preset one-to-one correspondence exists between the random access preamble and the RAR resource, an RAR message included in a media access control package data unit (MAC PDU) transmitted by the base station on the determined RAR resource does not include an identifier (Random Access Preamble Identifier, RAPID) for indicating the random access preamble or the random access preamble index. In this way, a relationship between the random access preamble and the RAR resource is indicated in an implicit manner, thereby simplifying the RAR message.

If N RAR resources are configured by using signaling or preset by the system, and the N RAR resources correspond to M random access preambles (where N and M are positive integers greater than 1, and M>N), each RAR resource index corresponds to at least one random access preamble index, and there is at least one RAR resource index that corresponds to multiple random access preamble indices. In this case, a quantity of bits of the RAPID included in the RAR message may be determined in a following manner:

If one RAR resource corresponds to multiple random access preambles, a length of an RAPID included in an RAR message included in a MAC PDU transmitted on the RAR resource is equal to k bits, where k=ceil($\log_2$(a quantity of random access preambles corresponding to the RAR resource)), herein ceil denotes a function of rounding up, and log denotes a logarithmic function.

Alternatively, a length of an RAPID included in an RAR message included in a MAC PDU transmitted on the RAR resource is less than or equal to h bits, where h=ceil($\log_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

In this case, the correspondence between the preamble information and the RAR resource information may be set to be a following functional relationship:

the RAR resource index=the random access preamble index mod a quantity of RAR resources configured by using signaling or preset by the system, where mod refers to a modulo operation.

Exemplarily, it is assumed that 64 random access preambles (indices of the 64 random access preambles are 0 to 63) are configured, and four RAR resources (indices of the four RAR resources are 0 to 3) are correspondingly configured for the 64 random access preambles.

The foregoing correspondence between the preamble information and the RAR resource information may be written as:

the RAR resource index=the random access preamble index mod 4, and according to the foregoing functional relationship, it may be obtained through calculation that:

preambles whose preamble indices are 0, 4, 8, 12, 16, 20, 24, 28, 32, 36, 40, 44, 48, 52, 56, and 60 correspond to a first RAR resource (that is, correspond to an RAR resource whose index is 0);

preambles whose preamble indices are 1, 5, 9, 13, 17, 21, 25, 29, 33, 37, 41, 45, 49, 53, 57, and 61 correspond to a second RAR resource (that is, correspond to an RAR resource whose index is 1);

preambles whose preamble indices are 2, 6, 10, 14, 18, 22, 26, 30, 34, 38, 42, 46, 50, 54, 58, and 62 correspond to a third RAR resource (that is, correspond to an RAR resource whose index is 2); and preambles whose preamble indices are 3, 7, 11, 15, 19, 23, 27, 31, 35, 39, 43, 47, 51, 55, 59, and 63 correspond to a fourth RAR resource (that is, correspond to an RAR resource whose index is 3).

It is assumed that a random access preamble index of the random access preamble that is sent by the UE and that is received by the base station is 9, and it may be determined according to the foregoing relationship that a resource for sending an RAR to the UE is the RAR resource whose index is 1. In this way, 64 random access preamble indices are grouped into four groups, and each group has 16 random access preamble indices. In this way, after receiving the RAR message on the determined RAR resource, the UE may determine, according to an index number of the resource that transmits the RAR, that the RAR resource corresponds to 16 preambles. In this case, the RAPID included in the RAR message needs only four bits to indicate the random access preamble corresponding to the RAR message. Compared with the prior art in which a 6-bit RAPID is required for 64 random access preambles to indicate the random access preamble corresponding to the RAR message received by the UE, this method simplifies the RAR message.

Certainly, random access preambles corresponding to different RAR resources of preset RAR resources may be same, or partially same, or completely different. If 61 random access preambles (indices of the 61 random access preambles are 0 to 60) are configured, and four RAR resources are correspondingly configured for the 61 random access preambles. In this case, one of the four groups obtained by grouping the 61 random access preambles has only 16 random access preambles, that is, the RAR resource whose index is 0 corresponds to 16 random access preambles, and each of the RAR resources whose indices are 1 to 3 corresponds to 15 random access preambles. According to h=ceil(log$_2$(max(a quantity of random access preambles corresponding to a first RAR resource, a quantity of random access preambles corresponding to a second RAR resource, . . . , a quantity of random access preambles corresponding to an Nth RAR resource))), in this case, four bits are also needed to indicate the random access preamble corresponding to the RAR message.

Alternatively, in another implementation manner, M random access preambles of N RAR resources are configured by using signaling or preset by the system, where N<M, and N=2k. In this case, an index of the RAPID is indicated by s bits, where k bits of the s bits are determined according to k bits corresponding to an RAR resource index corresponding to the RAPID, and the rest (s-k) bits of the s bits are determined by using the RAPID.

Exemplarily, it is still assumed that 64 random access preambles (indices of the 64 random access preambles are 0 to 63) are configured, and four RAR resources are correspondingly configured for the 64 random access preambles. The foregoing s bits are six bits, where two bits (may are higher two bits or lower two bits) may be determined according to a quantity of bits corresponding to an RAR resource, and herein the quantity of bits corresponding to the RAR resource is preset, for example, may be shown in Table 1:

TABLE 1

| 2 bits of s bits | Corresponding RAR resource |
| --- | --- |
| 00 | RAR resource whose index is 0 |
| 01 | RAR resource whose index is 1 |
| 10 | RAR resource whose index is 2 |
| 11 | RAR resource whose index is 3 |

In indication of the 64 random access preambles, originally six bits are needed to indicate the RAPID. However, because two bits are already implicitly determined by the RAR resource, in this case, only four bits are needed to indicate the RAPID included in the RAR message.

It can be seen that according to the foregoing method, an RAR message can be simplified without sending an RAPID or reducing a quantity of bits of an RAPID.

304: The base station sends a MAC PDU to the UE on the determined RAR resource, where the MAC PDU includes an RAR message.

Exemplarily, if N RAR resources are configured by using signaling or preset by the system, and the N RAR resources correspond to N random access preambles, the RAR message does not include the RAPID.

If N RAR resources are configured by using signaling or preset by the system, and the N RAR resources correspond to M random access preambles (where N and M are positive integers greater than 1, and M>N), the RAR message includes the RAPID (simplified RAPID, and a simplified process is shown in 303).

305: The UE receives the MAC PDU sent by the base station, and determines whether the MAC PDU includes an RAR message of the UE. The MAC PDU includes one or more RAR messages.

Exemplarily, if N RAR resources are configured by using signaling or preset by the system, and the N RAR resources correspond to N random access preambles, the RAR message received by the UE does not include the RAPID. Because in this case, the correspondence between the random access preamble index and the RAR resource index is a one-to-one correspondence, a corresponding random access preamble can be determined according to the RAR resource for receiving the RAR message, and the UE then determines whether the random access preamble is the same as the random access preamble sent to the base station in step 301. If the random access preamble is the same as the random access preamble sent to the base station in step 301, the UE may determine that the RAR message is the RAR message of the UE.

Alternatively, if N RAR resources are configured by signaling or preset by the system, and the N RAR resources correspond to M random access preambles (where N and M are positive integers greater than 1, and M>N), the RAR message received by the UE includes the RAPID. The setting of the N RAR resources may be configured in terms of at least one dimension of three dimensions: time, frequency, and codeword. In this case, the UE may determine in a following manner whether a received RAR message is the RAR message of the UE:

In an implementation manner, the UE may first determine at least one random access preamble corresponding to the RAR resource according to the RAR resource used for receiving an RAR message. When the RAR resource corresponds to multiple random access preambles, a specific RAPID is further determined according to the RAPID in the RAR message received on the RAR resource.

Exemplarily, it is still assumed that 64 random access preambles (indices of the 64 random access preambles are 0 to 63) are configured, and four RAR resources are correspondingly configured for the 64 random access preambles.

It is assumed that an index of the random access preamble sent by the UE to the base station in step 301 is 33, and it is assumed that an index of an RAR resource used for an RAR message received by the UE is 1, and the RAPID in the RAR message is 1001. The UE first determines, according to that the index of the RAR resource used for the received RAR message is 1, that indices of random access preambles corresponding to the RAR resource whose index is 1 are: 1, 5, 9, 13, 17, 21, 25, 29, 33, 37, 41, 45, 49, 53, 57, 61, and then determines, according to the RAPID "1001", that the RAPID indicates that the index of the random access preamble is the ninth of the indices of the foregoing 16 preambles (herein, an arrangement in an ascending order is used as an example, and the arrangement may be set according to a requirement), that is, 33. Therefore, the UE determines that the random access preamble indicated by the RAPID in the received RAR message is the same as the random access preamble sent to the base station, so as to determine that the received RAR message is the RAR message of the UE.

Alternatively, preferably, in another implementation manner, the UE may determine whether the received RAR message is the RAR message of the UE according to whether a state of an identifier, for indicating the random access preamble or a random access preamble index, included in the RAR message received on the RAR resource determined according to the random access preamble sent by the UE to the base station is the same as a state of a bits of bits corresponding to the random access preamble sent by the UE to the base station, where a is equal to a quantity of bits of the identifier for indicating the random access preamble or the random access preamble index, and locations of the a bits in bits corresponding to the first random access preamble index are prespecified.

Exemplarily, it is still assumed that 64 random access preambles (indices of the 64 random access preambles are 0 to 63) are configured, and four RAR resources are correspondingly configured for the 64 random access preambles; therefore, a=4. In addition, it is assumed that an index of the random access preamble sent by the UE to the base station in step 301 is 24, and it is assumed that an index of the RAR resource used for the RAR message received by the UE is 0, and the RAPID in the RAR message is 0110.

Because there are 64 random access preambles, in fact it is determined that one random access preamble needs six bits (bit); however, because a preset correspondence exists between an RAR resource (or an RAR resource index) and the random access preamble (or a preamble index), two bits in the six bits have been implicitly determined by using bits corresponding to an RAR resource (or an RAR resource index). It is assumed that the foregoing two bits are lower two bits (or may be higher two bits) of the random access preamble. Because the UE receives the RAR message on the RAR resource determined according to the random access preamble previously sent to the base station, lower two bits of bits corresponding to the random access preamble sent by the UE to the base station should be the same as lower two bits of bits corresponding to a random access preamble indicated in an RAR resource where the received RAR message is located. Therefore, after the RAR message is received, the UE only needs to perform bit comparison between the four bits for indicating the RAPID and higher four bits of bits corresponding to the random access preamble, whose index is 24, sent to the base station. If a result of bit comparison is same, it is determined that the received RAR message is the RAR message of the UE. Otherwise, it is determined that the received RAR message is not the RAR message of the UE. Because the bits corresponding to the random access preamble whose index is 24 is 011000, it can be learned that higher four bits 0110 are the same as the bits for indicating the RAPID, and it can be known that the received RAR message is the RAR message of the UE.

Alternatively, in another implementation manner, if the RAPID is indicated by s bits, it is assumed that lower k bits of the s bits are determined according to the k bits corresponding to the RAR resource index. It is assumed that an index of the random access preamble sent by the UE to the base station in step 301 is 24, and it is assumed that an index of the RAR resource used for the RAR message received by the UE is 0, and the RAPID in the RAR message is 0110. The UE first determines that lower two bits of the RAPID in the RAR message is 00 according to that the index of the RAR resource used for receiving the RAR message is 0, and combines 00 and 0110 to obtain 011000, so that it can be known that 011000 indicates 24. Therefore, the UE determines that the random access preamble indicated by the received RAPID in the RAR message is the same as the random access preamble sent to the base station, so as to determine that the received RAR message is the RAR message of the UE.

It should be noted that the correspondence between the preamble information and the RAR resource information may further include one or more cell common parameters, and the cell common parameter includes: a cell identity, a subframe number, a frame number, a timeslot number or an orthogonal frequency-division multiplexing symbol index.

In conclusion, in the foregoing method, a correspondence between preamble information and RAR resource information is predefined, so that some or all RAPIDs can be implicitly indicated according to a quantity of random access preambles and a quantity of RAR resources, thereby simplifying an RAR message.

It should be noted that in another implementation manner, an RAPID in an RAR message may be further simplified in a following manner:

determining, according to a correspondence between a specified parameter and a random access preamble, the random access preamble corresponding to the specified parameter, and determining, according to the random access preamble corresponding to the specified parameter, a quantity of bits of an identifier, for indicating the random access preamble or a random access preamble index, in the RAR message included in the MAC PDU.

The correspondence between the specified parameter and the random access preamble is configured by using signaling or preset by the system, and the random access preamble and the quantity of bits of the identifier for indicating the random access preamble or the random access preamble index are configured by using signaling or preset by the system.

The foregoing specified parameter includes: a path loss value or range, a reference signal receive power value or range, a reference signal receive quality value or range, a channel quality information value or range, a service type of the UE, a power saving type of the user equipment, a delay type of the UE or a mobility type of the UE.

Specifically, a path loss range is used as an example, and three path loss ranges may be preset. Each path loss range corresponds to different random access preambles. For example: a quantity of available random access preambles corresponding to a path loss range 1 is 64, and six bits may be used to indicate the RAPID; a quantity of available random access preambles corresponding to a path loss range 2 is 32, and five bits may be used to indicate the RAPID; a quantity of available random access preambles corresponding to a path loss range 3 is 16, and four bits may be used to indicate the RAPID. Compared with the prior art in which fixed six bits are used to indicate the RAPID, in the foregoing method, flexible adjustment may be performed according to a path loss range. When a quantity of available random access preambles is relatively small, a quantity of bits of an RAPID is reduced, thereby simplifying an RAR message.

Optionally, the RAR message may not carry a temporary cell radio network temporary identifier (Temporary Cell Radio Network Temporary Identifier, TC-RNTI). Because an effect of the TC-RNTI is to transmit an RAR reply message and a contention resolution message, the RAR message may not include the TC-RNTI.

Optionally, the RAR message may not include uplink scheduling/grant information (UL grant). Because an effect of the UL grant is to transmit an RAR reply message, the RAR message may not include the UL grant.

Optionally, a timing advance command (Timing advance Command, TAC) may be predefined, where an adjustment granularity of the predefined TAC is greater than a specified adjustment granularity. That is, an adjustment granularity of the TAC is redefined. In an existing system, a advance time=$T_A$*16, where $T_A$=0, 1, 2, . . . , 1282, and therefore an adjustment range may be 0 to 1282*16, and 0 to 1282*16 Ts in time, where Ts is a time unit, and is not limited herein. In this case, 11 bits are needed to indicate a value of $T_A$. Also within a range of 0 to 1282*16 Ts, if the adjustment granularity is increased to 24 Ts, where $T_A$=0, 1, 2, . . . , 855, in this case, 10 bits may indicate the value of $T_A$, and the TAC is simplified, thereby simplifying an RAR message.

In addition, it should be noted that a preset timing relationship or a preset time offset exists between a start moment of the time resource occupied in transmitting the RAR message and a start moment of the time resource occupied in transmitting the random access preamble by the UE; or, a preset timing relationship or a preset time offset exists between an ending moment of the time resource occupied in transmitting the RAR message and an ending moment of the time resource occupied in transmitting the random access preamble by the UE. That is, after the UE sends the random access preamble to the base station, the UE knows when to receive the RAR message, and the base station knows when to receive the random access preamble, and knows when to send the RAR message after receiving the random access preamble.

Figure 4:
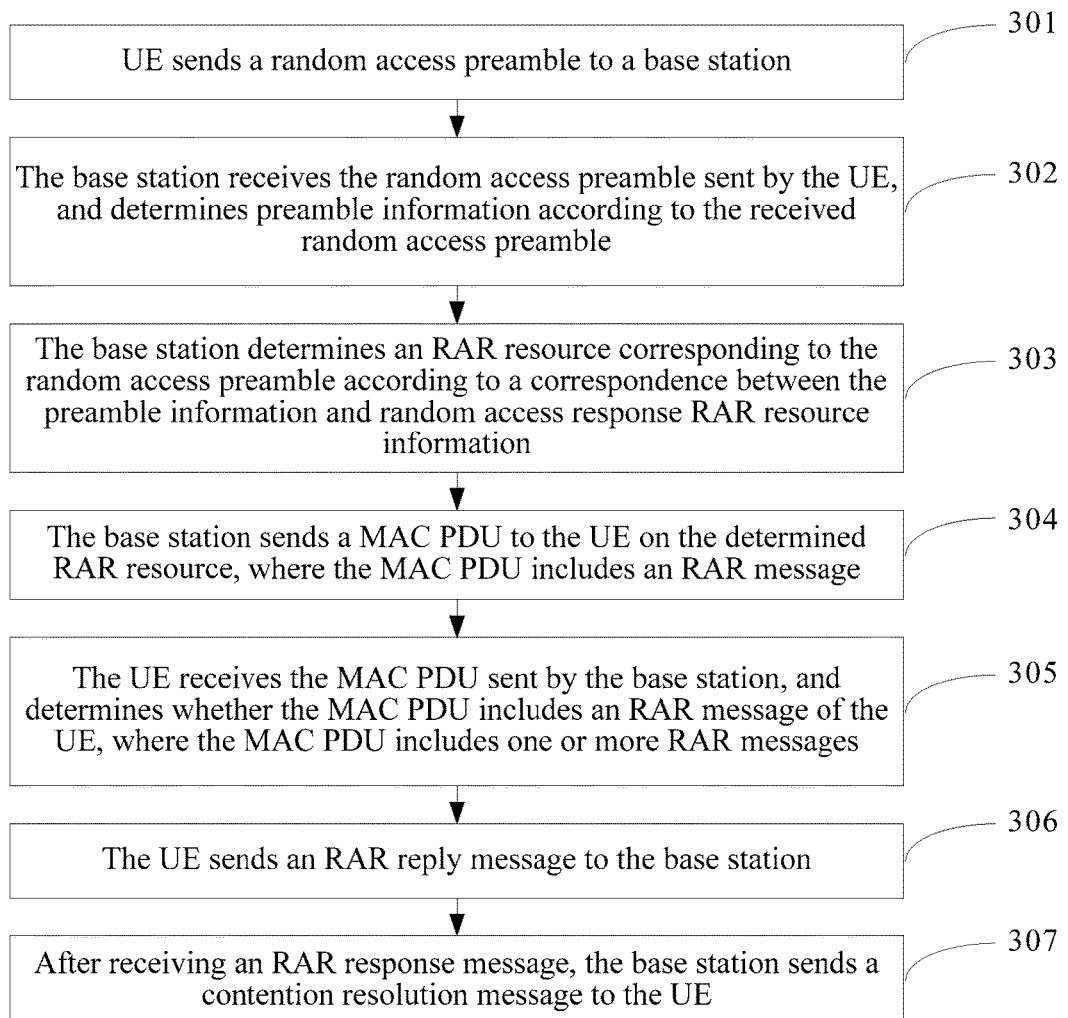
FIG. 4 is a schematic flowchart of a method for predetermining a resource in random access according to an embodiment of the present disclosure.

The foregoing method is to simplify an RAR message, and in addition, an RAR reply message and a contention resolution message may be further simplified. As shown in FIG. 4, the method further includes:

306: The UE sends an RAR reply message to the base station.

After determining that the received RAR message is of the UE, the UE sends the RAR reply message to the base station, where the RAR reply message includes a radio resource control RRC connection request.

The RRC connection request includes a bit or a field for indicating a user identity, where the user identity is used for distinguishing the user equipment in contention conflict resolution of random access, where a quantity of bits included in the bit or the field for indicating the user identity is less than a first specified bit quantity. The first specified bit quantity herein refers to a quantity of bits included in the bit or the field for indicating the user identity in an existing protocol.

Exemplarily, an existing RRC connection request includes a bit or a field for indicating a user identity. For example, a length of a ue-Identity is 40 bits, and the 40 bits may indicate $2^{40}$ UEs. However, in an actual environment, there may be only $2^{20}$ UEs; therefore, the length of the ue-Identity may be reduced to 20 bits, thereby simplifying an RAR reply message.

Optionally, after the RAR reply message is simplified, an establishment cause in the RRC connection request may be predefined, so that a quantity of bits for indicating the predefined establishment cause is greater than a second specified bit quantity. The second specified bit quantity herein is a quantity of bits of an establishment cause in an existing protocol.

Exemplarily, an existing RRC connection request includes an establishment cause of an RRC connection. For example, a quantity of bits of the establishment cause is three bits, and the quantity of bits of the establishment cause may be increased to four bits, so as to indicate one of the 16 establishment causes, for example, a path loss value or range of the UE, a reference signal receive power value or range, a reference signal receive quality value or range, a channel quality information value or range, a service type of the UE, a power saving type of the user equipment, a delay type of the UE, a category of the UE, a type of the UE, a coverage enhancement level of the UE or a mobility type of the UE. In this way, the RAR reply message may be optimized on the basis of that the RAR reply message is simplified.

In addition, because the RAR message does not include the UL grant, that is, does not have scheduling information of a resource used for transmitting the RAR reply message, the resource used for transmitting the RAR reply message needs to be preset or configured by using signaling. A specific configuration method is as follows:

First, various resources occupied in transmitting the RAR reply message are configured by using signaling or preset by the system. A specific configuration method is the same as a method for configuring an RAR resource, and details are no longer described. The various resources that are preset or configured by using signaling and that are occupied in transmitting the RAR reply message include:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

Next, in the configured various resources occupied in transmitting the RAR reply message, the UE determines specific resources (for example, indices of the resources) occupied to send the RAR reply message at this time, which may be as follows:

determining, according to a correspondence between a resource or a resource index of the RAR reply message and the preamble information, a resource for sending the RAR reply message; or, determining, according to a correspondence between a resource or a resource index of the RAR reply message and the preamble information and a cell common parameter, a resource for sending the RAR reply message; or, determining, according to a correspondence between a resource or a resource index of the RAR reply message and the RAR resource information, a resource for sending the RAR reply message; or, determining, according to a correspondence between a resource or a resource index of the RAR reply message and the RAR resource information and a cell common parameter, a resource for sending the RAR reply message; or, determining, according to a correspondence between a resource or a resource index of the RAR reply message and a specified parameter, a resource for sending the RAR reply message; or, determining, according to a correspondence between a resource or a resource index of the RAR reply message and a specified parameter and a cell common parameter, a resource for sending the RAR message.

The cell common parameter includes a cell identity, a subframe number, a frame number, a timeslot number or an orthogonal frequency-division multiplexing symbol index, and the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment.

Correspondingly, when receiving the RAR reply message, the base station also needs to determine, in configured various resources, specific resources (for example, indices of the resources) occupied to receive the RAR reply message at this time, which may be:

determining, according to a correspondence between a resource or a resource index of the RAR reply message and the preamble information, a resource for receiving the RAR reply message; or, determining, according to a correspondence between a resource or a resource index of the RAR reply message and the preamble information and a cell common parameter, a resource for receiving the RAR reply message; or, determining, according to a correspondence between a resource or a resource index of the RAR reply message and the RAR resource information, a resource for receiving the RAR reply message; or, determining, according to a correspondence between a resource or a resource index of the RAR reply message and the RAR resource information and a cell common parameter, a resource for receiving the RAR reply message; or, determining, according to a correspondence between a resource or a resource index of the RAR reply message and a specified parameter, a resource for receiving the RAR reply message; or, determining, according to a correspondence between a resource or a resource index of the RAR reply message and a specified parameter and a cell common parameter, a resource for receiving the RAR reply message, where the cell common parameter includes a cell identity, a subframe number, a frame number, a timeslot number or an orthogonal frequency-division multiplexing symbol index, and the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment.

The resource used for sending the RAR reply message by the UE is the same as the resource used for receiving the RAR reply message by the base station.

In addition, the foregoing correspondence may be a functional relationship, a table relationship or a specified relationship, and for example, the foregoing correspondence between the resource index of the RAR reply message and the preamble information includes:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

In addition, it should be noted that a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message. That is, after receiving the RAR message of the base station, the UE knows when to send the RAR reply message to the base station, and after sending the RAR message, the base station knows when to receive the RAR reply message.

307: After receiving the RAR reply message, the base station sends a contention resolution message to the UE.

The contention resolution message sent by the base station to the UE includes a bit or a field for indicating a user identity, where the user identity is used for distinguishing the user equipment in contention conflict resolution of random access. A quantity of bits included in the bit or the field for indicating the user identity is less than a third specified bit quantity. The third specified bit quantity herein refers to a quantity of bits included in the bit or the field for indicating the user identity in an existing protocol.

Exemplarily, an existing contention resolution message includes a bit or a field for indicating the user identity. For example, a length of a ue-Identity is 40 bits. The 40 bits may indicate $2^{40}$ UEs. However, in an actual environment, there may be only $2^{20}$ UEs. Therefore, the length of the ue-Identity may be reduced to 20 bits, thereby simplifying the RAR reply message. It should be noted that the ue-Identity in the contention resolution message is the same as the ue-Identity in the received RAR reply message.

After the contention resolution message is simplified, a bit or a field may be added to the contention resolution message. For example, 16 bits may be added to indicate a temporary C-RNTI or TC-RNTI. This is because a simplified RAR message may not include a TC-RNTI, and therefore a TC-RNTI needs to be added to the contention resolution message.

In addition, a resource used for transmitting the contention resolution message may be not based on scheduling, and instead, a resource used for transmitting the contention resolution message is preset or configured by using signaling. A specific configuration method is as follows:

First, various resources occupied in transmitting the contention resolution message are configured by using signaling or preset by the system. A specific configuration method is the same as a method for configuring an RAR resource, and details are no longer described. The resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

Next, in the configured various resources occupied in transmitting a contention resolution message, the base station determines specific resources (for example, indices of the resources) occupied to send the contention resolution message at this time, which may be:

determining, according to a correspondence between a resource or a resource index of the contention resolution message and the preamble information, a resource for sending the contention resolution message; or, determining, according to a correspondence between a resource or a resource index of the contention resolution message and the preamble information and a cell common parameter, a resource for sending the contention resolution message; or, determining, according to a correspondence between a resource or a resource index of the contention resolution message and the RAR resource information, a resource for sending the contention resolution message; or, determining, according to a correspondence between a resource or a resource index of the contention resolution message and the RAR resource information and a cell common parameter, a resource for sending the contention resolution message; or, determining, according to a correspondence between a resource or a resource index of the contention resolution message and a specified parameter, a resource for sending the contention resolution message; or, determining, according to a correspondence between a resource or a resource index of the contention resolution message and a specified parameter and a cell common parameter, a resource for sending the contention resolution message, where the cell common parameter includes a cell identity, a subframe number, a frame number, a timeslot number or an orthogonal frequency-division multiplexing symbol index, and the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment.

Correspondingly, when receiving the contention resolution message, the UE also needs to determine, in various resources that are configured by using signaling or preset by the system and that are occupied in transmitting the contention resolution message, specific resources (for example, indices of the resources) occupied to receive the contention resolution message at this time, which may be:

determining, according to a correspondence between a resource or a resource index of the contention resolution message and the preamble information, a resource for receiving the contention resolution message; or, determining, according to a correspondence between a resource or a resource index of the contention resolution message and the preamble information and a cell common parameter, a resource for receiving the contention resolution message; or, determining, according to a correspondence between a resource or a resource index of the contention resolution message and the RAR resource information, a resource for receiving the contention resolution message; or, determining, according to a correspondence between a resource or a resource index of the contention resolution message and the RAR resource information and a cell common parameter, a resource for receiving the contention resolution message; or, determining, according to a correspondence between a resource or a resource index of the contention resolution message and a specified parameter, a resource for receiving the contention resolution message; or, determining, according to a correspondence between a resource or a resource index of the contention resolution message and a specified parameter and a cell common parameter, a resource for receiving the contention resolution message, where the cell common parameter includes a cell identity, a subframe number, a frame number, a timeslot number or an orthogonal frequency-division multiplexing symbol index, and the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment.

The resource used for sending the contention resolution message by the UE is the same as the resource used for receiving the contention resolution message by the base station.

In addition, the foregoing correspondence may be a functional relationship, a table relationship or a specified relationship. For example, the foregoing correspondence between the resource index of the contention resolution message and the preamble information includes:

the resource index of the contention resolution message corresponding to the random access preamble=the random access preamble index mod the quantity of resources, of the contention resolution message, configured by using signaling or preset by the system, where mod denotes a modulo operation; or the resource index of the contention resolution message=the RAR resource index corresponding to the random access preamble.

In addition, it should be noted that a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message. That is, after sending the RAR reply message, the UE may know when to receive the contention resolution message, and after receiving the RAR reply message, the base station knows when to send the contention resolution message.

Figure 5:
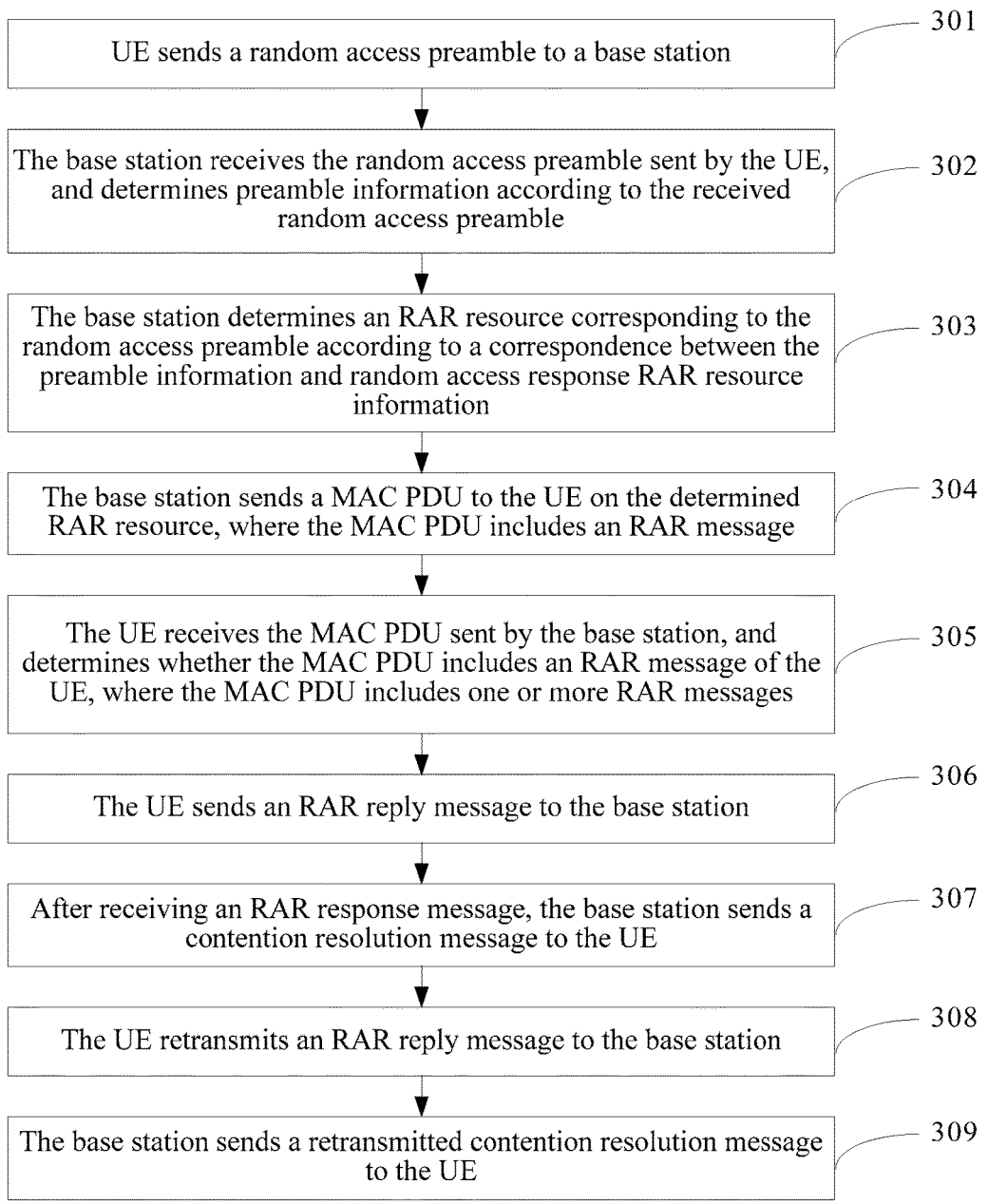
FIG. 5 is a schematic flowchart of a method for predetermining a resource in random access according to an embodiment of the present disclosure.

Further, as shown in FIG. 5, the foregoing method may further include at least one of the following step 308 and step 309, and it needs to be determined according to an actual requirement to specifically execute which step or to execute both steps or to execute neither of the steps.

308: The UE retransmits an RAR reply message to the base station.

309: The base station sends a retransmitted contention resolution message to the UE.

In a current system, there is a retransmission mechanism for an RAR reply message and a contention resolution message, and an objective is to improve reliability of transmitting the RAR reply message and the contention resolution message. In the prior art, transmission of an RAR reply message and a contention resolution message is based on scheduling. The base station may enable, by means of scheduling, resources used for transmitting the RAR reply message and the contention resolution message not to be overlapped. In this embodiment of the present disclosure, based on the consideration of a coverage enhancement requirement, a mechanism of scheduling transmission resources for an RAR reply message and a contention resolution message is not adopted.

Exemplarily, first, various resources used for retransmitting an RAR reply message and a contention resolution message may be configured by using signaling or preset by the system. A specific configuration method is the same as a method for configuring an RAR resource, and details are no longer described. Various resources used for retransmitting an RAR reply message and a contention resolution message configured by using signaling or preset by the system include:

a size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message.

Next, the UE determines, in various resources, for retransmitting the RAR reply message, configured by using signaling or preset by the system, specific resources occupied to send the retransmitted RAR reply message at this time, which may be:

determining, according to a correspondence between a resource or a resource index of the retransmitted RAR reply message and the preamble information and a preset time offset, a resource for sending the retransmitted RAR reply information; or, determining, according to a correspondence between a resource or a resource index of the retransmitted RAR reply message and the preamble information, a preset time offset, and a cell common parameter, a resource for sending the retransmitted RAR reply message; or, determining, according to a correspondence between a resource or a resource index of the retransmitted RAR reply message and the RAR resource information and a preset time offset, a resource for sending the retransmitted RAR reply message; or, determining, according to a correspondence between a resource or a resource index of the retransmitted RAR reply message and the RAR resource information, a preset time offset, and a cell common parameter, a resource for sending the retransmitted RAR reply message; or, determining, according to a correspondence between a resource or a resource index of the retransmitted RAR reply message and a specified parameter and a preset time offset, a resource for sending the retransmitted RAR reply message; or, determining, according to a correspondence between a resource or a resource index of the retransmitted RAR reply message and a specified parameter, a preset time offset, and a cell common parameter, a resource for sending the retransmitted RAR reply message; and/or the UE determines, in various resources, for retransmitting the contention resolution message, configured by using signaling or preset by the system, specific resources occupied to receive the retransmitted contention resolution message at this time, which may be:

determining, according to a correspondence between a resource or a resource index of the retransmitted contention resolution message and the preamble information and a preset time offset, a resource for receiving the retransmitted contention resolution message; or, determining, according to a correspondence between a resource or a resource index of the retransmitted contention resolution message and the preamble information, a preset time offset, and a cell common parameter, a resource for receiving the retransmitted contention resolution message; or, determining, according to a correspondence between a resource or a resource index of the retransmitted contention resolution message and the RAR resource information and a preset time offset, a resource for receiving the retransmitted contention resolution message; or, determining, according to a correspondence between a resource or a resource index of the retransmitted contention resolution message and the RAR resource information, a preset time offset, and a cell common parameter, a resource for receiving the retransmitted contention resolution message; or, determining, according to a correspondence between a resource or a resource index of the retransmitted contention resolution message and a specified parameter and a preset time offset, a resource for receiving the retransmitted contention resolution message; or, determining, according to a correspondence between a resource or a resource index of the retransmitted contention resolution message and a specified parameter, a preset time offset, and a cell common parameter, a resource for receiving the retransmitted contention resolution message, where the cell common parameter includes a cell identity, a subframe number, a frame number, a timeslot number or an orthogonal frequency-division multiplexing symbol index, and the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment.

Correspondingly, the base station determines, in various resources, for retransmitting the RAR reply message, configured by using signaling or preset by the system, specific resources occupied to receive the retransmitted RAR reply message at this time, which may be:

determining, according to a correspondence between a resource or a resource index of the retransmitted RAR reply message and the preamble information and a preset time offset, a resource for receiving the retransmitted RAR reply information; or, determining, according to a correspondence between a resource or a resource index of the retransmitted RAR reply message and the preamble information, a preset time offset, and a cell common parameter, a resource for receiving the retransmitted RAR reply message; or, determining, according to a correspondence between a resource or a resource index of the retransmitted RAR reply message and the RAR resource information and a preset time offset, a resource for receiving the retransmitted RAR reply message; or, determining, according to a correspondence between a resource or a resource index of the retransmitted RAR reply message and the RAR resource information, a preset time offset, and a cell common parameter, a resource for receiving the retransmitted RAR reply message; or, determining, according to a correspondence between a resource or a resource index of the retransmitted RAR reply message and a specified parameter and a preset time offset, a resource for receiving the retransmitted RAR reply message; or, determining, according to a correspondence between a resource or a resource index of the retransmitted RAR reply message and a specified parameter, a preset time offset, and a cell common parameter, a resource for receiving the retransmitted RAR reply message; and/or the base station determines, in various resources, used for retransmitting the contention resolution message, configured by using signaling or preset by the system, specific resources for sending the retransmitted contention resolution message at this time, which may be:

determining, according to a correspondence between a resource or a resource index of the retransmitted contention resolution message and the preamble information and a preset time offset, a resource for sending the retransmitted contention resolution message; or, determining, according to a correspondence between a resource or a resource index of the retransmitted contention resolution message and the preamble information, a preset time offset, and a cell common parameter, a resource for sending the retransmitted contention resolution message; or, determining, according to a correspondence between a resource or a resource index of the retransmitted contention resolution message and the RAR resource information and a preset time offset, a resource for sending the retransmitted contention resolution message; or, determining, according to a correspondence between a resource or a resource index of the retransmitted contention resolution message and the RAR resource information, a preset time offset, and a cell common parameter, a resource for sending the retransmitted contention resolution message; or, determining, according to a correspondence between a resource or a resource index of the retransmitted contention resolution message and a specified parameter and a preset time offset, a resource for sending the retransmitted contention resolution message; or, determining, according to a correspondence between a resource or a resource index of the retransmitted contention resolution message and a specified parameter, a preset time offset, and a cell common parameter, a resource for sending the retransmitted contention resolution message, where a cell common parameter includes a cell identity, a subframe number, a frame number, a timeslot number or an orthogonal frequency-division multiplexing symbol index, and the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment.

The resource used for sending the retransmitted RAR reply message by the UE is the same as the resource used for receiving the retransmitted RAR reply message by the base station, and the resource used for receiving the retransmitted contention resolution message by the UE is the same as the resource used for sending the retransmitted contention resolution message by the base station.

In addition, the foregoing various correspondences may be a functional relationship, a table relationship or a specified relationship. Resources used for the contention resolution message correspond to a quantity of times of transmitting the contention resolution message, and resources used in different quantities of times of transmitting the contention resolution message are orthogonal in time, and/or frequency, and/or codeword. For example, resources for transmitting Msg3 or Msg4 for an nth time and resources for transmitting Msg3 or Msg4 for an (n+1)th time are orthogonal in time, and/or frequency, and/or codeword.

In addition, it should be noted that the RAR message, or the RAR reply message, or the contention resolution message, or the retransmitted RAR reply message, or the retransmitted contention resolution message is transmitted by using a predefined message configuration, where the message configuration includes one or more of the following: a modulation and coding scheme, a size of a transmission block, a power setting.

By means of the method for predetermining a resource in random access provided in this embodiment of the present disclosure, an implicit manner is used to indicate an identifier of a random access preamble index, and a quantity of bits of the identifier of the random access preamble index is reduced, so that an RAR message can be simplified; or, a random access preamble may be set according to a specified parameter, and a quantity of bits of an identifier of a corresponding random access preamble index is then set according to the set random access preamble; or, it may be made that an RAR message does not include a bit or a field for indicating a temporary identifier; or, it may be made that an RAR message does not include uplink scheduling/grant information; or, a timing advance command may be predefined, where an adjustment granularity of the predefined timing advance command is greater than a specified adjustment granularity, a message in a procedure of random access is simplified, and at the same time resources used for transmitting an RAR reply message, transmitting a contention resolution message, retransmitting an RAR reply message, and retransmitting a contention resolution message are preset, so that it is no longer necessary to allocate a resource through scheduling, thereby simplifying the process of random access, and improving reliability of information transmission in the process of random access.

Figure 6:
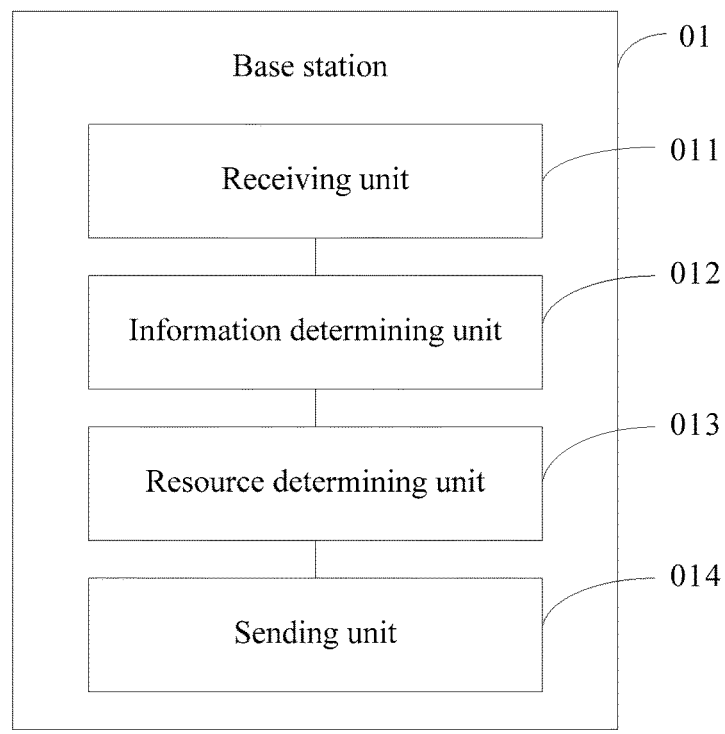
FIG. 6 is a schematic structural diagram of a base station according to an embodiment of the present disclosure.

An embodiment of the present disclosure provides a base station 01. As shown in FIG. 6, the base station 01 includes:

a receiving unit 011, configured to receive a random access preamble sent by user equipment, and send the received random access preamble to an information determining unit 012;

the information determining unit 012, configured to receive, from the receiving unit 011, the random access preamble sent by the user equipment, determine preamble information according to the random access preamble sent by the user equipment, and send the determined preamble information to a resource determining unit 013, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

the resource determining unit 013, configured to receive the preamble information from the information determining unit, determine, according to a correspondence between the preamble information and random access response RAR resource information, an RAR resource corresponding to the random access preamble sent by the user equipment, and send, to the receiving unit 011, the RAR resource corresponding to the random access preamble sent by the user equipment, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system; and a sending unit 014, configured to receive, from the resource determining unit, the RAR resource corresponding to the random access preamble sent by the user equipment, and send the RAR message corresponding to the random access preamble to the user equipment on the RAR resource corresponding to the random access preamble sent by the user equipment.

Optionally, the RAR resource may be configured by using signaling or preset by the system, and each RAR resource of RAR resources configured by using signaling or preset by a system corresponds to one or more random access preambles.

The RAR resource configured by using signaling or preset by the system includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

In an implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

Optionally, if one RAR resource corresponds to only one random access preamble, an RAR message included in a media access control MAC packet data unit PDU transmitted on the RAR resource does not include an identifier for indicating the random access preamble or a random access preamble index.

In another implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

Exemplarily, if one RAR resource corresponds to multiple random access preambles, an RAR message included in a MAC PDU transmitted on the RAR resource includes an identifier for indicating the random access preambles or random access preamble indices, and a length of the identifier is equal to k bits, where k=ceil($\log_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil($\log_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

Alternatively, exemplarily, if the N RAR resources are configured by using signaling or preset by the system, and N=$2^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

The foregoing correspondence between the preamble information and the RAR resource information is a functional relationship, a table relationship or a specified relationship; and the correspondence between the preamble information and the RAR resource information is configured by using signaling or preset by the system, where the signaling includes broadcast or multicast signaling, and the correspondence, configured by using signaling or preset by the system, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

Exemplarily, the correspondence between the preamble information and the RAR resource information may include:

the RAR resource index corresponding to the random access preamble=the random access preamble index mod a quantity of RAR resources configured by using signaling or preset by the system, where herein mod denotes a modulo operation.

In addition, random access preambles corresponding to different RAR resources of the RAR resources configured by using signaling or preset by a system may be same, or partially same, or completely different.

Figure 7:
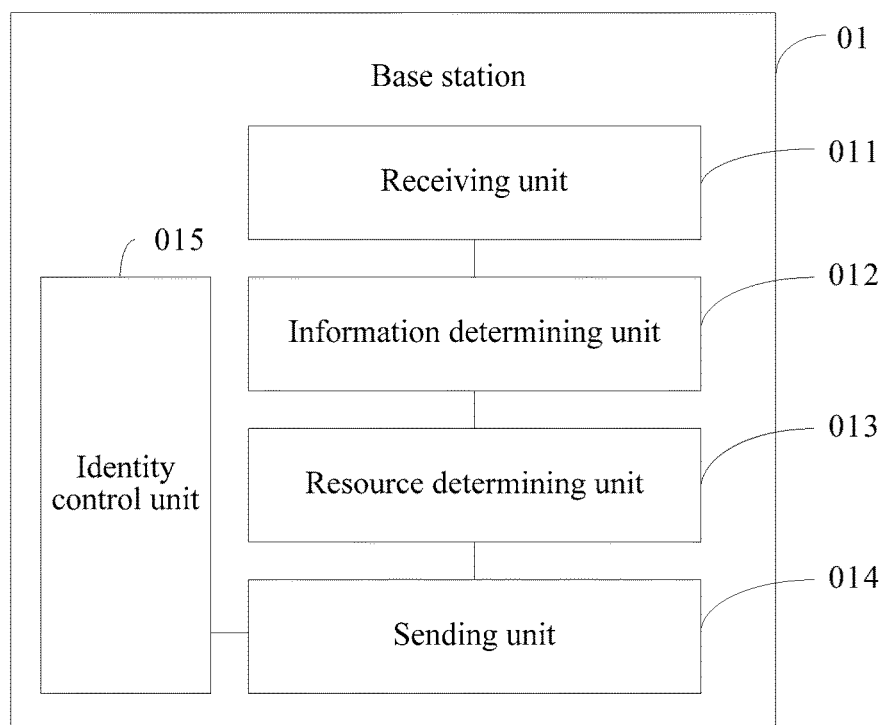
FIG. 7 is a schematic structural diagram of a base station according to an embodiment of the present disclosure.

Optionally, as shown in FIG. 7, the base station 01 may further include:

an identity control unit 015, configured to determine, according to a correspondence between a specified parameter and a random access preamble, the random access preamble corresponding to the specified parameter; and determine, according to the random access preamble corresponding to the specified parameter, a quantity of bits of an identifier, for indicating the random access preamble or a random access preamble index, in an RAR message included in a MAC PDU.

The correspondence between the specified parameter and the random access preamble is configured by using signaling or preset by the system, and the random access preamble and the quantity of bits of the identifier for indicating the random access preamble or the random access preamble index are configured by using signaling or preset by the system; and the specified parameter includes: a path loss value or range, a reference signal receive power value or range, a reference signal receive quality value or range, a channel quality information value or range, a service type of the user equipment, a power saving type of the user equipment, a delay type of the user equipment or a mobility type of the user equipment.

Optionally, the RAR message corresponding to the random access preamble may not include a bit or a field for indicating a temporary identifier, and the temporary identifier includes a cell radio network temporary identifier, or a temporary cell radio network temporary identifier.

Optionally, the RAR message corresponding to the random access preamble does not include uplink scheduling/grant information.

Optionally, the RAR message corresponding to the random access preamble includes: a predefined timing advance command, where an adjustment granularity of the predefined timing advance command is greater than a specified adjustment granularity.

Optionally, the correspondence between the preamble information and the RAR resource information further includes one or more cell common parameters, and the cell common parameter includes: a cell identity, a subframe number, a frame number, a timeslot number or an orthogonal frequency-division multiplexing symbol index.

Optionally, a preset timing relationship or a preset time offset exists between a start moment of the time resource occupied in transmitting the RAR message and a start moment of the time resource occupied in transmitting the random access preamble by the user equipment; or, a preset timing relationship or a preset time offset exists between an ending moment of the time resource occupied in transmitting the RAR message and an ending moment of the time resource occupied in transmitting the random access preamble by the user equipment.

Optionally, the receiving unit 011 may be further configured to receive an RAR reply message sent by the user equipment, where the RAR reply message includes a radio resource control RRC connection request, where the RRC connection request includes a bit or a field for indicating a first user identity, and the first user identity is used for distinguishing the user equipment in contention conflict resolution of random access, where a quantity of bits included in the bit or the field for indicating the first user identity is less than a first specified bit quantity.

Optionally, the RRC connection request further includes a predefined establishment cause, and a quantity of bits for indicating the predefined establishment cause is greater than a second specified bit quantity.

A resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

Optionally, the resource determining unit 013 may be further configured to:

determine, according to a correspondence between a resource or a resource index of the RAR reply message and the preamble information, a resource for receiving the RAR reply message; or determine, according to a correspondence between a resource or a resource index of the RAR reply message and the preamble information and a cell common parameter, a resource for receiving the RAR reply message; or determine, according to a correspondence between a resource or a resource index of the RAR reply message and the RAR resource information, a resource for receiving the RAR reply message; or determine, according to a correspondence between a resource or a resource index of the RAR reply message and the RAR resource information and a cell common parameter, a resource for receiving the RAR reply message; or determine, according to a correspondence between a resource or a resource index of the RAR reply message and a specified parameter, a resource for receiving the RAR reply message; or determine, according to a correspondence between a resource or a resource index of the RAR reply message and a specified parameter and a cell common parameter, a resource for receiving the RAR reply message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

For example, the correspondence between the resource index of the RAR reply message and the preamble information includes:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

Optionally, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

Optionally, the sending unit 014 may be further configured to send a contention resolution message to the user equipment, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

The contention resolution message further includes: a bit or a field for indicating a temporary identifier, and the temporary identifier includes a cell radio network temporary identifier, or a temporary cell radio network temporary identifier.

Optionally, a resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

Optionally, the resource determining unit 013 may be further configured to:

determine, according to a correspondence between a resource or a resource index of the contention resolution message and the preamble information, a resource for sending the contention resolution message; or determine, according to a correspondence between a resource or a resource index of the contention resolution message and the preamble information and a cell common parameter, a resource for sending the contention resolution message; or determine, according to a correspondence between a resource or a resource index of the contention resolution message and the RAR resource information, a resource for sending the contention resolution message; or determine, according to a correspondence between a resource or a resource index of the contention resolution message and the RAR resource information and a cell common parameter, a resource for sending the contention resolution message; or determine, according to a correspondence between a resource or a resource index of the contention resolution message and a specified parameter, a resource for sending the contention resolution message; or determine, according to a correspondence between a resource or a resource index of the contention resolution message and a specified parameter and a cell common parameter, a resource for sending the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

Optionally, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

Optionally, the receiving unit 011 may be further configured to receive an RAR reply message retransmitted by the user equipment; and/or the sending unit 014 may be further configured to send a retransmitted contention resolution message to the user equipment.

A size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

Optionally, the resource determining unit 013 may be further configured to:

determine, according to a correspondence between a resource or a resource index of the retransmitted RAR reply message and the preamble information and a preset time offset, a resource for receiving the retransmitted RAR reply information; or determine, according to a correspondence between a resource or a resource index of the retransmitted RAR reply message and the preamble information, a preset time offset, and a cell common parameter, a resource for receiving the retransmitted RAR reply message; or determine, according to a correspondence between a resource or a resource index of the retransmitted RAR reply message and the RAR resource information and a preset time offset, a resource for receiving the retransmitted RAR reply message; or determine, according to a correspondence between a resource or a resource index of the retransmitted RAR reply message and the RAR resource information, a preset time offset, and a cell common parameter, a resource for receiving the retransmitted RAR reply message; or determine, according to a correspondence between a resource or a resource index of the retransmitted RAR reply message and a specified parameter and a preset time offset, a resource for receiving the retransmitted RAR reply message; or determine, according to a correspondence between a resource or a resource index of the retransmitted RAR reply message and a specified parameter, a preset time offset, and a cell common parameter, a resource for receiving the retransmitted RAR reply message, where the cell common parameter includes a cell identity, a subframe number, a frame number, a timeslot number or an orthogonal frequency-division multiplexing symbol index, the specified parameter includes: a resource index used for sending an RAR reply, a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

Optionally, the resource determining unit 013 may be further configured to:

determine, according to a correspondence between a resource or a resource index of the retransmitted contention resolution message and the preamble information and a preset time offset, a resource for sending the retransmitted contention resolution message; or determine, according to a correspondence between a resource or a resource index of the retransmitted contention resolution message and the preamble information, a preset time offset, and a cell common parameter, a resource for sending the retransmitted contention resolution message; or determine, according to a correspondence between a resource or a resource index of the retransmitted contention resolution message and the RAR resource information and a preset time offset, a resource for sending the retransmitted contention resolution message; or determine, according to a correspondence between a resource or a resource index of the retransmitted contention resolution message and the RAR resource information, a preset time offset, and a cell common parameter, a resource for sending the retransmitted contention resolution message; or determine, according to a correspondence between a resource or a resource index of the retransmitted contention resolution message and a specified parameter and a preset time offset, a resource for sending the retransmitted contention resolution message; or determine, according to a correspondence between a resource or a resource index of the retransmitted contention resolution message and a specified parameter, a preset time offset, and a cell common parameter, a resource for sending the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

In addition, it should be noted that resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

Optionally, if the foregoing first information used for transmitting the resource is configured by using signaling, the sending unit 104 may be further configured to:

send configuration signaling to the user equipment, where the configuration signaling is used for notifying the user equipment of a resource configuration used for transmitting the first information.

By means of the base station provided in this embodiment of the present disclosure, an implicit manner is used to indicate an identifier of a random access preamble index, and a quantity of bits of the identifier of the random access preamble index is reduced, so that an RAR message can be simplified; or, a random access preamble may be set according to a specified parameter, and a quantity of bits of an identifier of a corresponding random access preamble index is then set according to the set random access preamble; or, it may be made that an RAR message does not include a bit or a field for indicating a temporary identifier; or, it may be made that an RAR message does not include uplink scheduling/grant information; or, a timing advance command may be predefined, where an adjustment granularity of the predefined timing advance command is greater than a specified adjustment granularity, a message in a procedure of random access is simplified, and at the same time resources used for transmitting an RAR reply message, transmitting a contention resolution message, retransmitting an RAR reply message, and retransmitting a contention resolution message are preset, so that it is no longer necessary to allocate a resource through scheduling, thereby simplifying the process of random access, and improving reliability of information transmission in the process of random access.

Figure 8:
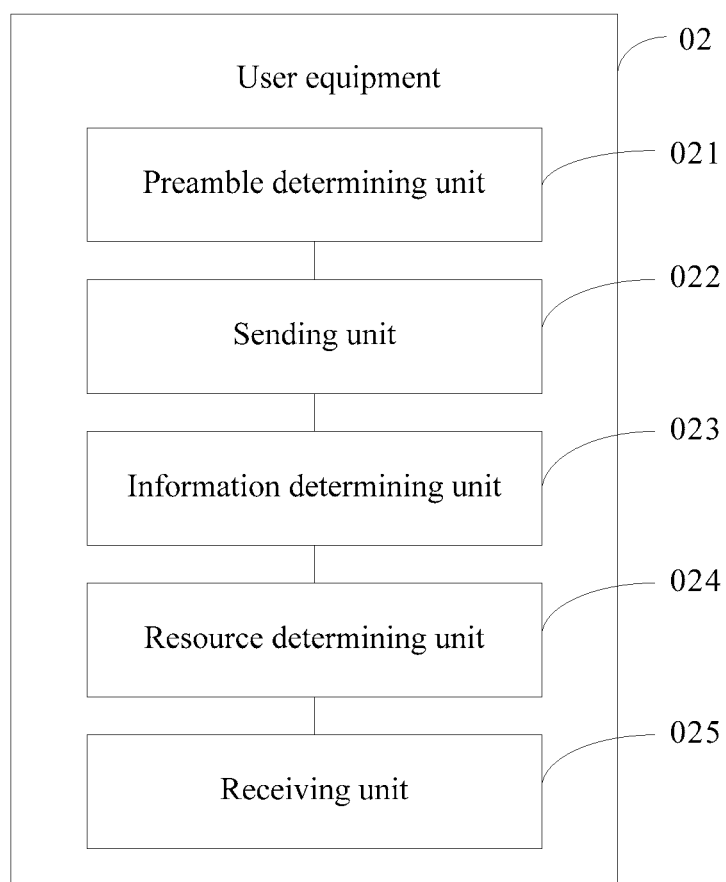
FIG. 8 is a schematic structural diagram of user equipment according to an embodiment of the present disclosure.

An embodiment of the present disclosure provides user equipment 02. As shown in FIG. 8, the user equipment 02 includes:

a preamble determining unit 021, configured to determine a random access preamble, and send the determined first random access preamble to a sending unit 022;

the sending unit 022, configured to receive a first random access preamble from the preamble determining unit 021, and send the first random access preamble to a base station;

an information determining unit 023, configured to determine preamble information according to the first random access preamble, and send the preamble information to a resource determining unit 024, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

the resource determining unit 024, configured to receive the preamble information from the information determining unit 023, determine an RAR resource corresponding to the first random access preamble according to a correspondence between the preamble information and random access response RAR resource information, and send the RAR resource corresponding to the first random access preamble to a receiving unit 025, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system;

the receiving unit 025, configured to receive the RAR resource corresponding to the first random access preamble from the resource determining unit, and receive, on the RAR resource corresponding to the first random access preamble, a media access control MAC packet data unit PDU sent by the base station; and a message determining unit, configured to determine whether the MAC PDU includes the RAR message corresponding to the first random access preamble.

The RAR resource is configured by using signaling, where the signaling is sent after the base station or a system presets the RAR resource, and each RAR resource of preset RAR resources corresponds to one or more random access preambles.

Optionally, the RAR resource configured by using signaling includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

Optionally, in an implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

Optionally, if one RAR resource corresponds to only one random access preamble, the RAR message included in the media access control MAC packet data unit PDU transmitted on the RAR resource does not include an identifier for indicating the random access preamble or a random access preamble index.

Optionally, in another implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

Exemplarily, if one RAR resource corresponds to multiple random access preambles, the RAR message included in the MAC PDU transmitted on the RAR resource includes an identifier for indicating the random access preambles or random access preamble indices, and a length of the identifier is equal to k bits, where k=ceil(log$_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil(log$_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

Optionally, the message determining unit 023 may be configured to:

if bits corresponding to an RAR resource or an RAR resource index where the RAR message is located are the same as the random access preamble and the first random access preamble, where the random access preamble is indicated by the identifier for indicating the random access preambles or the random access preamble indices and the identifier is included in the RAR message included in the MAC PDU, determine that the MAC PDU includes the RAR message corresponding to the first random access preamble; or, if bits corresponding to an RAR resource or an RAR resource index where the RAR message is located are the same as the random access preamble index and a first random access preamble index determined by user equipment, where the random access preamble index is indicated by the identifier for indicating the random access preambles or the random access preamble indices and the identifier is included in the RAR message included in the MAC PDU, determine that the MAC PDU includes the RAR message corresponding to the first random access preamble; or if a state of an identifier, for indicating a random access preamble or a random access preamble index, included in an RAR message included in the MAC PDU received on the RAR resource corresponding to the first random access preamble is the same as a state of a bits of bits corresponding to the first random access preamble, determine that the MAC PDU includes the RAR message corresponding to the first random access preamble, where a is equal to a quantity of bits of the identifier for indicating the random access preamble or the random access preamble index, and locations of the a bits in bits corresponding to the first random access preamble index are prespecified.

Alternatively, exemplarily, if the N RAR resources are configured by using signaling or preset by the system, and N=2$^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

Optionally, the message determining unit 023 may be further configured to:

determine a bit value corresponding to the RAR resource index corresponding to the first random access preamble, where the bit value corresponding to the RAR resource index is preset;

determine a bit value corresponding to the identifier in the MAC PDU;

combine the bit value corresponding to the RAR resource index corresponding to the random access preamble and the bit value corresponding to the identifier in the MAC PDU to obtain the s bits;

determine the random access preamble indicated by the s bits; and determine whether the first random access preamble is the same as the random access preamble indicated by the s bits, and if the first random access preamble is the same as the random access preamble indicated by the s bits, determine that the MAC PDU includes the RAR message corresponding to the first random access preamble, or if the first random access preamble is different from the random access preamble indicated by the s bits, determine that the MAC PDU does not include the RAR message corresponding to the first random access preamble.

Optionally, the correspondence between the preamble information and the RAR resource information is a functional relationship, a table relationship or a specified relationship; and the correspondence between the preamble information and the RAR resource information is configured by using signaling, where the signaling is sent after the base station or a system presets the correspondence between the preamble information and the RAR resource information, and the correspondence, configured by using the signaling, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

For example, the correspondence between the preamble information and the RAR resource information may include:

the RAR resource index corresponding to the random access preamble=the random access preamble index mod a quantity of RAR resources configured by using signaling or preset by the system, where herein mod denotes a modulo operation.

In addition, random access preambles corresponding to different RAR resources of the RAR resources configured by using signaling may be same, or partially same, or completely different.

Optionally, a quantity of bits of an identifier, for indicating a random access preamble or a random access preamble index, in the RAR message included in the MAC PDU is determined by the base station according to a correspondence between a specified parameter and a random access preamble.

The correspondence between the specified parameter and the random access preamble is configured by using signaling or preset by the system, and the quantity of bits of the identifier for indicating the random access preamble or the random access preamble index are configured by using signaling or preset by the system; and the specified parameter includes: a path loss value or range, a reference signal receive power value or range, a reference signal receive quality value or range, a channel quality information value or range, a service type of the user equipment, a power saving type of the user equipment, a delay type of the user equipment or a mobility type of the user equipment.

Optionally, the RAR message corresponding to the first random access preamble does not include a bit or a field for indicating a temporary identifier, and the temporary identifier includes a cell radio network temporary identifier, or a temporary cell radio network temporary identifier.

Optionally, the RAR message corresponding to the first random access preamble does not include uplink scheduling/grant information.

Optionally, the RAR message corresponding to the first random access preamble includes: a predefined timing advance command, where an adjustment granularity of the predefined timing advance command is greater than a specified adjustment granularity.

Optionally, the correspondence between the preamble information and the RAR resource information further includes one or more cell common parameters, and the cell common parameter includes: a cell identity, a subframe number, a frame number, a timeslot number or an orthogonal frequency-division multiplexing symbol index.

Optionally, a preset timing relationship or a preset time offset exists between a start moment of the time resource occupied in transmitting the RAR message and a start moment of the time resource occupied in transmitting the random access preamble by the user equipment; or, a preset timing relationship or a preset time offset exists between an ending moment of the time resource occupied in transmitting the RAR message and an ending moment of the time resource occupied in transmitting the random access preamble by the user equipment.

Optionally, the sending unit 022 may be further configured to send an RAR reply message to the base station, where the RAR reply message includes a radio resource control RRC connection request, where the RRC connection request includes a bit or a field for indicating a first user identity, and the first user identity is used for distinguishing the user equipment in contention conflict resolution of random access, where a quantity of bits included in the bit or the field for indicating the first user identity is less than a first specified bit quantity.

Optionally, the RRC connection request further includes a predefined establishment cause, and a quantity of bits for indicating the predefined establishment cause is greater than a second specified bit quantity.

A resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

Optionally, the resource determining unit 024 may be further configured to:

determine, according to a correspondence between a resource or a resource index of the RAR reply message and the preamble information, a resource for sending the RAR reply message; or determine, according to a correspondence between a resource or a resource index of the RAR reply message and the preamble information and a cell common parameter, a resource for sending the RAR reply message; or determine, according to a correspondence between a resource or a resource index of the RAR reply message and the RAR resource information, a resource for sending the RAR reply message; or determine, according to a correspondence between a resource or a resource index of the RAR reply message and the RAR resource information and a cell common parameter, a resource for sending the RAR reply message; or determine, according to a correspondence between a resource or a resource index of the RAR reply message and a specified parameter, a resource for sending the RAR reply message; or determine, according to a correspondence between a resource or a resource index of the RAR reply message and a specified parameter and a cell common parameter, a resource for sending the RAR message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

For example, the correspondence between the resource index of the RAR reply message and the preamble information may include:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

Optionally, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

Optionally, the receiving unit 025 is further configured to receive a contention resolution message sent by the base station, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

The contention resolution message further includes: a bit or a field for indicating a temporary identifier, and the temporary identifier includes a cell radio network temporary identifier, or a temporary cell radio network temporary identifier.

Optionally, a resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

Optionally, the resource determining unit 024 may be further configured to:

determine, according to a correspondence between a resource or a resource index of the contention resolution message and the preamble information, a resource for receiving the contention resolution message; or determine, according to a correspondence between a resource or a resource index of the contention resolution message and the preamble information and a cell common parameter, a resource for receiving the contention resolution message; or determine, according to a correspondence between a resource or a resource index of the contention resolution message and the RAR resource information, a resource for receiving the contention resolution message; or determine, according to a correspondence between a resource or a resource index of the contention resolution message and the RAR resource information and a cell common parameter, a resource for receiving the contention resolution message; or determine, according to a correspondence between a resource or a resource index of the contention resolution message and a specified parameter, a resource for receiving the contention resolution message; or determine, according to a correspondence between a resource or a resource index of the contention resolution message and a specified parameter and a cell common parameter, a resource for receiving the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

Optionally, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

Optionally, the sending unit 022 may be further configured to send a retransmitted RAR reply message to the base station;

and/or, the receiving unit 025 may be further configured to receive a contention resolution message retransmitted by the base station.

A size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

Optionally, the resource determining unit 024 may be further configured to:

determine, according to a correspondence between a resource or a resource index of the retransmitted RAR reply message and the preamble information and a preset time offset, a resource for sending the retransmitted RAR reply information; or determine, according to a correspondence between a resource or a resource index of the retransmitted RAR reply message and the preamble information, a preset time offset, and a cell common parameter, a resource for sending the retransmitted RAR reply message; or determine, according to a correspondence between a resource or a resource index of the retransmitted RAR reply message and the RAR resource information and a preset time offset, a resource for sending the retransmitted RAR reply message; or determine, according to a correspondence between a resource or a resource index of the retransmitted RAR reply message and the RAR resource information, a preset time offset, and a cell common parameter, a resource for sending the retransmitted RAR reply message; or determine, according to a correspondence between a resource or a resource index of the retransmitted RAR reply message and a specified parameter and a preset time offset, a resource for sending the retransmitted RAR reply message; or determine, according to a correspondence between a resource or a resource index of the retransmitted RAR reply message and a specified parameter, a preset time offset, and a cell common parameter, a resource for sending the retransmitted RAR reply message, where the cell common parameter includes a cell identity, a subframe number, a frame number, a timeslot number or an orthogonal frequency-division multiplexing symbol index, and the specified parameter includes: a resource index used for sending an RAR reply, a path loss range, a reference signal receive power value or range, a reference signal receive quality value or range, a channel quality information value or range, a service type of the user equipment, a power saving type of the user equipment, a delay type of the user equipment or a mobility type of the user equipment.

Optionally, the resource determining unit 024 may be further configured to:

determine, according to a correspondence between a resource or a resource index of the retransmitted contention resolution message and the preamble information and a preset time offset, a resource for receiving the retransmitted contention resolution message; or determine, according to a correspondence between a resource or a resource index of the retransmitted contention resolution message and the preamble information, a preset time offset, and a cell common parameter, a resource for receiving the retransmitted contention resolution message; or determine, according to a correspondence between a resource or a resource index of the retransmitted contention resolution message and the RAR resource information and a preset time offset, a resource for receiving the retransmitted contention resolution message; or determine, according to a correspondence between a resource or a resource index of the retransmitted contention resolution message and the RAR resource information, a preset time offset, and a cell common parameter, a resource for receiving the retransmitted contention resolution message; or determine, according to a correspondence between a resource or a resource index of the retransmitted contention resolution message and a specified parameter and a preset time offset, a resource for receiving the retransmitted contention resolution message; or determine, according to a correspondence between a resource or a resource index of the retransmitted contention resolution message and a specified parameter, a preset time offset, and a cell common parameter, a resource for receiving the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

In addition, it should be noted that resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

The user equipment provided in this embodiment of the present disclosure receives an implicit manner is used to indicate an identifier of a random access preamble index, and a quantity of bits of the identifier of the random access preamble index is reduced, so that an RAR message can be simplified; or, a random access preamble may be set according to a specified parameter, and a quantity of bits of an identifier of a corresponding random access preamble index is then set according to the set random access preamble; or, it may be made that an RAR message does not include a bit or a field for indicating a temporary identifier; or, it may be made that an RAR message does not include uplink scheduling/grant information; or, a timing advance command may be predefined, where an adjustment granularity of the predefined timing advance command is greater than a specified adjustment granularity, a message in a procedure of random access is simplified, and at the same time resources used for transmitting an RAR reply message, transmitting a contention resolution message, retransmitting an RAR reply message, and retransmitting a contention resolution message are preset, so that it is no longer necessary to allocate a resource through scheduling, thereby simplifying the process of random access, and improving reliability of information transmission in the process of random access.

Figure 9:
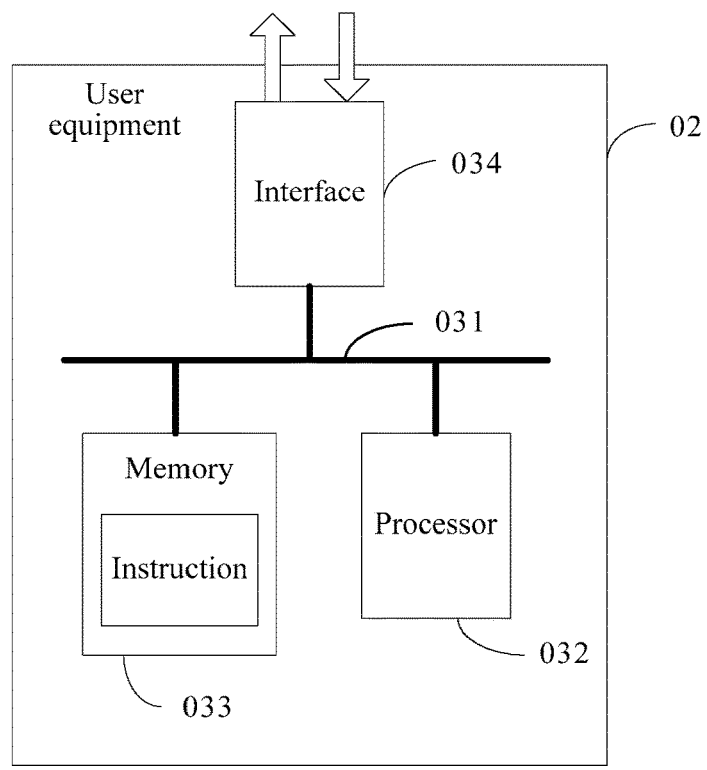
FIG. 9 is a schematic structural diagram of another base station according to an embodiment of the present disclosure.

An embodiment of the present disclosure further provides another base station 03. As shown in FIG. 9, the base station 03 includes: a bus 031, and a processor 032, a memory 033, and an interface 034 connected to the bus 031, where the memory is configured to store an instruction;

the interface 034 is configured to receive a random access preamble sent by user equipment;

the processor 032 executes the instruction configured to:

determine preamble information according to the random access preamble sent by the user equipment, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

determine, according to a correspondence between the preamble information and random access response RAR resource information, an RAR resource corresponding to the random access preamble sent by the user equipment, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by a system; and the interface 034 is further configured to send the RAR message corresponding to the random access preamble to the user equipment on the RAR resource corresponding to the random access preamble sent by the user equipment.

The RAR resource is configured by using signaling or preset by the system, and each RAR resource of RAR resources configured by using signaling or preset by the system corresponds to one or more random access preambles.

Optionally, the RAR resource configured by using signaling or preset by the system includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

Optionally, in an implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

Optionally, if one RAR resource corresponds to only one random access preamble, an RAR message included in a media access control MAC packet data unit PDU transmitted by the base station on the RAR resource does not include an identifier for indicating the random access preamble or a random access preamble index.

Optionally, in another implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

Exemplarily, if one RAR resource corresponds to multiple random access preambles, an RAR message included in a MAC PDU transmitted by the base station on the RAR resource includes an identifier for indicating the random access preambles or random access preamble indices, and a length of the identifier is equal to k bits, where k=ceil(log$_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil(log$_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

Alternatively, exemplarily, if the N RAR resources are configured by using signaling or preset by the system, and N=2$^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

Optionally, the correspondence between the preamble information and the RAR resource information is a functional relationship, a table relationship or a specified relationship; and the correspondence between the preamble information and the RAR resource information is configured by using signaling or preset by the system, where the signaling includes broadcast or multicast signaling, and the correspondence, configured by using signaling or preset by the system, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

For example, the correspondence between the preamble information and the RAR resource information may include:

the RAR resource index corresponding to the random access preamble=the random access preamble index mod a quantity of RAR resources configured by using signaling or preset by the system, where herein mod denotes a modulo operation.

Optionally, random access preambles corresponding to different RAR resources of the RAR resources configured by using signaling or preset by a system may be same, or partially same, or completely different.

Optionally, the processor 032 executes the instruction to further:

determine, according to a correspondence between a specified parameter and a random access preamble, the random access preamble corresponding to the specified parameter; and determine, according to the random access preamble corresponding to the specified parameter, a quantity of bits of an identifier, for indicating the random access preamble or a random access preamble index, in an RAR message included in a MAC PDU.

The correspondence between the specified parameter and the random access preamble is configured by using signaling or preset by the system, and the random access preamble and the quantity of bits of the identifier for indicating the random access preamble or the random access preamble index are configured by using signaling or preset by the system; and the specified parameter includes: a path loss value or range, a reference signal receive power value or range, a reference signal receive quality value or range, a channel quality information value or range, a service type of the user equipment, a power saving type of the user equipment, a delay type of the user equipment or a mobility type of the user equipment.

Optionally, the RAR message corresponding to the random access preamble does not include a bit or a field for indicating a temporary identifier, and the temporary identifier includes a cell radio network temporary identifier, or a temporary cell radio network temporary identifier.

Optionally, the RAR message corresponding to the random access preamble does not include uplink scheduling/grant information.

Optionally, the RAR message corresponding to the random access preamble includes: a predefined timing advance command, where an adjustment granularity of the predefined timing advance command is greater than a specified adjustment granularity.

Optionally, the correspondence between the preamble information and the RAR resource information further includes one or more cell common parameters, and the cell common parameter includes: a cell identity, a subframe number, a frame number, a timeslot number or an orthogonal frequency-division multiplexing symbol index.

Optionally, a preset timing relationship or a preset time offset exists between a start moment of the time resource occupied in transmitting the RAR message and a start moment of the time resource occupied in transmitting the random access preamble by the user equipment; or, a preset timing relationship or a preset time offset exists between an ending moment of the time resource occupied in transmitting the RAR message and an ending moment of the time resource occupied in transmitting the random access preamble by the user equipment.

Optionally, the interface 034 is further configured to receive an RAR reply message sent by the user equipment, where the RAR reply message includes a radio resource control RRC connection request, where the RRC connection request includes a bit or a field for indicating a first user identity, and the first user identity is used for distinguishing the user equipment in contention conflict resolution of random access, where a quantity of bits included in the bit or the field for indicating the first user identity is less than a first specified bit quantity.

Optionally, the RRC connection request further includes a predefined establishment cause, and a quantity of bits for indicating the predefined establishment cause is greater than a second specified bit quantity.

Optionally, a resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

Optionally, the processor 032 executes the instruction to further:

determine, according to a correspondence between a resource or a resource index of the RAR reply message and the preamble information, a resource for receiving the RAR reply message; or determine, according to a correspondence between a resource or a resource index of the RAR reply message and the preamble information and a cell common parameter, a resource for receiving the RAR reply message; or determine, according to a correspondence between a resource or a resource index of the RAR reply message and the RAR resource information, a resource for receiving the RAR reply message; or determine, according to a correspondence between a resource or a resource index of the RAR reply message and the RAR resource information and a cell common parameter, a resource for receiving the RAR reply message; or determine, according to a correspondence between a resource or a resource index of the RAR reply message and a specified parameter, a resource for receiving the RAR reply message; or determine, according to a correspondence between a resource or a resource index of the RAR reply message and a specified parameter and a cell common parameter, a resource for receiving the RAR reply message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

For example, the correspondence between the resource index of the RAR reply message and the preamble information includes:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

Optionally, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

Optionally, the interface 034 may be further configured to:

send a contention resolution message to the user equipment, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

Optionally, the contention resolution message may further include: a bit or a field for indicating a temporary identifier, and the temporary identifier includes a cell radio network temporary identifier, or a temporary cell radio network temporary identifier.

A resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

Optionally, the processor 032 executes the instruction to further:

determine, according to a correspondence between a resource or a resource index of the contention resolution message and the preamble information, a resource for sending the contention resolution message; or determine, according to a correspondence between a resource or a resource index of the contention resolution message and the preamble information and a cell common parameter, a resource for sending the contention resolution message; or determine, according to a correspondence between a resource or a resource index of the contention resolution message and the RAR resource information, a resource for sending the contention resolution message; or determine, according to a correspondence between a resource or a resource index of the contention resolution message and the RAR resource information and a cell common parameter, a resource for sending the contention resolution message; or determine, according to a correspondence between a resource or a resource index of the contention resolution message and a specified parameter, a resource for sending the contention resolution message; or determine, according to a correspondence between a resource or a resource index of the contention resolution message and a specified parameter and a cell common parameter, a resource for sending the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

Optionally, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

Optionally, the interface 034 may be further configured to:

receive an RAR reply message retransmitted by the user equipment; and/or send a retransmitted contention resolution message to the user equipment.

A size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

Optionally, the processor 032 executes the instruction to further:

determine, according to a correspondence between a resource or a resource index of the retransmitted RAR reply message and the preamble information and a preset time offset, a resource for receiving the retransmitted RAR reply information; or determine, according to a correspondence between a resource or a resource index of the retransmitted RAR reply message and the preamble information, a preset time offset, and a cell common parameter, a resource for receiving the retransmitted RAR reply message; or determine, according to a correspondence between a resource or a resource index of the retransmitted RAR reply message and the RAR resource information and a preset time offset, a resource for receiving the retransmitted RAR reply message; or determine, according to a correspondence between a resource or a resource index of the retransmitted RAR reply message and the RAR resource information, a preset time offset, and a cell common parameter, a resource for receiving the retransmitted RAR reply message; or determine, according to a correspondence between a resource or a resource index of the retransmitted RAR reply message and a specified parameter and a preset time offset, a resource for receiving the retransmitted RAR reply message; or determine, according to a correspondence between a resource or a resource index of the retransmitted RAR reply message and a specified parameter, a preset time offset, and a cell common parameter, a resource for receiving the retransmitted RAR reply message, where the cell common parameter includes a cell identity, a subframe number, a frame number, a timeslot number or an orthogonal frequency-division multiplexing symbol index, the specified parameter includes: a resource index used for sending an RAR reply, a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

Optionally, the processor 032 executes the instruction to further:

determine, according to a correspondence between a resource or a resource index of the retransmitted contention resolution message and the preamble information and a preset time offset, a resource for sending the retransmitted contention resolution message; or determine, according to a correspondence between a resource or a resource index of the retransmitted contention resolution message and the preamble information, a preset time offset, and a cell common parameter, a resource for sending the retransmitted contention resolution message; or determine, according to a correspondence between a resource or a resource index of the retransmitted contention resolution message and the RAR resource information and a preset time offset, a resource for sending the retransmitted contention resolution message; or determine, according to a correspondence between a resource or a resource index of the retransmitted contention resolution message and the RAR resource information, a preset time offset, and a cell common parameter, a resource for sending the retransmitted contention resolution message; or determine, according to a correspondence between a resource or a resource index of the retransmitted contention resolution message and a specified parameter and a preset time offset, a resource for sending the retransmitted contention resolution message; or determine, according to a correspondence between a resource or a resource index of the retransmitted contention resolution message and a specified parameter, a preset time offset, and a cell common parameter, a resource for sending the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the correspondence is a functional relationship, a table relationship or a specified relationship, and the correspondence is configured by using signaling or preset by the system.

In addition, it should be noted that resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

Optionally, if the resource used for transmitting the first information is configured by using signaling, the processor 032 executes the instruction to further:

send configuration signaling to the user equipment, where the configuration signaling is used for notifying the user equipment of a resource used for transmitting the first information.

By means of the base station provided in this embodiment of the present disclosure, an implicit manner is used to indicate an identifier of a random access preamble index, and a quantity of bits of the identifier of the random access preamble index is reduced, so that an RAR message can be simplified; or, a random access preamble may be set according to a specified parameter, and a quantity of bits of an identifier of a corresponding random access preamble index is then set according to the set random access preamble; or, it may be made that an RAR message does not include a bit or a field for indicating a temporary identifier; or, it may be made that an RAR message does not include uplink scheduling/grant information; or, a timing advance command may be predefined, where an adjustment granularity of the predefined timing advance command is greater than a specified adjustment granularity, a message in a procedure of random access is simplified, and at the same time resources used for transmitting an RAR reply message, transmitting a contention resolution message, retransmitting an RAR reply message, and retransmitting a contention resolution message are preset, so that it is no longer necessary to allocate a resource through scheduling, thereby simplifying the process of random access, and improving reliability of information transmission in the process of random access.

Figure 10:
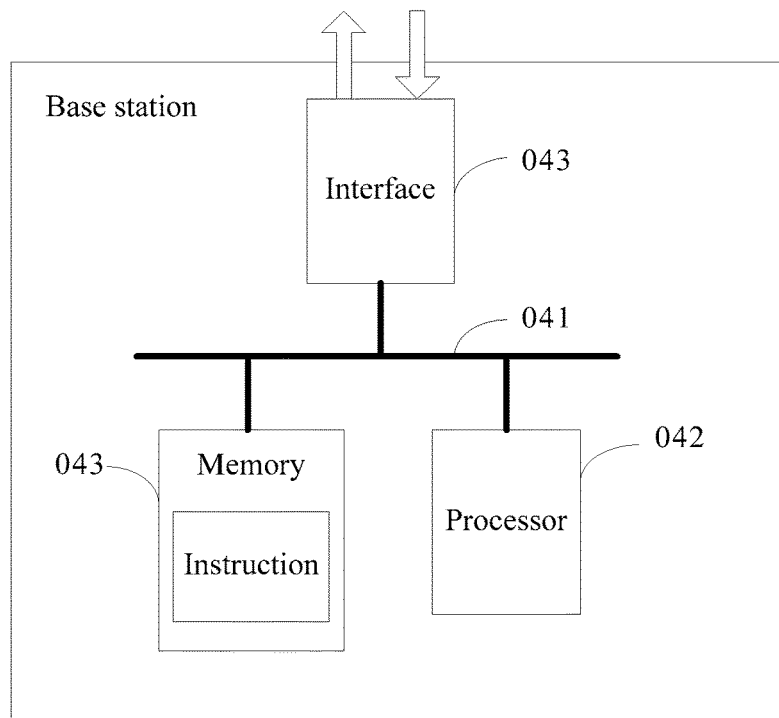
FIG. 10 is a schematic structural diagram of another user equipment according to an embodiment of the present disclosure.

An embodiment of the present disclosure further provides another user equipment 04. As shown in FIG. 10, the user equipment includes: a bus 041, and a processor 042, a memory 043, and an interface 044 connected to the bus 041. The memory 044 is configured to store an instruction;

the processor 042 executes the instruction to determine a random access preamble;

the interface 034 is configured to to a base station send the first random access preamble;

the processor 042 executes the instruction to further:

determine preamble information according to the first random access preamble, where the preamble information includes one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble; and determine an RAR resource corresponding to the first random access preamble according to a correspondence between the preamble information and random access response RAR resource information, where the RAR resource information includes one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured by using signaling or preset by the system.

The interface 044 is further configured to receive, on the RAR resource corresponding to the first random access preamble, a media access control MAC packet data unit PDU sent by the base station; and the processor 042 executes the instruction to further determine whether the MAC PDU includes the RAR message corresponding to the first random access preamble.

The RAR resource is configured by using signaling, where the signaling is sent after the base station or a system presets the RAR resource, and each RAR resource of preset RAR resources corresponds to one or more random access preambles.

Optionally, the RAR resource configured by using signaling includes:

a location of the time resource and/or a location of the frequency resource occupied in transmitting the RAR message; and/or, a start location of the time resource and/or a start location of the frequency resource occupied in transmitting the RAR message; and/or, a size of the time resource and/or a size of the frequency resource occupied in transmitting the RAR message; and/or, a time interval and/or a frequency interval between time resources occupied in transmitting different RARs; and/or, a quantity of time resources that are contained in one prespecified time range and that are occupied in transmitting RAR messages and a quantity of frequency resources that are contained in one prespecified frequency range and that are occupied in transmitting RAR messages.

Optionally, in an implementation manner, if N RAR resources are configured by using signaling or preset by the system, and the N RAR resources correspond to N random access preambles, where N is a positive integer greater than 1, the correspondence between the preamble information and the RAR resource information includes:

each random access preamble corresponds to one RAR resource or RAR resource index, and RAR resources or RAR resource indices corresponding to different random access preambles are different; or, each random access preamble index corresponds to one RAR resource or RAR resource index, and RAR resources or RAR resource indices corresponding to different random access preamble indices are different.

Optionally, if one RAR resource corresponds to only one random access preamble, the RAR message included in the media access control MAC packet data unit PDU transmitted on the RAR resource does not include an identifier for indicating the random access preamble or a random access preamble index.

Optionally, in another implementation manner, if N RAR resources are configured by using signaling or preset by the system, and the N RAR resources correspond to M random access preambles, where N and M are positive integers greater than 1, and M>N, the correspondence between the preamble information and the RAR resource information includes:

each RAR resource or RAR resource index corresponds to at least one random access preamble, and there is at least one RAR resource or RAR resource index that corresponds to multiple random access preambles; or, each RAR resource or RAR resource index corresponds to at least one random access preamble index, and there is at least one RAR resource or RAR resource index that corresponds to multiple random access preamble indices.

Exemplarily, if one RAR resource corresponds to multiple random access preambles, the RAR message included in the MAC PDU transmitted on the RAR resource includes an identifier for indicating the random access preambles or random access preamble indices, and a length of the identifier is equal to k bits, where k=ceil(log$_2$(a quantity of random access preambles corresponding to the RAR resource)), herein ceil denotes a function of rounding up, and log denotes a logarithmic function; or, if at least one RAR resource of RAR resources corresponds to multiple random access preambles, an RAR message included in a MAC PDU transmitted on each RAR resource includes an identifier for indicating the random access preambles or random access preamble indices, and a length of the identifier is less than or equal to h bits, where h=ceil(log$_2$(max(a quantity of random access preambles corresponding to a first RAR resource, a quantity of random access preambles corresponding to a second RAR resource, . . . , a quantity of random access preambles corresponding to an Nth RAR resource))), herein ceil denotes a function of rounding up, and log denotes a logarithmic function, max is a maximum value function, and N is a positive integer greater than 1.

Optionally, the processor 042 executes the instruction to further:

if bits corresponding to an RAR resource or an RAR resource index where the RAR message is located are the same as the random access preamble and the first random access preamble, where the random access preamble is indicated by the identifier for indicating the random access preambles or the random access preamble indices and the identifier is included in the RAR message included in the MAC PDU, determine that the MAC PDU includes the RAR message corresponding to the first random access preamble; or, if bits corresponding to an RAR resource or an RAR resource index where the RAR message is located are the same as the random access preamble index and a first random access preamble index determined by user equipment, where the random access preamble index is indicated by the identifier for indicating the random access preambles or the random access preamble indices and the identifier is included in the RAR message included in the MAC PDU, determine that the MAC PDU includes the RAR message corresponding to the first random access preamble; or if a state of an identifier, for indicating a random access preamble or a random access preamble index, included in an RAR message included in the MAC PDU received on the RAR resource corresponding to the first random access preamble is the same as a state of a bits of bits corresponding to the first random access preamble, determine that the MAC PDU includes the RAR message corresponding to the first random access preamble, where a is equal to a quantity of bits of the identifier for indicating the random access preamble or the random access preamble index, and locations of the a bits in bits corresponding to the first random access preamble index are prespecified.

Alternatively, exemplarily, if the N RAR resources are configured by using signaling or preset by the system, and N=2$^k$:

a preamble index of a random access preamble is indicated by s bits, where k bits of the s bits are determined according to k bits corresponding to an RAR resource index corresponding to the random access preamble, and the rest (s-k) bits of the s bits are determined by using an identifier for indicating the random access preamble or a random access preamble index.

Optionally, the processor 042 executes the instruction to further:

determine a bit value corresponding to the RAR resource index corresponding to the first random access preamble, where the bit value corresponding to the RAR resource index is preset;

determine a bit value corresponding to the identifier in the MAC PDU;

combine the bit value corresponding to the RAR resource index corresponding to the random access preamble and the bit value corresponding to the identifier in the MAC PDU to obtain the s bits;

determine the random access preamble indicated by the s bits; and determine whether the first random access preamble is the same as the random access preamble indicated by the s bits, and if the first random access preamble is the same as the random access preamble indicated by the s bits, determine that the MAC PDU includes the RAR message corresponding to the first random access preamble, or if the first random access preamble is different from the random access preamble indicated by the s bits, determine that the MAC PDU does not include the RAR message corresponding to the first random access preamble.

Optionally, the correspondence between the preamble information and the RAR resource information is a functional relationship, a table relationship or a specified relationship; and the correspondence between the preamble information and the RAR resource information is configured by using signaling or preset by the system, where the correspondence, configured by using signaling or preset by the system, between the preamble information and the RAR resource information includes:

a correspondence between the random access preamble and the RAR resource; or, a correspondence between the random access preamble index and the RAR resource; or, a correspondence between the random access preamble and the RAR resource index; or, a correspondence between the random access preamble index and the RAR resource index.

For example, the correspondence between the preamble information and the RAR resource information may include:

the RAR resource index corresponding to the random access preamble=the random access preamble index mod a quantity of RAR resources configured by using signaling or preset by the system, where herein mod denotes a modulo operation.

Optionally, random access preambles corresponding to different RAR resources of the RAR resources configured by using signaling may be same, or partially same, or completely different.

Optionally, a quantity of bits of an identifier, for indicating a random access preamble or a random access preamble index, in the RAR message included in the MAC PDU is determined by the base station according to a correspondence between a specified parameter and a random access preamble.

The correspondence between the specified parameter and the random access preamble is configured by using signaling or preset by the system, and a quantity of bits of the identifier for indicating the random access preamble or the random access preamble index is configured by using signaling or preset by the system.

The specified parameter includes: a path loss value or range, a reference signal receive power value or range, a reference signal receive quality value or range, a channel quality information value or range, a service type of the user equipment, a power saving type of the user equipment, a delay type of the user equipment or a mobility type of the user equipment.

Optionally, the RAR message corresponding to the first random access preamble does not include a bit or a field for indicating a temporary identifier, and the temporary identifier include as cell radio network temporary identifier, or a temporary cell radio network temporary identifier.

Optionally, the RAR message corresponding to the first random access preamble does not include uplink scheduling/grant information.

Optionally, the RAR message corresponding to the first random access preamble includes: a predefined timing advance command, where an adjustment granularity of the predefined timing advance command is greater than a specified adjustment granularity.

Optionally, the correspondence between the preamble information and the RAR resource information further includes one or more cell common parameters, and the cell common parameter includes: a cell identity, a subframe number, a frame number, a timeslot number or an orthogonal frequency-division multiplexing symbol index.

Optionally, a preset timing relationship or a preset time offset exists between a start moment of the time resource occupied in transmitting the RAR message and a start moment of the time resource occupied in transmitting the random access preamble by the user equipment; or, a preset timing relationship or a preset time offset exists between an ending moment of the time resource occupied in transmitting the RAR message and an ending moment of the time resource occupied in transmitting the random access preamble by the user equipment.

Optionally, the interface 044 may be further configured to: send an RAR reply message to the base station, where the RAR reply message includes a radio resource control RRC connection request, where the RRC connection request includes a bit or a field for indicating a first user identity, and the first user identity is used for distinguishing the user equipment in contention conflict resolution of random access, where a quantity of bits included in the bit or the field for indicating the first user identity is less than a first specified bit quantity.

Optionally, the RRC connection request further includes a predefined establishment cause, and a quantity of bits for indicating the predefined establishment cause is greater than a second specified bit quantity.

Optionally, a resource used for transmitting the RAR reply message is configured by using signaling or preset by the system, and the resource that is configured by using signaling or preset by the system and that is used for transmitting the RAR reply message includes:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages.

Optionally, the processor 042 executes the instruction to further:

determine, according to a correspondence between a resource or a resource index of the RAR reply message and the preamble information, a resource for sending the RAR reply message; or determine, according to a correspondence between a resource or a resource index of the RAR reply message and the preamble information and a cell common parameter, a resource for sending the RAR reply message; or determine, according to a correspondence between a resource or a resource index of the RAR reply message and the RAR resource information, a resource for sending the RAR reply message; or determine, according to a correspondence between a resource or a resource index of the RAR reply message and the RAR resource information and a cell common parameter, a resource for sending the RAR reply message; or determine, according to a correspondence between a resource or a resource index of the RAR reply message and a specified parameter, a resource for sending the RAR reply message; or determine, according to a correspondence between a resource or a resource index of the RAR reply message and a specified parameter and a cell common parameter, a resource for sending the RAR message, where the cell common parameter includes a cell identity, a subframe number, a frame number, a timeslot number or an orthogonal frequency-division multiplexing symbol index, the specified parameter includes: a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

For example, the correspondence between the resource index of the RAR reply message and the preamble information may include:

the resource index of the RAR reply message corresponding to the random access preamble=the random access preamble index mod a quantity of resources, of RAR reply messages, configured by using signaling or preset by the system, where mod denotes a modulo operation; or the resource index of the RAR reply message=the RAR resource index corresponding to the random access preamble.

Optionally, a preset timing relationship or a preset time offset exists between a start moment of a time resource occupied in transmitting the RAR reply message and a start moment of a time resource occupied in transmitting the RAR message; or, a preset timing relationship or a preset time offset exists between an ending moment of a time resource occupied in transmitting the RAR reply message and an ending moment of a time resource occupied in transmitting the RAR message.

Optionally, the interface 044 may be further configured to:

receive a contention resolution message sent by the base station, where the contention resolution message includes a bit or a field for indicating a second user identity, and the second user identity is used for distinguishing user equipment in contention conflict resolution of random access, where a quantity of bits included in the bit or the field for indicating the second user identity is less than a third specified bit quantity.

Optionally, the contention resolution message further includes: a bit or a field for indicating a temporary identifier, and the temporary identifier includes a cell radio network temporary identifier, or a temporary cell radio network temporary identifier.

Optionally, a resource used for transmitting the contention resolution message is configured by using signaling or preset by the system, and the resource that is configured by using signaling or preset by the system and that is used for transmitting the contention resolution message includes:

a location of a time resource and/or a location of a frequency resource occupied in transmitting the contention resolution message; and/or, a start location of a time resource and/or a start location of a frequency resource occupied in transmitting the contention resolution message; and/or, a size of a time resource and/or a size of a frequency resource occupied in transmitting the contention resolution message; and/or, a time interval between time resources occupied in transmitting different contention resolution messages and/or a frequency interval between frequency resources occupied in transmitting different contention resolution messages; and/or, a quantity of time resources that are contained in one prespecified time range and that are occupied in transmitting contention resolution messages and a quantity of frequency resources that are contained in one prespecified frequency range and that are occupied in transmitting contention resolution messages.

Optionally, the processor 042 executes the instruction to further:

determine, according to a correspondence between a resource or a resource index of the contention resolution message and the preamble information, a resource for receiving the contention resolution message; or determine, according to a correspondence between a resource or a resource index of the contention resolution message and the preamble information and a cell common parameter, a resource for receiving the contention resolution message; or determine, according to a correspondence between a resource or a resource index of the contention resolution message and the RAR resource information, a resource for receiving the contention resolution message; or determine, according to a correspondence between a resource or a resource index of the contention resolution message and the RAR resource information and a cell common parameter, a resource for receiving the contention resolution message; or determine, according to a correspondence between a resource or a resource index of the contention resolution message and a specified parameter, a resource for receiving the contention resolution message; or determine, according to a correspondence between a resource or a resource index of the contention resolution message and a specified parameter and a cell common parameter, a resource for receiving the contention resolution message, where the cell common parameter includes a cell identity, a subframe number, a frame number, a timeslot number or an orthogonal frequency-division multiplexing symbol index, the specified parameter includes: a resource index used for sending the contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

Optionally, a preset timing relationship or a preset time offset exists between a start moment of a time resource occupied in transmitting the contention resolution message and a start moment of a time resource occupied in transmitting an RAR reply message; or, a preset timing relationship or a preset time offset exists between an ending moment of a time resource occupied in transmitting the contention resolution message and an ending moment of a time resource occupied in transmitting an RAR reply message.

Optionally, the interface 044 may be further configured to:

send a retransmitted RAR reply message to the base station; and/or receive a contention resolution message retransmitted by the base station.

A size of a time resource and a frequency resource occupied in retransmitting the RAR reply message, and/or a start location or a location of a time resource and a frequency resource occupied in retransmitting the RAR reply message, and/or an interval between time resources and/or an interval between frequency resources occupied in retransmitting specific two RAR reply messages in the system, and/or quantities of time resources and frequency resources occupied in retransmitting the RAR reply message are configured by using signaling or preset by the system; and a size of a time resource and a frequency resource occupied in retransmitting the contention resolution message, and/or a start location or a location of a time resource and a frequency resource occupied in retransmitting the contention resolution message, and/or an interval between time resources and/or an interval between frequency resources occupied in retransmitting specific two contention resolution messages in the system, and/or quantities of time resources and frequency resources occupied in retransmitting the contention resolution message are configured by using signaling or preset by the system.

Optionally, the processor 042 executes the instruction to further:

determine, according to a correspondence between a resource or a resource index of the retransmitted RAR reply message and the preamble information and a preset time offset, a resource for sending the retransmitted RAR reply information; or determine, according to a correspondence between a resource or a resource index of the retransmitted RAR reply message and the preamble information, a preset time offset, and a cell common parameter, a resource for sending the retransmitted RAR reply message; or determine, according to a correspondence between a resource or a resource index of the retransmitted RAR reply message and the RAR resource information and a preset time offset, a resource for sending the retransmitted RAR reply message; or determine, according to a correspondence between a resource or a resource index of the retransmitted RAR reply message and the RAR resource information, a preset time offset, and a cell common parameter, a resource for sending the retransmitted RAR reply message; or determine, according to a correspondence between a resource or a resource index of the retransmitted RAR reply message and a specified parameter and a preset time offset, a resource for sending the retransmitted RAR reply message; or determine, according to a correspondence between a resource or a resource index of the retransmitted RAR reply message and a specified parameter, a preset time offset, and a cell common parameter, a resource for sending the retransmitted RAR reply message, where the cell common parameter includes a cell identity, a subframe number, a frame number, a timeslot number or an orthogonal frequency-division multiplexing symbol index, the specified parameter includes: a resource index used for sending an RAR reply, a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

Optionally, the processor 042 executes the instruction to further:

determine, according to a correspondence between a resource or a resource index of the retransmitted contention resolution message and the preamble information and a preset time offset, a resource for receiving the retransmitted contention resolution message; or determine, according to a correspondence between a resource or a resource index of the retransmitted contention resolution message and the preamble information, a preset time offset, and a cell common parameter, a resource for receiving the retransmitted contention resolution message; or determine, according to a correspondence between a resource or a resource index of the retransmitted contention resolution message and the RAR resource information and a preset time offset, a resource for receiving the retransmitted contention resolution message; or determine, according to a correspondence between a resource or a resource index of the retransmitted contention resolution message and the RAR resource information, a preset time offset, and a cell common parameter, a resource for receiving the retransmitted contention resolution message; or determine, according to a correspondence between a resource or a resource index of the retransmitted contention resolution message and a specified parameter and a preset time offset, a resource for receiving the retransmitted contention resolution message; or determine, according to a correspondence between a resource or a resource index of the retransmitted contention resolution message and a specified parameter, a preset time offset, and a cell common parameter, a resource for receiving the retransmitted contention resolution message, where the cell common parameter includes a cell identity, a subframe number, a frame number, a timeslot number or an orthogonal frequency-division multiplexing symbol index, the specified parameter includes: a resource index used for sending the retransmitted contention resolution message, a path loss range, a reference signal receive power value or range, a reference signal receive quality value or range, a channel quality information value or range, a service type of the user equipment, a power saving type of the user equipment, a delay type of the user equipment or a mobility type of the user equipment, the foregoing correspondence is a functional relationship, a table relationship or a specified relationship, and the correspondence is configured by using signaling or preset by the system.

In addition, it should be noted that resources used for the RAR reply message correspond to a quantity of times of transmitting the RAR reply message, and resources used in different quantities of times of transmitting the RAR reply message are orthogonal in time, and/or frequency, and/or codeword;

resources used for the contention resolution message correspond to a quantity of times of transmitting the contention resolution message, and resources used in different quantities of times of transmitting the contention resolution message are orthogonal in time, and/or frequency, and/or codeword; and transmission of a first message is performed by using a predefined first message configuration, where the first information is an RAR message, or an RAR reply message, or a contention resolution message, or a retransmitted RAR reply message, or a retransmitted contention resolution message, and the first message configuration includes one or more of the following: a modulation and coding scheme, a size of a transmission block, a power setting.

The user equipment provided in this embodiment of the present disclosure receives an implicit manner is used to indicate an identifier of a random access preamble index, and a quantity of bits of the identifier of the random access preamble index is reduced, so that an RAR message can be simplified; or, a random access preamble may be set according to a specified parameter, and a quantity of bits of an identifier of a corresponding random access preamble index is then set according to the set random access preamble; or, it may be made that an RAR message does not include a bit or a field for indicating a temporary identifier; or, it may be made that an RAR message does not include uplink scheduling/grant information; or, a timing advance command may be predefined, where an adjustment granularity of the predefined timing advance command is greater than a specified adjustment granularity, a message in a procedure of random access is simplified, and at the same time resources used for transmitting an RAR reply message, transmitting a contention resolution message, retransmitting an RAR reply message, and retransmitting a contention resolution message are preset, so that it is no longer necessary to allocate a resource through scheduling, thereby simplifying the process of random access, and improving reliability of information transmission in the process of random access.

The term "and/or" in the present disclosure describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

In the several embodiments provided in the present application, it should be understood that the disclosed method, apparatus, and system may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for predetermining a resource in a process of random access, wherein the method comprises:
   receiving a random access preamble sent by a user equipment, and determining preamble information according to the received random access preamble, wherein the preamble information comprises one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;
   determining a random access response (RAR) resource corresponding to the random access preamble according to a correspondence between the preamble information and RAR resource information, wherein the RAR resource information comprises one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured using signaling or preset by a system; and
   sending the RAR message corresponding to the random access preamble to the user equipment on the RAR resource corresponding to the random access preamble;
   wherein the correspondence between the preamble information and the RAR resource information comprises:
   the RAR resource index corresponding to the random access preamble index of the random access preamble mod a quantity of RAR resources configured using signaling or preset by the system, wherein mod denotes a modulo operation.

2. The method according to claim 1, wherein the RAR resource is configured using signaling or preset by the system, and each RAR resource of RAR resources configured using signaling or preset by the system corresponds to one or more random access preambles.

3. The method according to claim 1, wherein the method further comprises:
   receiving an RAR reply message sent by the user equipment, wherein the RAR reply message comprises a radio resource control (RRC) connection request, wherein
   the RRC connection request comprises a bit or a field for indicating a first user identity, and the first user identity is used for distinguishing the user equipment in contention conflict resolution of random access, wherein a quantity of bits comprised in the bit or the field for indicating the first user identity is less than a first specified bit quantity.

4. The method according to claim 3, wherein a resource used for transmitting the RAR reply message is configured using signaling or preset by the system, and the resource that is configured using signaling or preset by the system and that is used for transmitting the RAR reply message comprises:
   a location of a time resource and/or a location of a frequency resource occupied in transmitting the RAR reply message; and/or,
   a start location of a time resource and/or a start location of a frequency resource occupied in transmitting the RAR reply message; and/or,
   a size of a time resource and/or a size of a frequency resource occupied in transmitting the RAR reply message; and/or,
   a time interval between time resources occupied in transmitting different RAR reply messages and/or a frequency interval between frequency resources occupied in transmitting different RAR reply messages; and/or,
   a quantity of time resources that are contained in one prespecified time range and that are occupied in transmitting RAR reply messages and a quantity of frequency resources that are contained in one prespecified frequency range and that are occupied in transmitting RAR reply messages;

the method further comprising:

determining, according to a correspondence between a resource or a resource index of the RAR reply message and the preamble information, a resource for receiving the RAR reply message; or determining, according to a correspondence between a resource or a resource index of the RAR reply message and the preamble information and a cell common parameter, a resource for receiving the RAR reply message; or determining, according to a correspondence between a resource or a resource index of the RAR reply message and the RAR resource information, a resource for receiving the RAR reply message; or determining, according to a correspondence between a resource or a resource index of the RAR reply message and the RAR resource information and a cell common parameter, a resource for receiving the RAR reply message; or determining, according to a correspondence between a resource or a resource index of the RAR reply message and a specified parameter, a resource for receiving the RAR reply message; or determining, according to a correspondence between a resource or a resource index of the RAR reply message and a specified parameter and a cell common parameter, a resource for receiving the RAR reply message, the correspondence is a functional relationship, a table relationship or a specified relationship, and the correspondence is configured using signaling or preset by the system.

5. A method for predetermining a resource in random access, wherein the method comprises:

determining a random access preamble, and sending the first random access preamble to a base station;

determining preamble information according to the first random access preamble, wherein the preamble information comprises one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

determining a random access response (RAR) resource corresponding to the first random access preamble according to a correspondence between the preamble information and RAR resource information, wherein the RAR resource information comprises one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured using signaling or preset by a system; and receiving, on the RAR resource corresponding to the first random access preamble, a media access control (MAC) packet data unit (PDU) sent by the base station, and determining whether the MAC PDU comprises the RAR message corresponding to the first random access preamble;

wherein the correspondence between the preamble information and the RAR resource information comprises:

the RAR resource index corresponding to the random access preamble index of the random access preamble mod a quantity of RAR resources configured using signaling or preset by the system, wherein mod denotes a modulo operation.

6. The method according to claim 5, wherein the RAR resource is configured using signaling or preset by the system, and each RAR resource of RAR resources configured using signaling or preset by the system corresponds to one or more random access preambles.

7. The method according to claim 5, wherein the method further comprises:

sending an RAR reply message to the base station, wherein the RAR reply message comprises a radio resource control (RRC) connection request, wherein the RRC connection request comprises a bit or a field for indicating a first user identity, and the first user identity is used for distinguishing user equipment in contention conflict resolution of random access, wherein a quantity of bits comprised in the bit or the field for indicating the first user identity is less than a first specified bit quantity.

8. The method according to claim 7, wherein a resource used for transmitting the RAR reply message is configured using signaling or preset by the system, and the resource that is configured using signaling or preset by the system and that is used for transmitting the RAR reply message comprises:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages;

the method further comprising:

determining, according to a correspondence between a resource or a resource index of the RAR reply message and the preamble information, a resource for sending the RAR reply message; or determining, according to a correspondence between a resource or a resource index of the RAR reply message and the preamble information and a cell common parameter, a resource for sending the RAR reply message; or determining, according to a correspondence between a resource or a resource index of the RAR reply message and the RAR resource information, a resource for sending the RAR reply message; or determining, according to a correspondence between a resource or a resource index of the RAR reply message and the RAR resource information and a cell common parameter, a resource for sending the RAR reply message; or determining, according to a correspondence between a resource or a resource index of the RAR reply message and a specified parameter, a resource for sending the RAR reply message; or determining, according to a correspondence between a resource or a resource index of the RAR reply message and a specified parameter and a cell common parameter, a resource for sending the RAR message, the correspondence is a functional relationship, a table relationship or a specified relationship, and the correspondence is configured using signaling or preset by the system.

9. A base station, wherein the base station comprises: a bus, and a processor, a memory, and an interface connected to the bus, wherein the memory is configured to store instructions;

the interface is configured to receive a random access preamble sent by a user equipment;

the processor executes the instructions to:

determine preamble information according to the received random access preamble, wherein the preamble information comprises one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble;

determine a random access response (RAR) resource corresponding to the random access preamble according to a correspondence between the preamble information and RAR resource information, wherein the RAR resource information comprises one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured using signaling or preset by a system; and the interface is further configured to send the RAR message corresponding to the random access preamble to the user equipment on the RAR resource corresponding to the random access preamble;

wherein the correspondence between the preamble information and the RAR resource information comprises:

the RAR resource index corresponding to the random access preamble index of the random access preamble mod a quantity of RAR resources configured using signaling or preset by the system, wherein mod denotes a modulo operation.

10. The base station according to claim 9, wherein the RAR resource is configured using signaling or preset by the system, and each RAR resource of RAR resources configured using signaling or preset by the system corresponds to one or more random access preambles.

11. The base station according to claim 9, wherein the interface is further configured to receive an RAR reply message sent by the user equipment, wherein the RAR reply message comprises a radio resource control (RRC) connection request, wherein the RRC connection request comprises a bit or a field for indicating a first user identity, and the first user identity is used for distinguishing the user equipment in contention conflict resolution of random access, wherein a quantity of bits comprised in the bit or the field for indicating the first user identity is less than a first specified bit quantity.

12. The base station according to claim 11, wherein a resource used for transmitting the RAR reply message is configured using signaling or preset by the system, and the resource that is configured using signaling or preset by the system and that is used for transmitting the RAR reply message comprises:

a location of a time resource and/or a location of a frequency resource occupied in transmitting the RAR reply message; and/or, a start location of a time resource and/or a start location of a frequency resource occupied in transmitting the RAR reply message; and/or, a size of a time resource and/or a size of a frequency resource occupied in transmitting the RAR reply message; and/or, a time interval between time resources occupied in transmitting different RAR reply messages and/or a frequency interval between frequency resources occupied in transmitting different RAR reply messages; and/or, a quantity of time resources that are contained in one prespecified time range and that are occupied in transmitting RAR reply messages and a quantity of frequency resources that are contained in one prespecified frequency range and that are occupied in transmitting RAR reply messages;

wherein the processor further executes the instructions to:

determine, according to a correspondence between a resource or a resource index of the RAR reply message and the preamble information, a resource for receiving the RAR reply message; or determine, according to a correspondence between a resource or a resource index of the RAR reply message and the preamble information and a cell common parameter, a resource for receiving the RAR reply message; or determine, according to a correspondence between a resource or a resource index of the RAR reply message and the RAR resource information, a resource for receiving the RAR reply message; or determine, according to a correspondence between a resource or a resource index of the RAR reply message and the RAR resource information and a cell common parameter, a resource for receiving the RAR reply message; or determine, according to a correspondence between a resource or a resource index of the RAR reply message and a specified parameter, a resource for receiving the RAR reply message; or determine, according to a correspondence between a resource or a resource index of the RAR reply message and a specified parameter and a cell common parameter, a resource for receiving the RAR reply message, the correspondence is a functional relationship, a table relationship or a specified relationship, and the correspondence is configured using signaling or preset by the system.

13. A user equipment, wherein the user equipment comprises: a bus, and a processor, a memory, and an interface connected to the bus, wherein the memory is configured to store instructions;
the processor executes the instruction to determine a random access preamble;
the interface configured to send the first random access preamble to a base station;
the processor executes the instructions to further:
determine preamble information according to the first random access preamble, wherein the preamble information comprises one or more of the following: the random access preamble, a random access preamble index, an index of a time resource used for transmitting the random access preamble, an index of a frequency resource used for transmitting the random access preamble, a start time resource in the time resource used for transmitting the random access preamble, and a start frequency resource used for transmitting the random access preamble; and
determine a random access response (RAR) resource corresponding to the first random access preamble according to a correspondence between the preamble information and RAR resource information, wherein the RAR resource information comprises one or more of the following: the RAR resource, an RAR resource index, an index of a time resource used for transmitting an RAR message, an index of a frequency resource used for transmitting the RAR message, a start time resource in the time resource used for transmitting the RAR message, and a start frequency resource used for transmitting the RAR message, and the correspondence between the preamble information and the RAR resource information is configured using signaling or preset by a system;
the interface is further configured to receive, on the RAR resource corresponding to the first random access preamble, a media access control (MAC) packet data unit (PDU) sent by the base station; and
the processor executes the instruction to further determine whether the MAC PDU comprises the RAR message corresponding to the first random access preamble;
wherein the correspondence between the preamble information and the RAR resource information comprises:
the RAR resource index corresponding to the random access preamble index of the random access preamble mod a quantity of RAR resources configured using signaling or preset by the system, wherein mod denotes a modulo operation.

14. The user equipment according to claim 13, wherein the RAR resource is configured using signaling or preset by the system, and each RAR resource of RAR resources configured using signaling or preset by the system corresponds to one or more random access preambles.

15. The user equipment according to claim 13, wherein the interface is further configured to:
send an RAR reply message to the base station, wherein the RAR reply message comprises a radio resource control (RRC) connection request, wherein the RRC connection request comprises a bit or a field for indicating a first user identity, and the first user identity is used for distinguishing the user equipment in contention conflict resolution of random access, wherein a quantity of bits comprised in the bit or the field for indicating the first user identity is less than a first specified bit quantity.

16. The user equipment according to claim 15, wherein a resource used for transmitting the RAR reply message is configured using signaling or preset by the system, and the resource that is configured using signaling or preset by the system and that is used for transmitting the RAR reply message comprises:
a location of a time resource and/or a location of a frequency resource occupied in transmitting the RAR reply message; and/or,
a start location of a time resource and/or a start location of a frequency resource occupied in transmitting the RAR reply message; and/or,
a size of a time resource and/or a size of a frequency resource occupied in transmitting the RAR reply message; and/or,
a time interval between time resources occupied in transmitting different RAR reply messages and/or a frequency interval between frequency resources occupied in transmitting different RAR reply messages; and/or,
a quantity of time resources that are contained in one prespecified time range and that are occupied in transmitting RAR reply messages and a quantity of frequency resources that are contained in one prespecified frequency range and that are occupied in transmitting RAR reply messages;
wherein the processor further executes the instructions to further:
determine, according to a correspondence between a resource or a resource index of the RAR reply message and the preamble information, a resource for sending the RAR reply message; or
determine, according to a correspondence between a resource or a resource index of the RAR reply message and the preamble information and a cell common parameter, a resource for sending the RAR reply message; or
determine, according to a correspondence between a resource or a resource index of the RAR reply message and the RAR resource information, a resource for sending the RAR reply message; or
determine, according to a correspondence between a resource or a resource index of the RAR reply message and the RAR resource information and a cell common parameter, a resource for sending the RAR reply message; or
determine, according to a correspondence between a resource or a resource index of the RAR reply message and a specified parameter, a resource for sending the RAR reply message; or
determine, according to a correspondence between a resource or a resource index of the RAR reply message and a specified parameter and a cell common parameter, a resource for sending the RAR message,
the correspondence is a functional relationship, a table relationship or a specified relationship, and the correspondence is configured using signaling or preset by the system.

* * * * *